(12) United States Patent
Oh et al.

(10) Patent No.: US 10,666,549 B2
(45) Date of Patent: *May 26, 2020

(54) BROADCAST SIGNAL TRANSMISSION APPARATUS, BROADCAST SIGNAL RECEPTION APPARATUS, BROADCAST SIGNAL TRANSMISSION METHOD AND BROADCAST SIGNAL RECEPTION METHOD

(71) Applicant: LG ELECTRONICS INC., Seoul (KR)

(72) Inventors: Sejin Oh, Seoul (KR); Jongyeul Suh, Seoul (KR); Soojin Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

This patent is subject to a terminal disclaimer.

(21) Appl. No.: 15/747,669

(22) PCT Filed: Jul. 26, 2016

(86) PCT No.: PCT/KR2016/008154
§ 371 (c)(1),
(2) Date: Jan. 25, 2018

(87) PCT Pub. No.: WO2017/018775
PCT Pub. Date: Feb. 2, 2017

(65) Prior Publication Data
US 2018/0219764 A1 Aug. 2, 2018

Related U.S. Application Data

(60) Provisional application No. 62/198,113, filed on Jul. 28, 2015, provisional application No. 62/197,574, filed on Jul. 28, 2015.

(51) Int. Cl.
*H04L 12/761* (2013.01)
*H04H 60/63* (2008.01)
(Continued)

(52) U.S. Cl.
CPC .............. *H04L 45/16* (2013.01); *H04H 20/72* (2013.01); *H04H 60/07* (2013.01); *H04H 60/73* (2013.01);
(Continued)

(58) Field of Classification Search
CPC .... H04N 19/186; H04N 19/85; H04N 19/124; G06T 2207/20208; G06T 5/009
See application file for complete search history.

(56) References Cited

U.S. PATENT DOCUMENTS

| 2009/0228283 A1 | 9/2009 | Toma et al. |
| 2015/0208104 A1 | 7/2015 | Suh et al. |

(Continued)

FOREIGN PATENT DOCUMENTS

| JP | 2015-73197 A | 4/2015 |
| WO | WO 2013/015596 A2 | 1/2013 |

(Continued)

*Primary Examiner* — Jung H Park
(74) *Attorney, Agent, or Firm* — Birch, Stewart, Kolasch & Birch, LLP

(57) ABSTRACT

The present invention provides a method for transmitting a broadcast signal. The method for transmitting a broadcast signal according to the present invention provides a system that supports a next-generation broadcasting service in an environment supporting next-generation hybrid broadcasting using a terrestrial broadcasting network and the Internet network. In addition, the present invention provides an efficient signalling method that can accommodate both a terrestrial broadcasting network and the Internet network in an environment supporting next-generation hybrid broadcasting.

10 Claims, 56 Drawing Sheets

(51) Int. Cl.
   *H04L 29/06*     (2006.01)
   *H04N 21/2362*   (2011.01)
   *H04W 4/06*      (2009.01)
   *H04H 60/07*     (2008.01)
   *H04H 20/72*     (2008.01)
   *H04L 12/18*     (2006.01)
   *H04L 12/707*    (2013.01)
   *H04L 29/08*     (2006.01)
   *H04H 60/73*     (2008.01)

(52) U.S. Cl.
   CPC .......... *H04L 12/1877* (2013.01); *H04L 45/22* (2013.01); *H04L 65/4076* (2013.01); *H04L 65/607* (2013.01); *H04L 67/16* (2013.01); *H04L 69/22* (2013.01); *H04N 21/2362* (2013.01); *H04W 4/06* (2013.01)

(56) References Cited

U.S. PATENT DOCUMENTS

2018/0098111 A1* 4/2018 Yang .................... H04N 13/167
2018/0131972 A1* 5/2018 Yamagishi ......... H04N 21/2362

FOREIGN PATENT DOCUMENTS

| WO | WO 2015/011339 A1 | 1/2015 |
| WO | WO 2015/105377 A1 | 7/2015 |

* cited by examiner

| Syntax | No. of Bits | Format |
|---|---|---|
| LLS_table( ) { | | |
|     LLS_table_id | 8 | uimsbf |
|     provider_id | 8 | uimsbf |
|     LLS_table_version | 8 | uimsbf |
|     switch (LLS_table_id) { | | |
|         case 0x01: | | |
|             SLT | var | Sec. 6.3 |
|             break; | | |
|         case 0x02: | | |
|             RRT | var | See Annex F |
|             break; | | |
|         case 0x03: | | |
|             System Time | var | Sec. 6.4 |
|             break; | | |
|         case 0x04: | | |
|             CAP | var | Sec. 6.5 |
|             break; | | |
|         default: | | |
|             reserved | var | |
|     } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1..999 |
|     @minorChannelNo | 0..1 | 1..999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcSignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | Use | Data Type |
|---|---|---|
| bundleDescription | | |
|   userServiceDescription | | |
|     @globalServiceID | 1 | anyURL |
|     @serviceID | 1 | unsignedShort |
|     @serviceStatus | 0..1 | boolean |
|     @fullMPDUri | 1 | anyURL |
|     @sTSIDUri | 1 | anyURL |
|     name | 0..N | string |
|       @lang | 1 | language |
|     serviceLanguage | 0..N | language |
|     capabilityCode | 0..1 | string |
|     deliveryMethod | 1..N | |
|       broadcastAppService | 1..N | |
|         basePattern | 1..N | string |
|       unicastAppService | 0..N | |
|         basePattern | 1..N | string |

— t4010

| Element or Attribute Name | Use | Data Type |
|---|---|---|
| S-TSID | | |
|   @serviceID | 1 | unsignedShort |
|   RS | 1..N | |
|     @bsid | 0..1 | unsignedShort |
|     @sIpAddr | 0..1 | string |
|     @dIpAddr | 0..1 | string |
|     @dport | 0..1 | unsignedShort |
|     @PLPID | 0..1 | unsignedByte |
|     LS | 1..N | |
|       @tsi | 1 | unsignedInt |
|       @PLPID | 0..1 | unsignedByte |
|       @bw | 0..1 | unsignedInt |
|       @startTime | 0..1 | dateTime |
|       @endTime | 0..1 | dateTime |
|       SrcFlow | 0..1 | srcFlowType |
|       RepairFlow | 0..1 | rprFlowType | t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 6
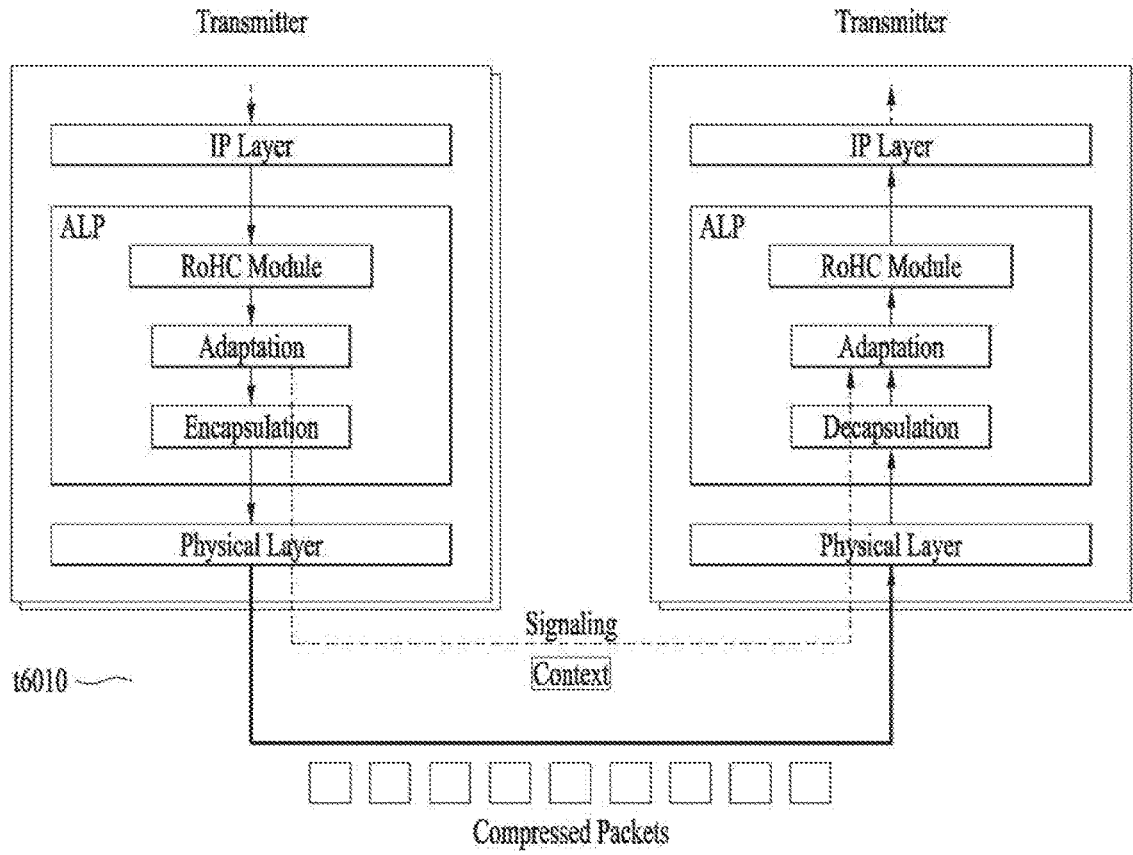
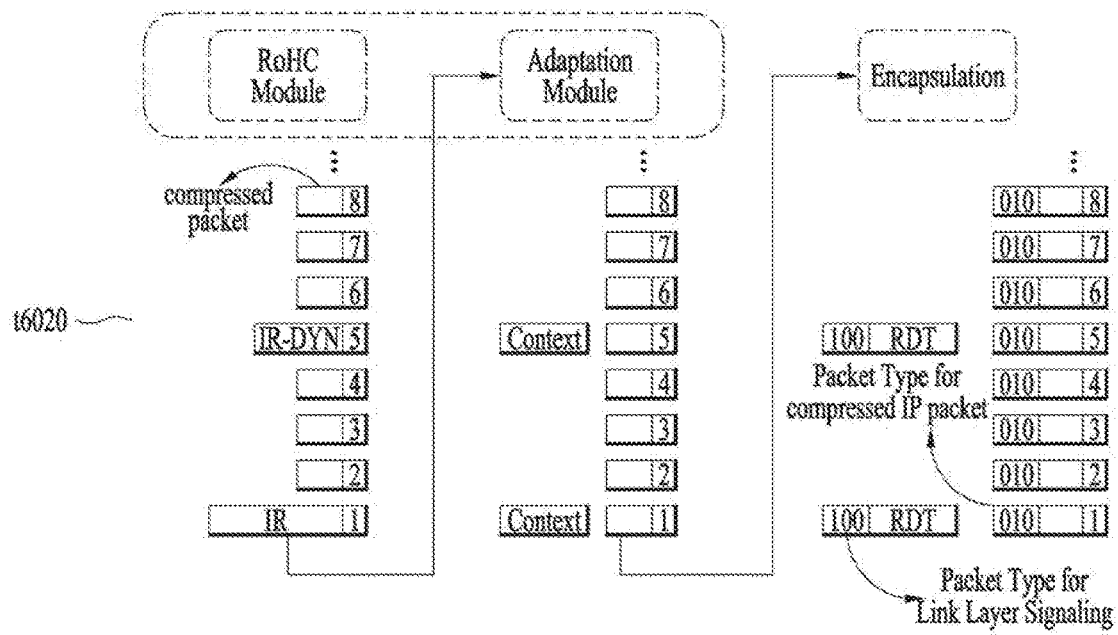

FIG. 7

| Syntax | Number of bits | Format |
|---|---|---|
| Link_Mapping_Table() { | | |
|    signaling_type | 8 | 0x01 |
|    PLP_ID | 6 | uimsbf |
|    reserved | 2 | "11" |
|    num_session | 8 | uimsbf |
|    for(i = 0 ; i < num_session ; i + +) { | | |
|       src_IP_add | 32 | uimsbf |
|       dst_IP_add | 32 | uimsbf |
|       src_UDP_port | 16 | uimsbf |
|       dst_UDP_port | 16 | uimsbf |
|       SID_flag | 1 | bslbf |
|       compressed_flag | 1 | bslbf |
|       reserved | 6 | '111111' |
|       if (SID_flag = = "1") { | | |
|          SID | 8 | uimsbf |
|       } | | |
|       if (compressed_flag = = "1") { | | |
|          context_id | 8 | uimsbf |
|       } | | |
|    } | | |
| } | | |

```
aligned(8) class HDRConfigurationBox extends FullBox('hdrc', version=0, 0) {
    HDRConfiguration          hdr_config;
}
```

```
aligned(8) class HDRConfiguration (bit(24) hdr_flags=0){
    unsigned int(8)           OETF_type;
    unsigned int(32)          max_mastering_display_luminance;
    unsigned int(32)          min_mastering_display_luminance;
    unsigned int(1)           hdr_type_transition_flag;
    unsigned int(1)           hdr_sdr_transition_flag;
    unsigned int(1)           sdr_hdr_transition_flag;
    unsigned int(1)           sdr_compatibility_flag;
    unsigned int(4)           reserved=0;
    unsigned int(32)          average_frame_luminance_level;
    unsigned int(32)          max_frame_pixel_luminance;
}
```

FIG. 16

```
aligned(8) class HDRConfigurationBox extends FullBox('hdrc',version=0, 0) {
    unsigned int(7)    hdr_param_set;
    unsigned int(1)    hdr_config_flag;
    if(hdr_config_flag) {
        HDRConfiguration hdr_config; //optional
    }
}
```
~ d16010

```
aligned(8) class HDRConfiguration (bit(24) hdr_flags=0){
    unsigned int(8)     OETF_type;
    unsigned int(32)    max_mastering_display_luminance;
    unsigned int(32)    min_mastering_display_luminance;
    unsigned int(32)    average_frame_luminance_level;
    unsigned int(32)    max_frame_pixel_luminance;
    unsigned int(1)     hdr_type_transition_flag;
    unsigned int(1)     hdr_sdr_transition_flag;
    unsigned int(1)     sdr_hdr_transition_flag;
    unsigned int(1)     sdr_compatibility_flag;
    unsigned int(4)     reserved=0;
}
```
~ d16020

```
aligned(8) class HDRConfigurationBox extends FullBox('hdrc', version=0, 0) {
    unsigned int(8)     hdr_param_set;
    unsigned int(3)     reserved=0;
    unsigned int(1)     hdr_type_transition_flag;
    unsigned int(1)     hdr_sdr_transition_flag;
    unsigned int(1)     sdr_hdr_transition_flag;
    unsigned int(1)     sdr_compatibility_flag;
    unsigned int(1)     hdr_config_flag;
    if(hdr_config_flag) {
        HDRConfiguration hdr_config; //optional
    }
}
```
~ d16030

```
aligned(8) class HDRConfiguration (bit(24) hdr_flags=0){
    unsigned int(8)     OETF_type;
    unsigned int(32)    max_mastering_display_luminance;
    unsigned int(32)    min_mastering_display_luminance;
    unsigned int(32)    average_frame_luminance_level;
    unsigned int(32)    max_frame_pixel_luminance;
}
```
~ d16040

FIG. 17

```
aligned(8) class TrackHeaderBox extends FullBox('tkhd', version, flags){
    if (version==1) {
        unsigned int(64)    creation_time;
        unsigned int(64)    modification_time;
        unsigned int(32)    track_ID;
        const unsigned int(32) reserved = 0;
        unsigned int(64)    duration;
    } else { // version==0
        unsigned int(32)    creation_time;
        unsigned int(32)    modification_time;
        unsigned int(32)    track_ID;
        const unsigned int(32) reserved = 0;
        unsigned int(32)    duration;
    }
    const unsigned int(32)[2] reserved = 0;
    template int(16)    layer = 0;
    template int(16)    alternate_group = 0;
    template int(16)    volume = {if track_is_audio 0x0100 else 0};
    const unsigned int(16) reserved = 0;
    template int(32)[9] matrix=
        { 0x00010000,0,0,0,0x00010000,0,0,0,0x40000000 };// unity matrix
    unsigned int(32)    width;
    unsigned int(32)    height;
    unsigned int(1)     hdr_flag;
    unsigned int(7)     reserved=0;
    if(hdr_flag == 1){
        unsigned int(8) hdr_param_set;
        unsigned int(1) hdr_type_transition_flag;
        unsigned int(1) hdr_sdr_transition_flag;
        unsigned int(1) sdr_hdr_transition_flag;
        unsigned int(1) sdr_compatibility_flag;
        unsigned int(4) reserved=0;
    }
}
```
d17010

```
aligned(8) class TrackHeaderBox extends FullBox('tkhd', version, flags){
    if (version==1) {
        unsigned int(64)    creation_time;
        unsigned int(64)    modification_time;
        unsigned int(32)    track_ID;
        const unsigned int(32) reserved = 0;
        unsigned int(64)    duration;
    } else { // version==0
        unsigned int(32)    creation_time;
        unsigned int(32)    modification_time;
        unsigned int(32)    track_ID;
        const unsigned int(32) reserved = 0;
        unsigned int(32)    duration;
    }
    const unsigned int(32)[2] reserved = 0;
    template int(16)    layer = 0;
    template int(16)    alternate_group = 0;
    template int(16)    volume = {if track_is_audio 0x0100 else 0};
    const unsigned int(16) reserved = 0;
    template int(32)[9] matrix=
        { 0x00010000,0,0,0,0x00010000,0,0,0,0x40000000 };// unity matrix
    unsigned int(32)    width;
    unsigned int(32)    height;
    unsigned int(1)     hdr_flag;
    unsigned int(7)     reserved=0;
    if(hdr_flag == 1){
        HDRConfigurationBox  hdr_config;
    }
}
```
d17020

FIG. 18

```
aligned(8) class VideoMediaHeaderBox extends FullBox('vmhd', version = 0, 1) {
    template unsigned int(16)      graphicsmode = 0;
    // copy, see below
    template unsigned int(16)[3]   opcolor = {0, 0, 0};
    unsigned int(1)                hdr_flag;
    unsigned int(7)                reserved=0;
    if(hdr_flag == 1){
        unsigned int(8)            hdr_param_set;
        unsigned int(1)            hdr_type_transition_flag;
        unsigned int(1)            hdr_sdr_transition_flag;
        unsigned int(1)            sdr_hdr_transition_flag;
        unsigned int(1)            sdr_compatibility_flag;
        unsigned int(4)            reserved=0;
    }
}
```
d18010

```
aligned(8) class VideoMediaHeaderBox extends FullBox('vmhd', version = 0, 1) {
    template unsigned int(16)      graphicsmode = 0;
    // copy, see below
    template unsigned int(16)[3]   opcolor = {0, 0, 0};
    unsigned int(1)                hdr_flag;
    unsigned int(7)                reserved=0;
    if(hdr_flag == 1){
        HDRConfigurationBox        hdr_config;
    }
}
```
d18020

FIG. 19

```
aligned(8) class TrackExtendsBox extends FullBox('trex', 0, 0){
    unsigned int(32)        track_ID;
    unsigned int(32)        default_sample_description_index;
    unsigned int(32)        default_sample_duration;
    unsigned int(32)        default_sample_size;
    unsigned int(32)        default_sample_flags;
    unsigned int(1)         default_hdr_flag;
    unsigned int(1)         default_sample_hdr_flag;
    unsigned int(6)         reserved=0;
    if(default_hdr_flag == 1){
        HDRConfigurationBox default_hdr_config;
    }
    if(default_sample_hdr_flag == 1){
        HDRConfigurationBox default_sample_hdr_config;
    }
}
```

FIG. 20

```
d20010    aligned(8) class TrackFragmentHeaderBox extends FullBox('tfhd', 0, tf_flags){
              unsigned int(32)            track_ID;
              unsigned int(1)             hdr_flag;
              unsigned int(7)             reserved=0;
              if(hdr_flag == 1){
                 unsigned int(8)          hdr_param_set;
                 unsigned int(1)          hdr_type_transition_flag;
                 unsigned int(1)          hdr_sdr_transition_flag;
                 unsigned int(1)          sdr_hdr_transition_flag;
                 unsigned int(1)          sdr_compatibility_flag;
                 unsigned int(4)          reserved=0;
              }
              // all the following are optional fields
              unsigned int(64)            base_data_offset;
              unsigned int(32)            sample_description_index;
              unsigned int(32)            default_sample_duration;
              unsigned int(32)            default_sample_size;
              unsigned int(32)            default_sample_flags;
          }
```

```
d20020    aligned(8) class TrackFragmentHeaderBox extends FullBox('tfhd', 0, tf_flags){
              unsigned int(32)            track_ID;
              unsigned int(1)             hdr_flag;
              unsigned int(7)             reserved=0;
              if(hdr_flag == 1){
                 HDRConfigurationBox      hdr_config;
              }
              // all the following are optional fields
              unsigned int(64)            base_data_offset;
              unsigned int(32)            sample_description_index;
              unsigned int(32)            default_sample_duration;
              unsigned int(32)            default_sample_size;
              unsigned int(32)            default_sample_flags;
          }
```

```
d20030    aligned(8) class TrackFragmentHeaderBox extends FullBox('tfhd', 0, tf_flags){
              unsigned int(32)            track_ID;
              // all the following are optional fields
              unsigned int(64)            base_data_offset;
              unsigned int(32)            sample_description_index;
              unsigned int(32)            default_sample_duration;
              unsigned int(32)            default_sample_size;
              unsigned int(32)            default_sample_flags;
              HDRConfigurationBox         default_sample_hdr_config;
          }
```

FIG. 21

```
d21010
aligned(8) class TrackRunBox extends FullBox('trun', version, tr_flags) {
    unsigned int(32)    sample_count;
    unsigned int()      hdr_flag;
    unsigned int(7)     reserved=0;
    if(hdr_flag == 1){
        unsigned int(8)  hdr_param_set;
        unsigned int(1)  hdr_type_transition_flag;
        unsigned int(1)  hdr_sdr_transition_flag;
        unsigned int(1)  sdr_hdr_transition_flag;
        unsigned int(4)  sdr_compatibility_flag;
        reserved=0;
    }
    // the following are optional fields
    signed int(32)      data_offset;
    unsigned int(32)    first_sample_flags;
    // all fields in the following array are optional
    {
        unsigned int(32)  sample_duration;
        unsigned int(32)  sample_size;
        unsigned int(32)  sample_flags;
        if(version == 0)
        {
            unsigned int(32) sample_composition_time_offset;
        }else{
            signed int(32)   sample_composition_time_offset;
        }
    }[ sample_count ]
}
```

```
d21020
aligned(8) class TrackRunBox extends FullBox('trun', version, tr_flags) {
    unsigned int(32)    sample_count;
    unsigned int()      hdr_flag;
    unsigned int(7)     reserved=0;
    if(hdr_flag == 1){
        HDRConfigurationBox hdr_config;
    }
    // the following are optional fields
    signed int(32)      data_offset;
    unsigned int(32)    first_sample_flags;
    // all fields in the following array are optional
    {
        unsigned int(32)  sample_duration;
        unsigned int(32)  sample_size;
        unsigned int(32)  sample_flags;
        if(version == 0)
        {
            unsigned int(32) sample_composition_time_offset;
        }else{
            signed int(32)   sample_composition_time_offset;
        }
    }[ sample_count ]
}
```

```
d21030
aligned(8) class TrackFragmentHeaderBox extends FullBox('trun', version, tr_flags) {
    unsigned int(32)    sample_count;
    // the following are optional fields
    signed int(32)      data_offset;
    unsigned int(32)    first_sample_flags;
    hdr_config;
    // all fields in the following array are optional
    {
        unsigned int(32)  sample_duration;
        unsigned int(32)  sample_size;
        unsigned int(32)  sample_flags;
        if(version == 0)
        {
            unsigned int(32) sample_composition_time_offset;
        }else{
            signed int(32)   sample_composition_time_offset;
        }
        HDRConfigurationBox sample_hdr_config;
    }[ sample_count ]
}
```

```
d21040
aligned(8) class TrackFragmentHeaderBox extends FullBox('trun', version, tr_flags) {
    unsigned int(32)    sample_count;
    // the following are optional fields
    signed int(32)      data_offset;
    unsigned int(32)    first_sample_flags;
    // all fields in the following array are optional
    {
        unsigned int(32)  sample_duration;
        unsigned int(32)  sample_size;
        unsigned int(32)  sample_flags;
        if(version == 0)
        {
            unsigned int(32) sample_composition_time_offset;
        }else{
            signed int(32)   sample_composition_time_offset;
        }
        HDRConfigurationBox sample_hdr_config;
    }[ sample_count ]
}
```

FIG. 22

FIG. 23 d23010
```
class HEVCSampleEntry() extends VisualSampleEntry ('hvc1' or 'hev1'){
    HEVCConfigurationBox config;
    HDRConfigurationBox hdr_config;//optional
    MPEG4BitRateBox (); // optional
    MPEG4ExtensionDescriptorsBox (); // optional
    extra_boxes boxes; // optional
}
``` d23020
```
class HEVCConfigurationBox extends Box('hvcC') {
    HEVCDecoderConfigurationRecord() HEVCConfig;
    HDRConfigurationBox hdr_config;//optional
}
``` d23030
```
aligned(8) class HEVCDecoderConfigurationRecord {
    unsigned int(8) configurationVersion = 1;
    unsigned int(2) general_profile_space;
    unsigned int(1) general_tier_flag;
    unsigned int(5) general_profile_idc;
    unsigned int(32) general_profile_compatibility_flags;
    unsigned int(48) general_constraint_indicator_flags;
    unsigned int(8) general_level_idc;
    bit(3) reserved = '111'b;
    bit(1)       hdr_flag;
    unsigned int(12) min_spatial_segmentation_idc;
    bit(6) reserved = '111111'b;
    unsigned int(2) parallelismType;
    bit(6) reserved = '111111'b;
    unsigned int(2) chromaFormat;
    bit(5) reserved = '11111'b;
    unsigned int(3) bitDepthLumaMinus8;
    bit(5) reserved = '11111'b;
    unsigned int(3) bitDepthChromaMinus8;
    bit(16) avgFrameRate;
    bit(2) constantFrameRate;
    bit(3) numTemporalLayers;
    bit(1) temporalIdNested;
    unsigned int(2) lengthSizeMinusOne;
    unsigned int(8) numOfArrays;
    for (j=0; j < numOfArrays; j++) {
        bit(1) array_completeness;
        unsigned int(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
    if(hdr_flag==1){
        HDRConfiguration     hdr_config;
    }
}
```

FIG. 24 d24010
```
class HDRInformationSEIBox extends Box('hisb', size)
{
    unsigned int(8*size-64)       hdrinfosei;
}
``` d24020
```
class VisualSampleEntry(codingname) extends SampleEntry (codingname){
    unsigned int(16) pre_defined = 0;
    const unsigned int(16) reserved = 0;
    unsigned int(32)[3]           pre_defined = 0;
    unsigned int(16)              width;
    unsigned int(16)              height;
    template unsigned int(32)     horizresolution = 0x00480000; // 72 dpi
    template unsigned int(32)     vertresolution  = 0x00480000; // 72 dpi
    const unsigned int(32)        reserved = 0;
    template unsigned int(16)     frame_count = 1;
    string[32]    compressorname;
    template unsigned int(16)     depth = 0x0018;
    int(16)       pre_defined = -1;
    // other boxes from derived specifications
    CleanApertureBox              clap;// optional
    PixelAspectRatioBox           pasp;// optional
    HDRInformationSEIBox          hdr_sei; // optional
}
``` d24030
```
class HEVCSampleEntry() extends VisualSampleEntry ('hvc1' or 'hev1'){
    HEVCConfigurationBox config;
    MPEG4BitRateBox (); // optional
    MPEG4ExtensionDescriptorsBox (); // optional
    extra_boxes boxes; // optional
} class HEVCConfigurationBox extends Box('hvcC') {
    HEVCDecoderConfigurationRecord() HEVCConfig;
    HDRInformationSEIBox    hdr_sei; // optional
}
``` d24040
```
class HEVCSampleEntry() extends VisualSampleEntry ('hvc1' or 'hev1'){
    HEVCConfigurationBox config;
    MPEG4BitRateBox (); // optional
    MPEG4ExtensionDescriptorsBox (); // optional
    HDRInformationSEIBox hdr_sei; // optional
    extra_boxes boxes; // optional
}
```

FIG. 29

| Element or Attribute Name | Use | Description |
|---|---|---|
| bundleDescription | | Root element of the User Service Bundle Description. |
|   userServiceDescription | | A single instance of an Service. |
|     @serviceId | M | Globally unique identifier of the Service. |
|     @atsc:serviceId | M | Reference to corresponding service entry in LLS. The value of this attribute is the same value of serviceId assigned to the entry. |
|     @atsc:providerid | O | Identifier for the provider which is broadcasting this service. |
|     @atsc:serviceCategory | O | Attribute indicates the category of this service |
|     @atsc:spIndicator | O | When set to true, that one or more components necessary for meaningful presentation is protected. When set to false, this flag indicates that no components necessary for meaningful presentation of the service are protected. |
|     @atsc:serviceStatus | O | Attribute indicates the status of this service, a pair of these values, ['0': Inactive or '1':Active] and ['2':Shown or '3':Hidden]. |
|     @atsc:shortServiceName | O | Short string name of the Service |
|     name | 0..N | Service name |
|       @lang | CM | Language of the service name. |
|     serviceLanguage | 0..N | Available languages of the service. |
|     atsc:capabilityCode | 0..1 | the capabilities and capability groups required in the receiver to be able to create a meaningful presentation of the content of this service. |
|     atsc:serviceType | 0..1 | specifying the type of the service when the components are combined. E.g. 3D service, multiview service, panorama, and so on. |
|     atsc:channel | 1 | information about the channel in the service |
|       @atsc:majorChannelNo | 1 | Attribute indicates the major channel number of the service. |
|       @atsc:minorChannelNo | 1 | Attribute indicates the minor channel number of the service. |
|       @atsc:serviceLang | 1 | Attribute indicates the primary language used in the service. |
|       @atsc:serviceGenre | 0..1 | Attribute indicates primary genre of the service. |
|       @atsc:serviceIcon | 0..1 | Attribute indicates the Uniform Resource Locator (URL) for the icon used to represent this service. |
|     atsc:serviceDescription | 0..N | service description possibly in multiple languages. |
|       @atsc:serviceDescrText | 1 | Attribute indicates description of the service. |
|       @atsc:serviceDescrLang | 0..1 | Attribute indicates the language of the serviceDescrText |
|     atsc:dashComponent | 0..1 | A description about the content components of Service delivered as MPEG DASH |
|       @atsc:fullMPDUri | M | Reference to an MPD fragment which contains descriptions for contents components of the Service delivered over broadcast or broadband. |
|       @atsc:sTSIDUri | M | Reference to the S-TSID fragment which provides access related parameters to the Transport sessions carrying contents of this Service. |
|       deliveryMethod | 1..N | Container of transport related information pertaining to the contents of the service over broadcast and broadband modes of access. |
|         atsc:broadcastAppService | 1..N | A DASH Representation delivered over broadcast, in multiplexed or non-multiplexed form, containing the corresponding media component(s) belonging to the Service, across all Periods of the affiliated Media Presentation. |
|           basePattern | 1..N | A character pattern for use by the receiver to match against any portion of the Segment URL used by the DASH client to request Media Segments of a parent Representation under its containing Period . |
|         atsc:unicastAppService | 0..N | A DASH Representation delivered over broadband, in multiplexed or non-multiplexed form, containing the constituent media content component(s) belonging to the Service, across all Periods of the affiliated Media Presentation. |
|           basePattern | 1..N | A character pattern for use by the the receiver to match against any portion of the Segment URL used by the DASH client to request Media Segments of a parent Representation under its containing Period . |
|     atsc:mpuComponent | 0..1 | A description about the contents components of service delivered as MPUs |
|       @atsc:MMT_Package_ID | M | Reference to a MMT Package for content components of the ATSC 3.0 Service delivered as MPUs. |
|       atsc:next_MMT_Package_ID | O | Reference to a MMT Package to be used after the one referenced by @atsc: MMT_Package_ID in time for content components of the ATSC 3.0 Service delivered as MPUs. |

FIG. 30

| Element/Attribute | Cardinality | Description |
|---|---|---|
| ComponentInfo | 1..N | Contains information about components available in the service. |
| @componentType | 1 | Attribute indicates the type of this component. Value of 0 indicates an audio component. Value of 1 indicates a video component. Value of 2 indicated a closed caption component. Value of 3 indicates an application component. Values 4 to 7 are reserved. |
| @componentRole | 0..1 | Attribute indicates the role or kind of this component.<br>For audio (when componentType attribute above is equal to 0):<br>values of componentRole attribute can be as follows: 0 = Complete main, 1 = Music, 2=Effects, 3= Dialog, 4 = Commentary, 5 = Visually Impaired, 6 = Hearing Impaired, 6 = Voice-Over(audio description describing video component), 7= subset, 8-254= reserved, 255 = unknown.<br>For Video (when componentType attribute above is equal to 1) values of componentRole attribute are as follows: 0 = Primary video, 1= Alternative camera view, 2 = Other alternative video component, 3 = Sign language, 4 = Follow subject video, 5 = 3D video left view, 6 = 3D video right view, 7 = 3D video depth information, 8 = Part of video array <x,y> of <n,m>, 9 = Follow-Subject metadata, 10 = enhanced Video, 11: closed caption included, 12-254 = reserved, 255 = unknown.<br>For Closed Caption component (when componentType attribute above is equal to 2) values of componentRole attribute are as follows: 0 = main, 1=alternate, 2= supplementary 3 = Normal, 4 = Easy reader, 5: textual description (a textual description describing video component), 6-254 = reserved, 255 = unknown. |
| @componentProtectedFlag | 0..1 | Attribute indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. |
| @componentId | 1 | Attribute indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. |
| @componentName | 0..1 | Attribute indicates the human readable name of this component. |
| @componentGroupId | 0..1 | Identifier for a component group that consists of a collection of components, and which represent the same scene, and which are to be combined in some combination to produce a presentation (e.g., music, dialog and effects audio components that are to be mixed to give complete audio, or left and right 3D views that are to be combined to give 3D pictures). |
| @essentialIndicator | 0..1 | Attribute indicates whether this component is an essential component for the Service when set to '1'. Otherwise, this indicates that this component is an optional component. |
| @dependentComponentID | 0..N | Attribute indicates an identifier(s) of dependent component(s). For example, an enhanced video component can have an identifier for associated base video component(s) |
| @protocolType | 0..1 | Attribute indicates application layer transport protocol carrying this component (e.g., ROUTE, MMTP) |
| @rt | 0..1 | Attribute indicates whether this component is carried in real-time or not. |
| @targetDevice | 0..1 | Attribute indicates a target device. It can have following values. 0= primary device, 1= companion device, 2= both primary and companion devices, 3=inset on primary screen. |
| @componentCodec | 0..1 | Codec information f this component. The codec parameters also can include profile and level information where applicable |
| @componentProfile | 0..1 | Profile of this component |
| @componentLang | 0..1 | Language used in this component (e.g., audio, closed caption component) |
| @width | 0..1 | The horizontal visual presentation size of the video media type |
| @height | 0..1 | The vertical visual presentation size of the video media type |
| Accessibility | 0..N | The information about the accessibility of this component |
| Capability | 0..N | The information about the capability of this component |
| Rating | 0..N | Content advisory rating information related to this component |
| Targeting | 0..N | Targeting or personalization properties related to this component |
| ComponentDescription | 0..N | Component description. It can include codec dependent encoding parameters |
| ComponentProperty | 0..N | Component properties for processing this component |

Legend: For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 31

| capability_code | Meaning |
|---|---|
| 0x00 | forbidden |
| Transport protocols | |
| 0x01 | ROUTE |
| 0x02 | MMT |
| 0x03 | FLUTE |
| 0x04-0x0F | Reserved for future use |
| Video codec | |
| 0x10 | AVC |
| 0x11 | SVC |
| 0x12 | MVC |
| 0x13 | HEVC |
| 0x14 | SHVC |
| 0x15-0x1F | Reserved for future use |
| Video Resolution | |
| 0x20 | Standard definition video |
| 0x21 | High definition video |
| 0x22 | Ultra high definition video |
| 0x23-0x2F | Reserved for future use |
| Video Provision Method | |
| 0x30 | 3D video |
| 0x31 | Multi-view video |
| 0x32 | Panorama view video |
| 0x33-0x3F | Reserved for future use |
| Audio Codec | |
| 0x40 | MPEG-H audio |
| 0x41 | AC-4 audio |
| 0x42 | DTS-HD |
| 0x43-0x4F | Reserved for future use |
| Audio Channels | |
| 0x50 | Stereo |
| 0x51 | 5.1 channel |
| 0x52 | 7.1 channel |
| 0x53-0x3F | Reserved for future use |
| Closed Caption type | |
| 0x60 | SMPTE timed text |
| 0x61 | CEA-708 captions |
| 0x62-0x6F | Reserved for future use |
| FEC Algorithm | |
| 0x70 | Compact No-Code FEC scheme. |
| 0x71 | Raptor algorithm |
| 0x72-0x5F | Reserved for future use |
| Target device | |
| 0x80 | Primary device |
| 0x81 | Companion device |
| 0x82 | Inset on Primary Screen ("Picture-in-Picture") |
| 0x83-0x8F | Reserved for future use |
| Application type | |
| 0x90 | App-based enhancement |
| 0x91 | App-based service |
| 0x92-0xFF | Reserved for future use |

FIG. 32

| Syntax | No. of Bits | Format |
|---|---|---|
| MP_table() { | | |
|     table_id | 8 | uimsbf |
|     version | 8 | uimsbf |
|     length | 16 | uimsbf |
|     reserved | 6 | bslbf |
|     MP_table_mode | 2 | bslbf |
|     If (table_id == SUBSET_0_MPT_TABLE_ID) { | | |
|         MMT_package_id { | | |
|             MMT_package_id_length | 8 | uimsbf |
|             for (i=0; i<N1; i++) { | | |
|                 MMT_package_id_byte | 8 | uimsbf |
|             } | | |
|         ... | | |
|     } | | |
|     service_type | 8 | uimsbf |
|     number_of_assets /*N3*/ | 8 | uimsbf |
|     for (i=0; i<N3; i++) { | | |
|         Identifier_mapping() | | |
|         asset_type | 32 | char |
|         packet_id | 16 | uimsbf |
|         reserved | 3 | '111' |
|         asset_role_flag | 1 | bslbf |
|         asset_target_flag | 1 | bslbf |
|         asset_group_flag | 1 | bslbf |
|         rt_flag | 1 | bslbf |
|         default_asset_flag | 1 | bslbf |
|         asset_clock_relation_flag | 1 | bslbf |
|         if (asset_clock_relation_flag == 1) { | | |
|             asset_clock_relation_id | 8 | uimsbf |
|             reserved | 7 | bslbf |
|             asset_timescale_flag | 1 | bslbf |
|             if (asset_time_scale_flag == 1) { | | |
|                 asset_timescale | 32 | uimsbf |
|             } | | |
|         } | | |
|         if (asset_role_flag == 1) { | | |
|             asset_role | 8 | uimsbf |
|         } | | |
|         if (asset_target_flag == 1) { | | |
|             asset_target | 8 | uimsbf |
|         } | | |
|         if (asset_group_flag == 1) { | | |
|             asset_group_id | 8 | uimsbf |
|         } | | |
|         asset_location { | | |
|             location_count | 16 | uimsbf |
|             for (i=0; i<N6; i++) { | | |
|                 MMT_general_location_info() | 8 | uimsbf |
|             } | | |
|         } | | |
|         asset_descriptors { | | |
|             asset_descriptors_length | | |
|             for (j=0; j<N5; j++) { | | |
|                 asset_descriptors_byte | | |
|             } | | |
|         } | | |
|     } | | |
| } | | |

FIG. 33

| Syntax | No. of Bits | Format |
|---|---|---|
| asset_group_descriptor () { | | |
|    descriptor_tag | 8 | uimsbf |
|    descriptor_length | 8 | uimsbf |
|    asset_group_id | 8 | uimsbf |
|    num_of_asset | 8 | uimsbf |
|    for(int i=0;i<num_of_asset;i++) | | |
|    { | | |
|      asset_id() | | uimsbf |
|    } | | |
| } | | |

FIG. 34 t25010

| Accessibility | 0..N |
|---|---|
|   @schemeIdUri | M |
|   @value | O |
|   @id | O | t25020

| Accessbility@value |
|---|
| Visually impaired |
| Hearing impaired |
| enhanced-audio-intelligibility |
| 3D supported |
| Normal |
| Easy reader | t25030

| Syntax | No. of Bits | Format |
|---|---|---|
| accessibility_descriptor () { | | |
|    descriptor_tag | 8 | uimsbf |
|    descriptor_length | 8 | uimsbf |
|    num_of_accessiblity | 8 | uimsbf |
|    for(int i=0;i<num_of_accessibility;i++) | | |
|    { | | |
|      accessiblity_code | 8 | uimsbf |
|    } | | |
| } | | |

FIG. 36

| ComponentProperty | |
|---|---|
| @schemeIdUri | M |
| @value | O |
| @id | O | t27010

| ComponentProperty@value | Use |
|---|---|
| View_x | M |
| View_y | M |
| View_width | M |
| View_height | M |
| View_total_width | O |
| View_total_height | O |
| View_display_priority | O |
| Source_id | O | t27020

| Syntax | No. of Bits | Format |
|---|---|---|
| view_descriptor () { | | |
|   descriptor_tag | 8 | uimsbf |
|   descriptor_length | 8 | uimsbf |
|   reserved | 5 | '11111' |
|   source_id_flag | 1 | bslbf |
|   view_total_info_flag | 1 | bslbf |
|   view_prority_flag | 1 | bslbf |
|   view_x | 16 | uimsbf |
|   view_y | 16 | uimsbf |
|   view_width | 16 | uimsbf |
|   view_height | 16 | uimsbf |
|   if(source_id_flag == '1'){ | | |
|     source_id | 8 | uimsbf |
|   } | | |
|   if(view_total_info_flag == '1'){ | | |
|     total_width | 16 | uimsbf |
|     total_height | 16 | uimsbf |
|   } | | |
|   if(view_priority_flag == '1'){ | 8 | uimsbf |
|     view_priority | | |
|   } | | |
| } | | | t27030

FIG. 39

| Syntax | No. of bits | format |
|---|---|---|
| DCI_table() { | | |
|     table_id | 8 | uimsbf |
|     version | 8 | uimsbf |
|     length | 16 | uimsbf |
|     number_of_assets | 8 | uimsbf |
|     for (i=0; i<N1; i++) { | | |
|         asset_id() | | |
|         mime_type() | | |
|         reserved | 7 | '1111111' |
|         codec_complexity_flag | 1 | bslbf |
|         if (codec_complexity_flag == 1) { | | |
|             if (top_level_mime_type == VIDEO) { | | |
|                 video_codec_complexity { | | |
|                     video_average_bitrate | 16 | uimsbf |
|                     video_maximum_bitrate | 16 | uimsbf |
|                     horizontal_resolution | 16 | uimsbf |
|                     vertical_resolution | 16 | uimsbf |
|                     temporal_resolution | 8 | uimsbf |
|                     video_minimum_buffer_size | 16 | uimsbf |
|                 } | | |
|             } else if (top_level_mime_type == AUDIO) { | | |
|                 audio_codec_complexity { | 16 | uimsbf |
|                     audio_average_bitrate | 16 | uimsbf |
|                     audio_maximum_bitrate | 16 | uimsbf |
|                     audio_minimum_buffer_size | | |
|                 } | | |
|             } | | |
|         } | | |
|         else { | | |
|             download_capability { | | |
|                 required_storage | 32 | uimsbf |
|             } | | |
|         } | | |
|         asset_descriptors { | | |
|             num_asset_descriptors | 8 | uimsbf |
|             for (j=0; j<num_asset_descriptor ; j++) { | | |
|             asset_descriptors_byte | var | |
|             } | | |
|         } | | |
|     } | | |
| } | | |

FIG. 40

| ComponentDescription | |
|---|---|
| @schemeIdUri | M |
| @value | O |
| @id | O | t29010

| ComponentDescription @value | Use |
|---|---|
| profile_space | M |
| tier_flag | M |
| profile_idc | M |
| profile_compatibility_indication | M |
| progressive_source_flag | O |
| interlaced_source_flag | O |
| non_packed_constraint_flag | OD default:false |
| frame_only_constraint_flag | O |
| reserved_zero_44bits | M |
| level_idc | M |
| HEVC_still_present_flag | O |
| HEVC_24hr_picture_present_flag | O |
| temporal_id_min | O |
| temporal_id_max | O | t29020

| Syntax | No. of Bits | Format |
|---|---|---|
| HEVC_descriptor() { | | |
|   descriptor_tag | 8 | uimsbf |
|   descriptor_length | 8 | uimsbf |
|   profile_space | 2 | uimsbf |
|   tier_flag | 1 | bslbf |
|   profile_idc | 5 | uimsbf |
|   profile_compatibility_indication | 32 | bslbf |
|   progressive_source_flag | 1 | bslbf |
|   interlaced_source_flag | 1 | bslbf |
|   non_packed_constraint_flag | 1 | bslbf |
|   frame_only_constraint_flag | 1 | bslbf |
|   reserved_zero_44bits | 44 | bslbf |
|   level_idc | 8 | uimsbf |
|   temporal_layer_subset_flag | 1 | bslbf |
|   HEVC_still_present_flag | 1 | bslbf |
|   HEVC_24hr_picture_present_flag | 1 | bslbf |
|   reserved | 5 | bslbf |
|   if ( temporal_layer_subset_flag == '1') { | | |
|     reserved | 5 | bslbf |
|     temporal_id_min | 3 | uimsbf |
|     reserved | 5 | bslbf |
|     temporal_id_max | 3 | uimsbf |
|   } | | |
| } | | | t29030

FIG. 41

| | @value | Use |
|---|---|---|
| t30010 | hrd_management_valid_flag | M |
| | picture_and_timing_info_present_flag | M |
| | 90kHz_flag | O |
| | N | O |
| | K | O |
| | num_units_in_tick | O |

| | Syntax | No. of Bits | Format |
|---|---|---|---|
| t30020 | HEVC_timing_and_HRD_descriptor() { | | |
| |    hrd_management_valid_flag | 1 | bslbf |
| |    reserved | 6 | bslbf |
| |    picture_and_timing_info_present_flag | 1 | bslbf |
| |    if(picture_and_timing_info_present_flag == '1') { | | |
| |      90kHz_flag | 1 | bslbf |
| |      reserved | 7 | bslbf |
| |      if(90kHz_flag == '0') { | | |
| |         N | 32 | uimsbf |
| |         K | 32 | uimsbf |
| |      } | | |
| |      num_units_in_tick | 32 | uimsbf |
| |    } | | |
| | } | | |

FIG. 42 t31010

| ComponentDescription@value | Use |
|---|---|
| caption_codec | M |
| lang | O |
| caption_service_number | O |
| easy_reader_flag | O |
| aspect_ratio | O |
| 3D supported | OD default:false | t31020

| Syntax | No. of Bits | Format |
|---|---|---|
| closed_caption_descriptor() { | | |
|     descriptor_tag | 8 | uimsbf |
|     descriptor_length | 8 | uimsbf |
|     caption_lang | 8*3 | uimsbf |
|     caption_codec | 4 | uimsbf |
|     easy_reader | 1 | bslbf |
|     wide_aspect_ratio | 2 | uimsbf |
|     url_flag | 1 | uimsbf |
|     reserved | 7 | '11111111' |
|     3d_supported | 1 | bslbf |
|     If(caption_codec == 0x02 ){ | | |
|         caption_service_number/*m*/ | 3 | uimsbf |
|     } | | |
|     if(url_flag ){ | | |
|         URL_length | 1 | uimsbf |
|         URL_text() | var | |
|     } | | |
| } | | |

FIG. 43

| @schmeIdUri | description |
|---|---|
| urn:atsc3.0:caption:201x | Scheme identifier for closed caption component description |

| @value | Use | Description |
|---|---|---|
| caption_codec | M | indicates an encoding type of a corresponding caption component. In some embodiments, the field may indicate "CEA-608", "CEA-708", "SMPTE-TT", or the like. |
| lang | O | includes language information of a corresponding caption component |
| caption_service_number | O | includes a service number of a corresponding caption when a type of a corresponding caption component is CEA-708 |
| accessibility | O | indicates a target user, etc. of a closed caption/subtitle included in a corresponding caption component and information thereof may have the following values. The information may indicate 0: normal, 1: easy reader, 2: visually impaired, and 3: hearing impaired. |
| aspect_ratio | O | indicates a display aspect ratio of a corresponding caption component. This may indicate "4:3", "16:9", "21:9", and the like. |
| alternative_aspect_ratio | O | indicates a compatible display aspect ratio of a corresponding caption component. This may indicate "4:3", "16:9", "21:9", and the like. |
| scaling_support | O | indicates whether an original closed caption/subtitle region of the closed caption/subtitle is extensible as necessary during presentation on a receiver. Alternatively, the field may indicate whether the closed caption/subtitle, etc. include a detailed parameter according to extension. When a corresponding region is extensible during presentation on a receiver, the field may have '1'. |
| scrolling_support | O | indicates whether scrolling of an original closed caption/subtitle region of the closed caption/subtitle is supported on a receiver. Alternatively, the field may indicate whether a detailed parameter according to thereto is included in a closed caption/subtitle. When scrolling is enabled, corresponding information may have '1'. |
| playout_speed | O | indicates play-out speed of an original closed caption/subtitle region of the closed caption/subtitle during presentation on a receiver. |
| extended_color_use | O | indicates whether the closed caption/subtitle uses a color value configured with 8 bits or more. |
| 3D_support | O | indicates whether a corresponding caption component supports 3D. When 3D is supported, the value may have a value of '1'. |
| 3D_disparity | O | indicates a 3D location of the front-most closed caption/subtitle of a caption based on a screen when the closed caption/subtitle supports 3D. When the 3D_disparity has a negative value, the information may indicate a degree of a forward protrusion effect based on a screen and, when the 3D_disparity has a positive value, this may be used in an opposite way. The information may explicitly indicate a front-most value (minimum disparity) of disparity of a plurality of closed caption regions in video. |

FIG. 44

| @schmeIdUri | description |
|---|---|
| urn:mpeg:dash:closed-caption-scroll:201x | Scheme identifier for closed caption/subtitle scrolling configuration scheme |

| @value | Use | Description |
|---|---|---|
| Scrolling_direction | OD default: "Bottom2Top" | indicates information on a direction in which a closed caption/subtitle region of the closed caption/subtitle is scrolled on a receiver. The information may have a value of "Top2Bottom", "Bottom2Top", "Left2Right", "Right2Left", and the like. |
| scrolling_type | OD default: "cell" | indicates a proceeding type of scrolling, etc. when the closed caption/subtitle region of the closed caption/subtitle supports scrolling on a receiver. For example, this may indicate whether scrolling is performed in units of lines (or cells) or is performed in units of pixels. |
| scrolling_amount | OD default: "1" | indicates a scrolling degree, etc. when the closed caption/subtitle information of the closed caption/subtitle supports scrolling on a receiver. This may be represented by a cell number, a pixel number, or the like. |
| scrolling_speed | O | indicates scrolling speed, etc. when an original closed caption/subtitle region of the closed caption/subtitle supports scrolling on a receiver. This may be represented in units of seconds (if necessary, this may be represented down to decimal places). |

| @schmeIdUri | description |
|---|---|
| urn:mpeg:dash:closed-caption-scale:201x | Scheme identifier for closed caption/subtitle scaling region configuration scheme |

| @value | Use | Description |
|---|---|---|
| scale_direction | O | indicates information on a direction in which a closed caption/subtitle region of a closed caption/subtitle is extensible. The information may have a value of "Top", "Bottom", "TomNBottom", "Left", "Right", "LeftNRight", "All", or the like. |
| scale_limit | O | indicates an extension limit degree or the like when the closed caption/subtitle region of the closed caption/subtitle is extensible. This may be represented by a cell number, a pixel number, or the like or may be represented by a percentage degree or the like. |

FIG. 45

| @schmeIdUri | description |
|---|---|
| urn:mpeg:dash:presentation_offset:201x | Scheme identifier for presentation offset of media essence (including closed caption/subtitle) |

| @value | Use | Description |
|---|---|---|
| Time_format | O | indicates format information of presentation timing offset. This may have a value of clock, offset, etc. |
| Time_value | O | includes presentation timing offset value. This may be represented in different forms according to the time_format.<br>- when the time_format is clock<br>hour: minute: second (seconds or frames of decimal places).<br>hours ":" minutes ":" seconds (fraction | ":" frames ("." sub-frames)?)?<br>- when the time_format is offset<br>- tick_rate: tick number based on tick_rate |

FIG. 46

| @value | Use |
|---|---|
| OETF_type | M |
| max_mastering_display_luminance | M |
| min_mastering_display_luminance | M |
| average_frame_luminance_level | M |
| max_frame_pixel_luminance | M |
| hdr_type_transition_flag | OD default:false |
| hdr_sdr_transition_flag | OD default:false |
| sdr_hdr_transition_flag | OD default:false |
| sdr_compatibility_flag | O | t32010

| Syntax | No. of Bits | Format |
|---|---|---|
| HDR_descriptor () { | | |
|     descriptor_tag | 8 | uimsbf |
|     descriptor_length | 8 | uimsbf |
|     OETF_type | 8 | uimsbf |
|     max_mastering_display_luminance | 32 | uimsbf |
|     min_mastering_display_luminance | 32 | bslbf |
|     average_frame_luminance_level | 32 | uimsbf |
|     max_frame_pixel_luminance | 32 | uimsbf |
|     reserved | 4 | '1111' |
|     hdr_type_transition_flag | 1 | bslbf |
|     hdr_sdr_transition_flag | 1 | bslbf |
|     sdr_hdr_transition_flag | 1 | bslbf |
|     sdr_compatibility_flag | 1 | bslbf |
| } | | | t32020

FIG. 47

| @ value | Use |
|---|---|
| HDR_Param_Set | O |
| OETF_type | O |
| max_mastering_display_luminance | O |
| min_mastering_display_luminance | O |
| average_frame_luminance_level | O |
| max_frame_pixel_luminance | O |
| hdr_type_transition_flag | OD default:false |
| hdr_sdr_transition_flag | OD default:false |
| sdr_hdr_transition_flag | OD default:false |
| sdr_compatibility_flag | O | d47010

| Syntax | No. of bits | Format |
|---|---|---|
| HDR_descriptor ( ) { | | |
| descriptor_tag | 8 | uimsbf |
| descriptor_length | 8 | uimsbf |
| hdr_param_set | 8 | uimsbf |
| reserved | 3 | '111' |
| hdr_type_transition_flag | 1 | bslbf |
| hdr_sdr_transition_flag | 1 | bslbf |
| sdr_hdr_transition_flag | 1 | bslbf |
| sdr_compatibility_flag | 1 | bslbf |
| hdr_config_flag | 1 | bslbf |
| if( hdr_config_flag ) { | | |
| OETF_type | 8 | uimsbf |
| max_mastering_display_luminance | 32 | uimsbf |
| min_mastering_display_luminance | 32 | uimsbf |
| average_frame_luminance_level | 32 | uimsbf |
| max_frame_pixel_luminance | 32 | uimsbf |
| } | | |
| } | | | d47020

FIG. 48 t33010

| @value | Use |
|---|---|
| contentColorGamutType | M |
| contentColorPrimaryRx | O |
| contentColorPrimaryRy | O |
| contentColorPrimaryGx | O |
| contentColorPrimaryGy | O |
| contentColorPrimaryBx | O |
| contentColorPrimaryBy | O |
| contentWhitePx | O |
| contentWhitePy | O |
| contentWCGTransition | OD default:false |
| contentSCGCompatibility | OD default:false | t33020

| @value | Use |
|---|---|
| containerColorGamutType | M |
| containerColorPrimaryRx | O |
| containerColorPrimaryRy | O |
| containerColorPrimaryGx | O |
| containerColorPrimaryGy | O |
| containerColorPrimaryBx | O |
| containerColorPrimaryBy | O |
| containerWhitePx | O |
| containerWhitePy | O |
| containerWCGTransition | OD default:false |
| containerSCGCompatibility | OD default:false | t33030

| Syntax | No. of Bits | Format |
|---|---|---|
| WCG_descriptor () { | | |
|   descriptor_tag | 8 | uimsbf |
|   descriptor_length | 8 | uimsbf |
|   color_gamut_type | 8 | uimsbf |
|   reserved | 2 | '11' |
|   color_space_transition_flag | 1 | bslbf |
|   wcg_scg_transition_flag | 1 | bslbf |
|   scg_wcg_transition_flag | 1 | bslbf |
|   scg_compatibility_flag | 1 | bslbf |
|   color_primary_flag | 1 | bslbf |
|   content_wcg_flag | 1 | bslbf |
|   if(color_primary_flag ==1){ | | |
|     color_primaryRx | 32 | uimsbf |
|     color_primaryRy | 32 | uimsbf |
|     color_primaryGx | 32 | uimsbf |
|     color_primaryGy | 32 | uimsbf |
|     color_primaryBx | 32 | uimsbf |
|     color_primaryBy | 32 | uimsbf |
|     color_primaryWhitePx | 32 | uimsbf |
|     color_primaryWhitePy | 32 | uimsbf |
|   } | | |
|   if(content_wcg_flag ==1){ | | |
|     content_color_gamut_type | 8 | uimsbf |
|     reserved | 2 | '11' |
|     content_color_space_transition_flag | 1 | bslbf |
|     content_wcg_scg_transition_flag | 1 | bslbf |
|     content_scg_wcg_transition_flag | 1 | bslbf |
|     content_scg_compatibility_flag | 1 | bslbf |
|     content_color_primary_flag | 1 | bslbf |
|     content_content_wcg_flag | 1 | bslbf |
|     if(content_color_primary_flag ==1){ | | |
|       content_color_primaryRx | 32 | uimsbf |
|       content_color_primaryRy | 32 | uimsbf |
|       content_color_primaryGx | 32 | uimsbf |
|       content_color_primaryGy | 32 | uimsbf |
|       content_color_primaryBx | 32 | uimsbf |
|       content_color_primaryBy | 32 | uimsbf |
|       content_color_primaryWhitePx | 32 | uimsbf |
|       content_color_primaryWhitePy | 32 | uimsbf |
|     } | | |
|   } | | |
| } | | |

FIG. 49 t34010

| @value | Use |
|---|---|
| SFRCompatibility | OD default:false |
| SFR_HFR_Transition | OD default:false |
| HFR_SFR_Transition | OD default:false | t34020

| @value | Use |
|---|---|
| PullDownType | M |
| PullDownTransition | OD default:false |
| OriginalFrameRate | O |
| OriginalScanType | O | t34030

| Syntax | No. of Bits | Format |
|---|---|---|
| HFR_descriptor () { | | |
|     descriptor_tag | 8 | uimsbf |
|     descriptor_length | 8 | uimsbf |
|     reserved | 4 | '1111' |
|     sfr_compatibility_flag | 1 | bslbf |
|     sfr_hfr_transition_flag | 1 | bslbf |
|     hfr_sfr_transition_flag | 1 | bslbf |
|     pull_down_recovery_flag | 1 | bslbf |
|     if(pull_down_recovery_flag==1){ | | |
|         pull_down_type | 8 | uimsbf |
|         reserved | 5 | '1111' |
|         pull_down_transition_flag | 1 | bslbf |
|         original_framerate_flag | 1 | bslbf |
|         original_scane_type_flag | 1 | bslbf |
|         if(original_framerate_flag == 1){ | | |
|             original_framerate | 8 | uimsbf |
|         } | | |
|         if(original_scan_type_flag == 1){ | | |
|             original_scan_type | 8 | uimsbf |
|         } | | |
|     } | | |
| } | | |

FIG. 50 t39010

| @value | Use |
|---|---|
| codec | M |
| profile | O |
| dialog_enhancement_enabled | O |
| channel_mode | O |
| object_enabled | O |
| HOA_enabled | O |
| SAOC_enabled | O |
| referenceLayout | O |
| targetLayout | O |
| Decoder_configuration | O | t39020

| Syntax | No. of Bits | Format |
|---|---|---|
| 3d_audio_descriptor() { | | |
|   descriptor_tag | 8 | uimsbf |
|   descriptor_length | 8 | uimsbf |
|   descriptor_tag_extension | 8 | uimsbf |
|   codec | 8 | uimsbf |
|   ProfileLevelIndication | 8 | uimsbf |
|   config_flag | 1 | bslbf |
|   referenceLayout_flag | 1 | bslbf |
|   targetLayout_flag | 1 | bslbf |
|   reserved_future_use | 6 | '111111' |
|   if(config_flag==1) { | | |
|     dialog_enhancement_enabled | 1 | uimsbf |
|     channel_mode | 2 | uimsbf |
|     reserved_future_use | 2 | '111' |
|     object_enabled | 1 | uimsbf |
|     HOA_enabled | 1 | uimsbf |
|     SAOC_enabled | 1 | uimsbf |
|   } | | |
|   if(targetLayout_flag==1) { | | |
|     referenceLayout | 8 | uimsbf |
|   } | | |
|   if(targetLayout_flag==1) { | | |
|     targetLayout | 8 | uimsbf |
|   } | | |
|   ConfigLength /*N*/ | 16 | uimsbf |
|   if(codec==1) { /*AC-4*/ | | |
|     ac4_dsi_byte | 8*N | uimsbf |
|   } else if(codec==2) { /*MPEG-H*/ | | |
|     mpegh3daConfig_bytes() | 8*N | uimsbf |
|   } | | |
|   for (i=0;i<N;i++) { | | |
|     additional_info_byte | 8 | bslbf |
|   } | | |
| } | | |

FIG. 51 t40010

| @value | Use |
|---|---|
| ac4_dialog_enhancement_enabled | 0 |
| ac4_channel_mode | 0 |
| ac4_object_enabled | 0 |
| ac4_HOA_enabled | 0 |
| referenceLayout | 0 |
| targetLayout | 0 |
| ac4_dsi_byte | 0 | t40020

| Syntax | No. of Bits | Format |
|---|---|---|
| ac-4_descriptor() { | | |
|   descriptor_tag | 8 | uimsbf |
|   descriptor_length | 8 | uimsbf |
|   descriptor_tag_extension | 8 | uimsbf |
|   ac4_config_flag | 1 | uimsbf |
|   ac4_toc_flag | 1 | uimsbf |
|   referenceLayout_flag | 1 | bslbf |
|   targetLayout_flag | 1 | bslbf |
|   reserved_future_use (see note) | 4 | bslbf |
|   if (ac4_config_flag == 1) { | | |
|     ac4_dialog_enhancement_enabled | 1 | uimsbf |
|     ac4_channel_mode | 2 | uimsbf |
|     reserved_future_use (see note) | 3 | bslbf |
|     ac4_object_enabled | 1 | uimsbf |
|     ac4_HOA_enabled | 1 | uimsbf |
|   } | | |
|   if (ac4_toc_flag == 1) { | | |
|     ac4_toc_len | 8 | uimsbf |
|     for (i=0;i<N;i++) { | | |
|       ac4_dsi_byte | 8 | bslbf |
|     } | | |
|   } | | |
|   if (referenceLayout_flag == 1) { | | |
|     referenceLayout | 8 | uimsbf |
|   } | | |
|   if (targetLayout_flag == 1) { | | |
|     targetLayout | 8 | uimsbf |
|   } | | |
|   for (i=0;i<N;i++) { | | |
|     additional_info_byte | 8 | bslbf |
|   } | | |
| } | | |

FIG. 52 t41010

| @value | Use |
|---|---|
| profile | M |
| dialog_enhancement_enabled | O |
| channel_mode | O |
| object_enabled | O |
| HOA_enabled | O |
| SAOC_enabled | O |
| referenceLayout | O |
| targetLayout | O |
| Decoder_configuration | O | t41020

| Syntax | No. of Bits | Format |
|---|---|---|
| mpeg_h_descriptor() { | | |
|   descriptor_tag | 8 | uimsbf |
|   descriptor_length | 8 | uimsbf |
|   descriptor_tag_extension | 8 | uimsbf |
|   mpegh3daProfileLevelIndication | 8 | uimsbf |
|   mpegh_config_flag | 1 | bslbf |
|   referenceLayout_flag | 1 | bslbf |
|   targetLayout_flag | 1 | bslbf |
|   reserved_future_use | 6 | '111111' |
|   if(mpegh_config_flag== 1) { | | |
|     dialog_enhancement_enabled | 1 | uimsbf |
|     channel_mode | 2 | uimsbf |
|     reserved_future_use | 2 | '11' |
|     object_enabled | 1 | uimsbf |
|     HOA_enabled | 1 | uimsbf |
|     SAOC_enabled | 1 | uimsbf |
|   } | | |
|   if(referenceLayout_flag== 1) { | | |
|     referenceLayout | 8 | uimsbf |
|   } | | |
|   if(targetLayout_flag== 1) { | | |
|     targetLayout | 8 | uimsbf |
|   } | | |
|   mpegh3daConfigLength /*N*/ | 16 | uimsbf |
|   mpegh3daConfig_bytes() | 8*N | uimsbf |
|   for (i=0;i<N;i++) { | | |
|     additional_info_byte | 8 | bslbf |
|   } | | |
| } | | |

FIG. 53 d33010

| Syntax | No. of Bits | Format |
|---|---|---|
| view_position_descriptor () { | | |
|     descriptor_tag | 8 | uimsbf |
|     descriptor_length | 8 | uimsbf |
|     reserved | 7 | '1111111' |
|     right_view_flag | 1 | bslbf |
| } | | | d33020

| Syntax | No. of Bits | Format |
|---|---|---|
| view_position2_descriptor () { | | |
|     descriptor_tag | 8 | uimsbf |
|     descriptor_length | 8 | uimsbf |
|     num_of_views | 8 | uimsbf |
|     for (i=0; i<=num_of_views; i++) | | |
|         view_position | | |
| } | | |

FIG. 54

| Syntax | No. of bits | format |
|---|---|---|
| closed_caption_descriptor() { | | |
|     descriptor_tag | 8 | uimsbf |
|     descriptor_length | 8 | uimsbf |
|     caption_lang | 8*3 | uimsbf |
|     caption_codec | 4 | uimsbf |
|     target_accessbility | 4 | uimsbf |
|     aspect_ratio | 4 | uimsbf |
|     alternative_aspect_ratio_flag | 1 | bslbf |
|     url_flag | 1 | bslbf |
|     3d_supported | 1 | bslbf |
|     scrolling_supported | 1 | bslbf |
|     scaling_supported | 1 | bslbf |
|     playout_speed_flag | 1 | bslbf |
|     extended_color_use | 1 | bslbf |
|     reserved | 1 | '1' |
|     If(caption_codec == 0x02){ | | |
|     caption_service_number/*m*/ | 3 | uimsbf |
|     } | | |
|     if(alternative_aspect_ratio_flag){ | | |
|         alternative_aspect_ratio | 8 | uimsbf |
|     } | | |
|     if(url_flag){ | | |
|         URL_length | 8 | uimsbf |
|         URL_text() | var | |
|     } | | |
|     if(3d_supported){ | | |
|         min_disparity | 16 | uimsbf |
|     } | | |
|     if(scrolling_supported){ | | |
|         scroll_direction | 4 | uimsbf |
|         scroll_type | 4 | uimsbf |
|         Scroll_amount | 16 | uimsbf |
|         scroll_speed | 32 | uimsbf |
|     } | | |
|     if(scaling_supported){ | | |
|         scale_direction | 4 | uimsbf |
|         scale_limit_format | 4 | uimsbf |
|         scale_limit_value | 16 | uimsbf |
|     } | | |
|     if(playout_speed_flag){ | | |
|         playout_speed | 32 | uimsbf |
|     } | | |
| } | | |

FIG. 55

| Syntax | No. of Bits | Format |
|---|---|---|
| Presentation_timing_offset_descriptor () { | | |
|     descriptor_tag | 8 | uimsbf |
|     descriptor_length | 8 | uimsbf |
|     timestamp_format | 4 | uimsbf |
|     reserved | 4 | '1111' |
|     if(timestamp_format ==0x00){ | | |
|         ticks_second | 32 | uimsbf |
|         media_ticks | 32 | uimsbf |
|     } else if(timestamp_format == 0x01){ | | |
|         media_clock_time | 32 | uimsbf |
|     } else if ( timestamp_format ==0x02 \|\| | | |
|         timestamp_format ==0x03 \|\| | | |
|         timestamp_format ==0x04) { | | |
|         timestamp | 32 or 64 | uimsbf |
|     }else { | | |
|         data_bytes () | | |
|     } | | |
| } | | |

BROADCAST SIGNAL TRANSMISSION APPARATUS, BROADCAST SIGNAL RECEPTION APPARATUS, BROADCAST SIGNAL TRANSMISSION METHOD AND BROADCAST SIGNAL RECEPTION METHOD

CROSS REFERENCE TO RELATED APPLICATIONS

This application is the National Phase of PCT International Application No. PCT/KR2016/008154, filed on Jul. 26, 2016, which claims priority under 35 U.S.C. 119(e) to U.S. Provisional Application No. 62/197,574, filed on Jul. 28, 2015 and No. 62/198,113, filed on Jul. 28, 2015, all of which are hereby expressly incorporated by reference into the present application.

TECHNICAL FIELD

The present invention relates to an apparatus for transmitting a broadcast signal, an apparatus for receiving a broadcast signal and methods for transmitting and receiving a broadcast signal.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

A digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

Technical Solution

The present invention provides a system capable of effectively supporting future broadcast services in an environment supporting future hybrid broadcasting using terrestrial broadcast networks and the Internet and related signaling methods.

Advantageous Effects

The present invention can effectively support future broadcast services in an environment supporting future hybrid broadcasting using terrestrial broadcast networks and the Internet.

The present invention can support a method for providing detailed signaling with respect to service components included in a broadcast service.

The present invention can support a method of efficiently providing a variety of information such as 3D, caption, WCG and HDR in a method of delivering a broadcast service.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram showing a protocol stack according to an embodiment of the present invention;

FIG. 3 is a diagram showing a low level signaling (LLS) table and a service list table (SLT) according to one embodiment of the present invention;

FIG. 4 is a diagram showing a USBD and an S-TSID delivered through ROUTE according to one embodiment of the present invention;

FIG. 5 is a diagram showing a USBD delivered through MMT according to one embodiment of the present invention;

FIG. 6 is a diagram showing link layer operation according to one embodiment of the present invention;

FIG. 7 is a diagram showing a link mapping table (LMT) according to one embodiment of the present invention;

FIG. 9 is a diagram showing a writing operation of a time interleaver according to an embodiment of the present invention;

FIG. 15 is a diagram showing an HDR configuration box for providing HDR information according to an embodiment of the present invention;

FIG. 16 is a diagram showing an HDR configuration box for providing HDR information according to another embodiment of the present invention;

FIG. 17 is a diagram showing a method of defining HDR information in a tkhd box according to an embodiment of the present invention;

FIG. 18 is a diagram showing a method of defining HDR information in a vmhd box according to an embodiment of the present invention;

FIG. 19 is a diagram showing a method of defining HDR information in a trex box according to an embodiment of the present invention;

FIG. 20 is a diagram showing a method of defining HDR information in a tfhd box according to an embodiment of the present invention;

FIG. 21 is a diagram showing a method of defining HDR information in a trun box according to an embodiment of the present invention;

FIG. 22 is a diagram showing a method of defining HDR information in various types of flags, sample group entries or sample entries according to an embodiment of the present invention;

FIG. 23 is a diagram showing a method of defining HDR information in an HEVC sample entry, an HEVC configuration box or an HEVC decoder configuration record according to an embodiment of the present invention;

FIG. 24 is a diagram showing a method of defining an HDR information SEI box to store/deliver HDR information according to an embodiment of the present invention;

FIG. 29 is a diagram showing a portion of USBD according to another embodiment of the present invention;

FIG. 30 is a diagram showing a portion of USBD according to another embodiment of the present invention;

FIG. 31 is a diagram showing capability codes according to an embodiment of the present invention;

FIG. 32 is a diagram showing a part of an MP table according to an embodiment of the present invention;

FIG. 33 is a diagram showing an asset group descriptor according to an embodiment of the present invention;

FIG. 34 is a diagram showing accessibility information according to an embodiment of the present invention;

FIG. 36 is a diagram showing component property information according to an embodiment of the present invention;

FIG. 39 is a diagram showing a device capabilities information (DCI) table as a signaling table according to an embodiment of the present invention;

FIG. 40 is a diagram showing HEVC video component description information according to an embodiment of the present invention;

FIG. 41 is a diagram showing HEVC timing & HRD information according to an embodiment of the present invention;

FIG. 42 is a diagram showing caption information according to an embodiment of the present invention;

FIG. 43 is a diagram showing caption information according to another embodiment of the present invention;

FIG. 44 is a diagram showing detailed information of caption related information according to an embodiment of the present invention;

FIG. 45 is a diagram showing detailed information of caption related information according to an embodiment of the present invention;

FIG. 46 is a diagram showing HDR information according to an embodiment of the present invention;

FIG. 47 is a diagram showing HDR information according to another embodiment of the present invention;

FIG. 48 is a diagram showing WCG information according to an embodiment of the present invention;

FIG. 49 is a diagram showing HFR information/pull down information according to an embodiment of the present invention;

FIG. 50 is a diagram showing 3D audio information according to an embodiment of the present invention;

FIG. 51 is a diagram showing AC-4 audio information according to an embodiment of the present invention;

FIG. 52 is a diagram showing MPEG-H audio information according to an embodiment of the present invention;

FIG. 53 illustrates a 3D service and multiview service related signaling information according to an embodiment of the present invention;

FIG. 54 is a diagram showing a method of signaling caption related information according to another embodiment of the present invention;

FIG. 55 is a diagram showing a presentation timing offset descriptor according to an embodiment of the present invention;

BEST MODE

Figure 2:
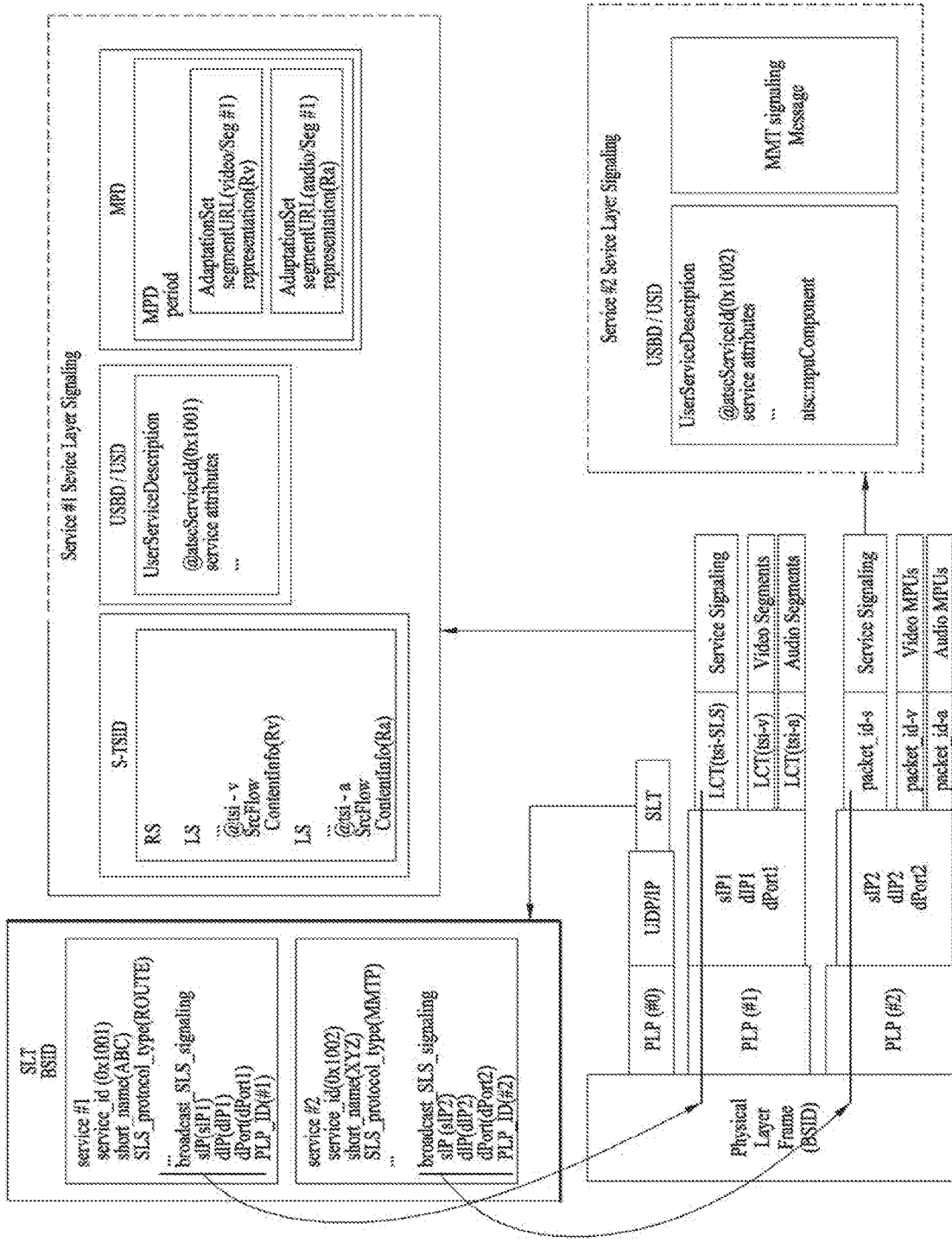
FIG. 2 is a diagram showing a service discovery procedure according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
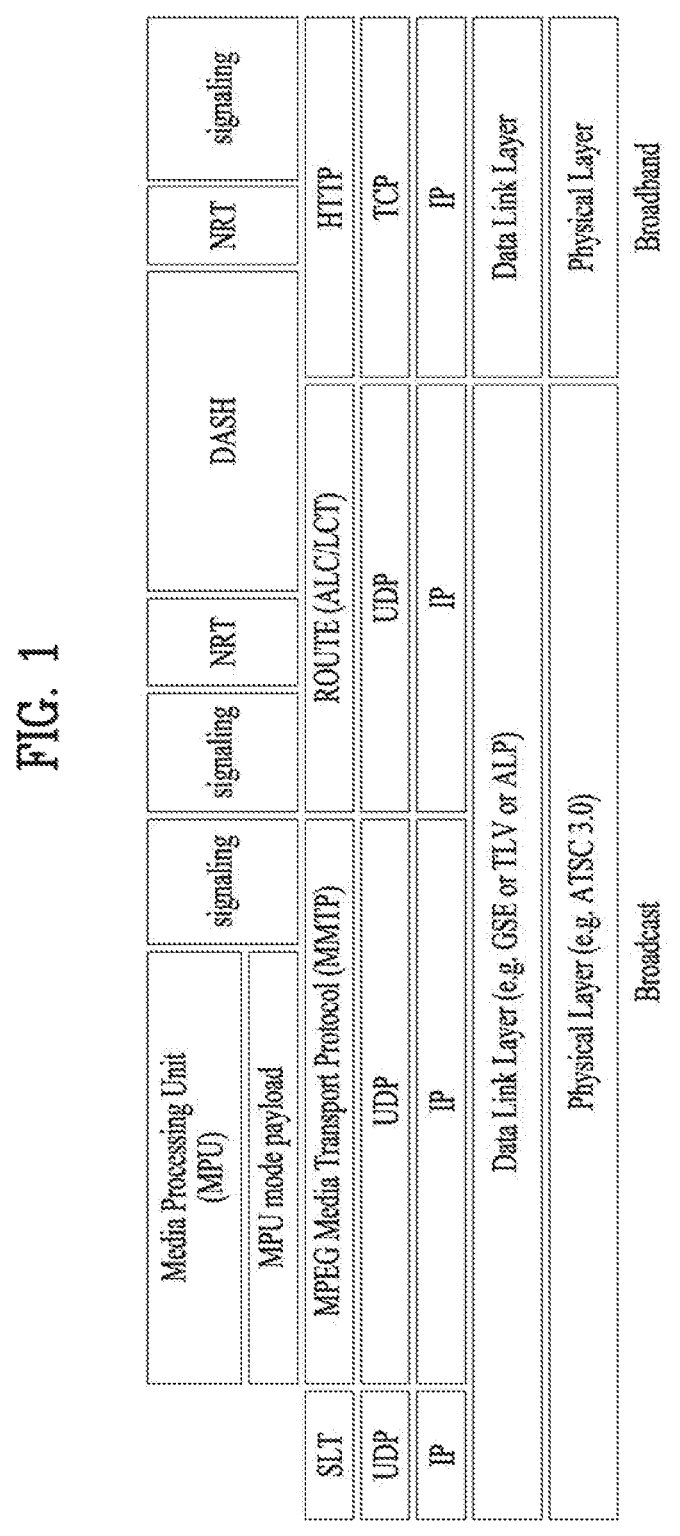

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMIP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id_field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @ slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @slpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the IVIPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fulIMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may include a header compressor/decompressor and/or an adaptation module. The IP header compressor (RoHC compressor) may reduce the size of each IP packet based on a RoHC method. Then, adaptation module may extract context information and generate signaling information from each packet stream. A receiver may parse signaling information related to a corresponding packet stream and attach the context information to the packet stream. The RoHC decompressor may recover a packet header to reconfigure an original IP packet. Hereinafter, IP header compression may refer to only IP header compressor via header compressor and may be a concept that combines IP header compression and the adaptation procedure by the adaptation module. This may be the same as in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may construct link layer signaling using context information and/or configuration parameters. The adaptation function may periodically transmit link layer signaling through each physical frame using a previous configuration parameter and/or context information.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT may be transmitted whenever context information is changed. In some embodiments, the RDT may be transmitted in every physical frame. To transmit the RDT in every physical frame, a previous RDT may be re-used.

The receiver may select a first PLP and first acquire signaling information of the SLT, the RDT, etc., prior to acquisition of a packet stream. Upon acquring the signaling information, the receiver may combine the information to acquire mapping of service—IP information—context information—PLP. That is, the receiver may recognize IP streams through which a service is transmitted, IP streams transmitted through a PLP, and so on and acquire corresponding context information of the PLPs. The receiver may select a PLP for delivery of a specific packet stream and decode the PLP. The adaptation module may parse the context information and combine the context information with the compressed packets. Thereby, the packet stream may be recovered and transmitted to the RoHC de compressor. Then, decompression may be started. In this case, the receiver may detect an IR packet and start decompression from a first received IR packet according to an adaptation mode (mode 1), may detect an IR-DYN packet and start decompression from a first received IR-DYN packet (mode 2), or may start decompression from any general compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may be referred to as multicast. Information on IP streams or transport sessions transmitted through one PLP may be acquired through the LMT. In contrast, information on through which PLP a specific transport session is delivered may be acquired.

The LMT may be transmitted through any PLP identified to deliver the LLS. Here, the PLP for delivering the LLS may be identified by an LLS flag of L1 detail signaling information of a physical layer. The LLS flag may be a flag field indicating whether the LLS is transmitted through a corresponding PLP with respect to each PLP. Here, the L1 detail signaling information may be correspond to PLS2 data which will be described later.

That is, the LMT may also be transmitted through the same PLP along with the LLS. Each LMT may describe mapping between PLPs and IP address/port as described above. As described above, the LLS may include an SLT and, in this regard, the IP address/ports described by the LMT may be any IP address/ports related to any service, described by the SLT transmitted through the PLP such as a corresponding LMT.

In some embodiments, the PLP identifier infottnation in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, as described above, the LMT may describe PLPs of all IP addresses/ports related to all service described by the SLT transmitted therewith using a PLP loop.

The signaling_type field may indicate the type of signaling information delivered by the table. The value of signaling_type field for the LMT may be set to 0x01. The signaling_type field may signaling type field may be omitted. The PLP_ID field may identify a target PLP to be described. When the PLP loop is used, each PLP_ID field may identify each target PLP. Fields from the PLP_ID field may be included in the PLP loop. Here, the below-described PLP_ID field may be an identifier of one PLP of the PLP loop and the following fields may be fields corresponding to the corresponding PLP.

The num_session field may indicate the number of higher layer sessions delivered through the PLP identified by the PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field, and/or a context_id field.

The src_IP add field, the dst_IP_add field, the src_UDP_port field, and the dst_UDP_port field may indicate the source IP address, the destination IP address, the source UDP port and the destination UDP port of the transport session among the higher layer sessions delivered through the PLP identified by the PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. When header compression is applied (compressed_flag=1), the RDT may be present and the PLP ID field of the RDT may have the same value as the corresponding PLP_ID field related to the present compressed_flag field.

The SID field may indicate a sub stream ID (SID) of link layer packets for delivering a corresponding transfer session. The link layer packets may include the SID having the same value as the present SID field in the optional header. Thereby, the receiver may filter link layer packets using information of the LMT and SID information of a link layer packet header without parsing of all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
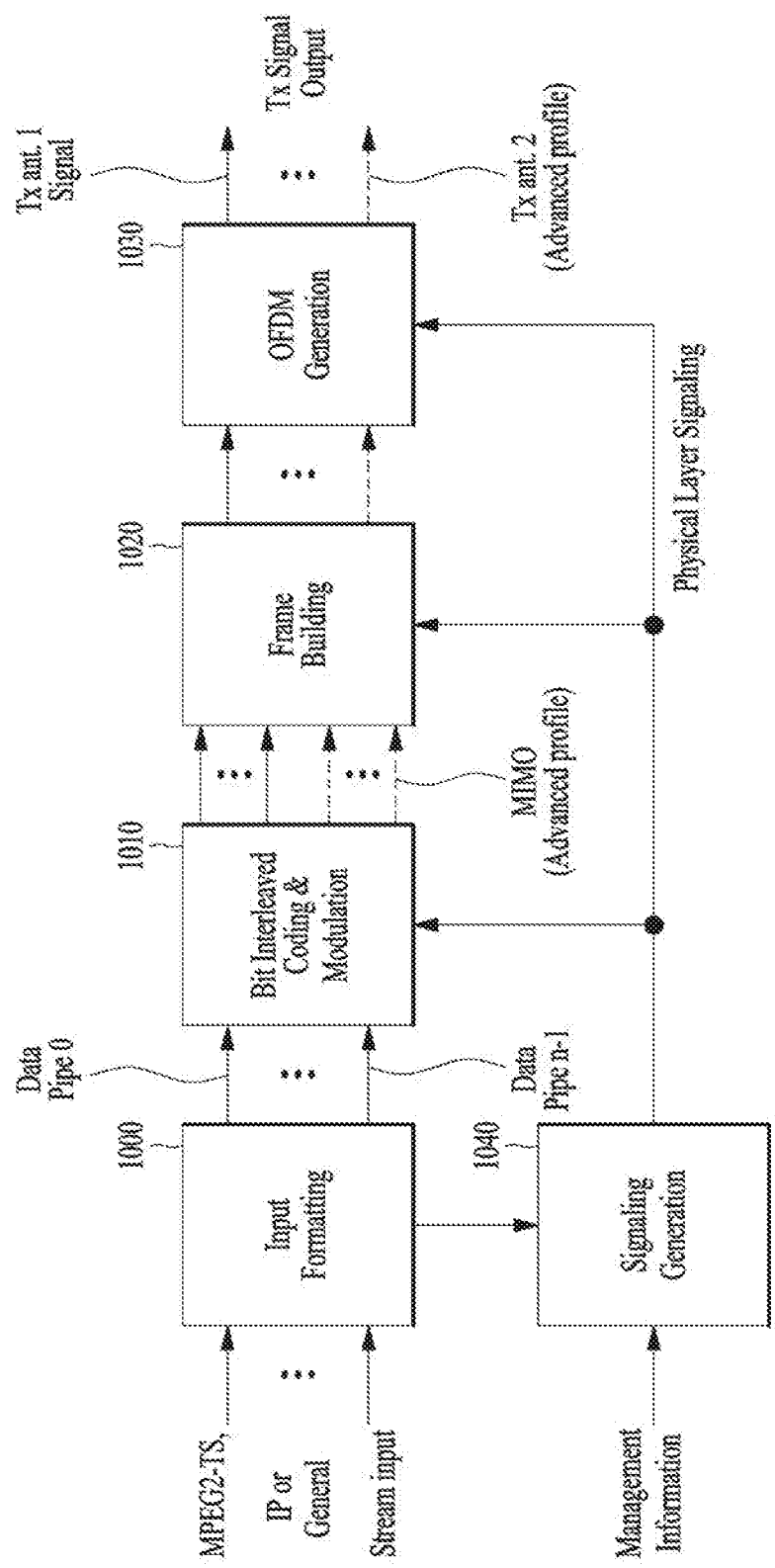
FIG. 8 is a diagram showing a structure of a broadcast signal transmission device of a next-generation broadcast service according to an embodiment of the present invention.

FIG. 8 is a diagram showing a structure of a broadcast signal transmission device of a next-generation broadcast service according to an embodiment of the present invention.

The broadcast signal transmission device of the next-generation broadcast service according to an embodiment of the present invention may include an input format block 1000, a bit interleaved coding & modulation (BICM) block 1010, a frame building block 1020, an orthogonal frequency division multiplexing (OFDM) generation block 1030, and a signaling generation block 1040. An operation of each block of the broadcast signal transmission device will be described.

According to an embodiment of the present invention, input data may use IP stream/packet and MPEG2-TS as main input format and other stream types may be handled as a general stream.

The input format block 1000 may demultiplex each input stream using one or more data pipes to which independent coding and modulation are applied. The data pipe may be a basic unit for robustness control and may affect quality of service (QoS). One or more services or service components may affect one data pipe. The data pipe may be a logical channel in a physical layer for delivering service data or metadata for delivering one or more services or service components.

Since QoS is dependent upon the characteristics of a service provided by the broadcast signal transmission device of the next-generation broadcast service according to an embodiment of the present invention, data corresponding to each service needs to be processed via different methods.

The BICM block 1010 may include a processing block applied to a profile (or system) to which MIMO is not applied and/or a processing block of a profile (or system) to which MIMO is applied and may include a plurality of processing blocks for processing each data pipe.

The processing block of the BICM block to which MIMO is not applied may include a data FEC encoder, a bit interleaver, a constellation mapper, a signal space diversity (SSD) encoding block, and a time interleaver. The processing block of the BICM block to which MIMO is applied is different from the processing block of the BICM to which MIMO is not applied in that a cell word demultiplexer and an MIMO encoding block are further included.

The data FEC encoder may perform FEC encoding on an input BBF to generate a FECBLOCK procedure using external coding (BCH) and internal coding (LDPC). The external coding (BCH) may be a selective coding method.

The bit interleaver may interleave output of the data FEC encoder to achieve optimized performance using a combination of the LDPC code and a modulation method. The constellation mapper may modulate cell word from a bit interleaver or a cell word demultiplexer using QPSK, QAM-16, irregular QAM (NUQ-64, NUQ-256, NUQ-1024), or irregular constellation (NUC-16, NUC-64, NUC-256, NUC-1024) and provide a power-normalized constellation point. NUQ has an arbitrary type but QAM-16 and NUQ have a square shape. All of the NUQ and the NUC may be particularly defined with respect to each code rate and signaled by parameter DP_MOD of PLS2 data. The time interleaver may be operated at a data pipe level. A parameter of the time interleaving may be differently set with respect to each data pipe.

The time interleaver according to the present invention may be positioned between the BICM chain and the frame builder. In this case, the time interlever according to the present invention may selectively use a convolution interleaver (CI) and a block interleaver (BI) according to a physical layer pipe (PLP) mode or may use all. The PLP according to an embodiment of the present invention may be a physical path used using the same concept as the aforementioned DP and its term may be changed according to designer intention. The PLP mode according to an embodiment of the present invention may include a single PLP mode or a multiple PLP mode according to the number of PLPs processed by the broadcast signal transmitter or the broadcast signal transmission device. Time interleaving using different time interleaving methods according to a PLP mode may be referred to as hybrid time interleaving.

A hybrid time interleaver may include a block interleaver (BI) and a convolution interleaver (CI). In the case of PLP_NUM=1, the BI may not be applied (BI off) and only the CI may be applied. In the case of PLP_NUM>1, both the BI and the CI may be applied (BI on). The structure and operation of the CI applied in the case of PLP_NUM>1 may be different from those of the CI applied in the case of PLP_NUM=1. The hybrid time interleaver may perform an operation corresponding to a reverse operation of the aforementioned hybrid time interleaver.

The cell word demultiplexer may be used to divide a single cell word stream into a dual cell word stream for MIMO processing. The MIMO encoding block may process output of the cell word demultiplexer using a MIMO encoding method. The MIMO encoding method according to the present invention may be defined as full-rate spatial multiplexing (FR-SM) for providing increase in capacity via relatively low increase in complexity at a receiver side. MIMO processing may be applied at a data pipe level. When a pair of constellation mapper outputs, NUQ $e_{1,i}$ and $e_{2,i}$ is input to a MIMO encoder, a pair of MIMO encoder outputs, g1,i and g2,i may be transmitted by the same carrier k and OFDM symbol l of each transmission antenna.

The frame building block 1020 may map a data cell of an input data pipe in one frame to an OFDM symbol and perform frequency interleaving for frequency domain diversity.

According to an embodiment of the present invention, a frame may be divided into a preamble, one or more frame signaling symbols (FSS), and a normal data symbol. The preamble may be a special symbol for providing a combination of basic transmission parameters for effective transmission and reception of a signal. The preamble may signal a basic transmission parameter and a transmission type of a frame. In particular, the preamble may indicate whether an emergency alert service (EAS) is currently provided in a current frame. The objective of the FSS may be to transmit PLS data. For rapid synchronization and channel estimation and rapid decoding of PLS data, the FSS may have a pipe pattern with higher density than a normal data symbol.

The frame building block may include a delay compensation block for adjusting timing between a data pipe and corresponding PLS data to ensure co-time between a data pipe and corresponding PLS data at a transmitting side, a cell mapper for mapping a PLS, a data pipe, an auxiliary stream, a dummy stream, and so on to an active carrier of an OFDM symbol in a frame, and a frequency interleaver.

The frequency interleaver may randomly interleave a data cell received from the cell mapper to provide frequency diversity. The frequency interleaver may operate with respect to data corresponding to an OFDM symbol pair including two sequential OFDM symbols or data corresponding to one OFDM symbol using different interleaving seed orders in order to acquire maximum interleaving gain in a single frame.

The OFDM generation block 1030 may modulate an OFDM carrier by the cell generated by the frame building block, insert a pilot, and generate a time domain signal for transmission. The corresponding block may sequentially insert guard intervals and may apply PAPR reduction processing to generate a last RF signal.

The signaling generation block 1040 may generate physical layer signaling information used in an operation of each functional block. The signaling information according to an embodiment of the present invention may include PLS data. The PLS may provide an element for connecting a receiver to a physical layer data pipe. The PLS data may include PLS1 data and PLS2 data.

The PLS1 data may be a first combination of PLS data transmitted to FSS in a frame with fixed size, coding, and modulation for transmitting basic information on a system as well as a parameter required to data PLS2 data. The PLS1 data may provide a basic transmission parameter including a parameter required to receive and decode PLS2 data. The PLS2 data may be a second combination of PLP data transmitted to FSS for transmitting more detailed PLS data of a data pipe and a system. PLS2 signaling may further include two types of parameters of PLS2 static data (PLS2-STAT data) and PLS2 dynamic data (PLS2-DYN data). The PLS2 static data may be PLS2 data that is static during duration of a frame group and the PLS2 dynamic data may be PLS2 data that is dynamically changed every frame.

The PLS2 data may include FIC_FLAG information. A fast information channel (FIC) may be a dedicated channel for transmitting cross-layer information for enabling fast service acquisition and channel scanning. The FIC_FLAG information may indicate whether a fast information channel (FIC) is used in a current frame group via a 1-bit field. When a value of the corresponding field is set to 1, the FIC may be provided in the current frame. When a value of the corresponding field is set to 0, the FIC may not be transmitted in the current frame. The BICM block 1010 may include a BICM block for protecting PLS data. The BICM block for protecting the PLS data may include a PLS FEC encoder, a bit interleaver, and a constellation mapper.

The PLS FEC encoder may include a scrambler for scrambling PLS1 data and PLS2 data, a BCH encoding/zero inserting block for performing external encoding on the scrambled PLS 1 and 2 data using a BCH code shortened for PLS protection and inserting a zero bit after BCH encoding, a LDPC encoding block for performing encoding using an LDPC code, and an LDPC parity puncturing block. Only the PLS1 data may be permutated before an output bit of zero insertion is LDPC-encoded. The bit interleaver may interleave each of the shortened and punctured PLS1 data and PLS2 data, and the constellation mapper may map the bit-interleaved PLS1 data and PLS2 data to constellation.

A broadcast signal reception device of a next-generation broadcast service according to an embodiment of the present invention may perform a reverse operation of the broadcast signal transmission device of the next-generation broadcast service that has been described with reference to FIG. 8.

The broadcast signal reception device of a next-generation broadcast service according to an embodiment of the present invention may include a synchronization & demodulation module for performing demodulation corresponding to a reverse operation performed by the broadcast signal transmission device, a frame parsing module for parsing an input signal frame to extract data transmitted by a service selected by a user, a demapping & decoding module for converting an input signal into bit region data, deinterleaving bit region data as necessary, performing demapping on mapping applied for transmission efficiency, and correcting error that occurs in a transmission channel for decoding, an output processor for performing a reverse operation of various compression/signal processing procedures applied by the broadcast signal transmission device, and a signaling decoding module for acquiring and processing PLS information from the signal demodulated by the synchronization & demodulation module. The frame parsing module, the demapping & decoding module, and the output processor may perform the functions using the PLS data output from the signaling decoding module.

Hereinafter, the timer interleaver will be described. A time interleaving group according to an embodiment of the present invention may be directly mapped to one frame or may be spread over $P_I$ frames. In addition, each time interleaving group may be divided into one or more ($N_{TI}$) time interleaving blocks. Here, each time interleaving block may correspond to one use of a time interleaver memory. A time interleaving block in the time interleaving group may include different numbers of XFECBLOCK. In general, the time interleaver may also function as a buffer with respect to data pipe data prior to a frame generation procedure.

The time interleaver according to an embodiment of the present invention may be a twisted row-column block interleaver. The twisted row-column block interleaver according to an embodiment of the present invention may write a first XFECBLOCK in a first column of the time interleaving memory, write a second XFECBLOCK in a next column, and write the remaining XFECBLOCKs in the time interleaving block in the same manner. In an interleaving array, a cell may be read in a diagonal direction to a last row from a first row (a leftmost column as a start column is read along a row in a right direction). In this case, to achieve single memory deinterleaving at a receiver side irrespective of the number of XFECBLOCK in the time interleaving block, the interleaving array for the twisted row-column block interleaver may insert a virtual XFECBLOCK into the time interleaving memory. In this case, to achieve single memory deinterleaving at a receiver side, the virtual XFECBLOCK needs to be inserted into another frontmost XFECBLOCK.

Figure 9:
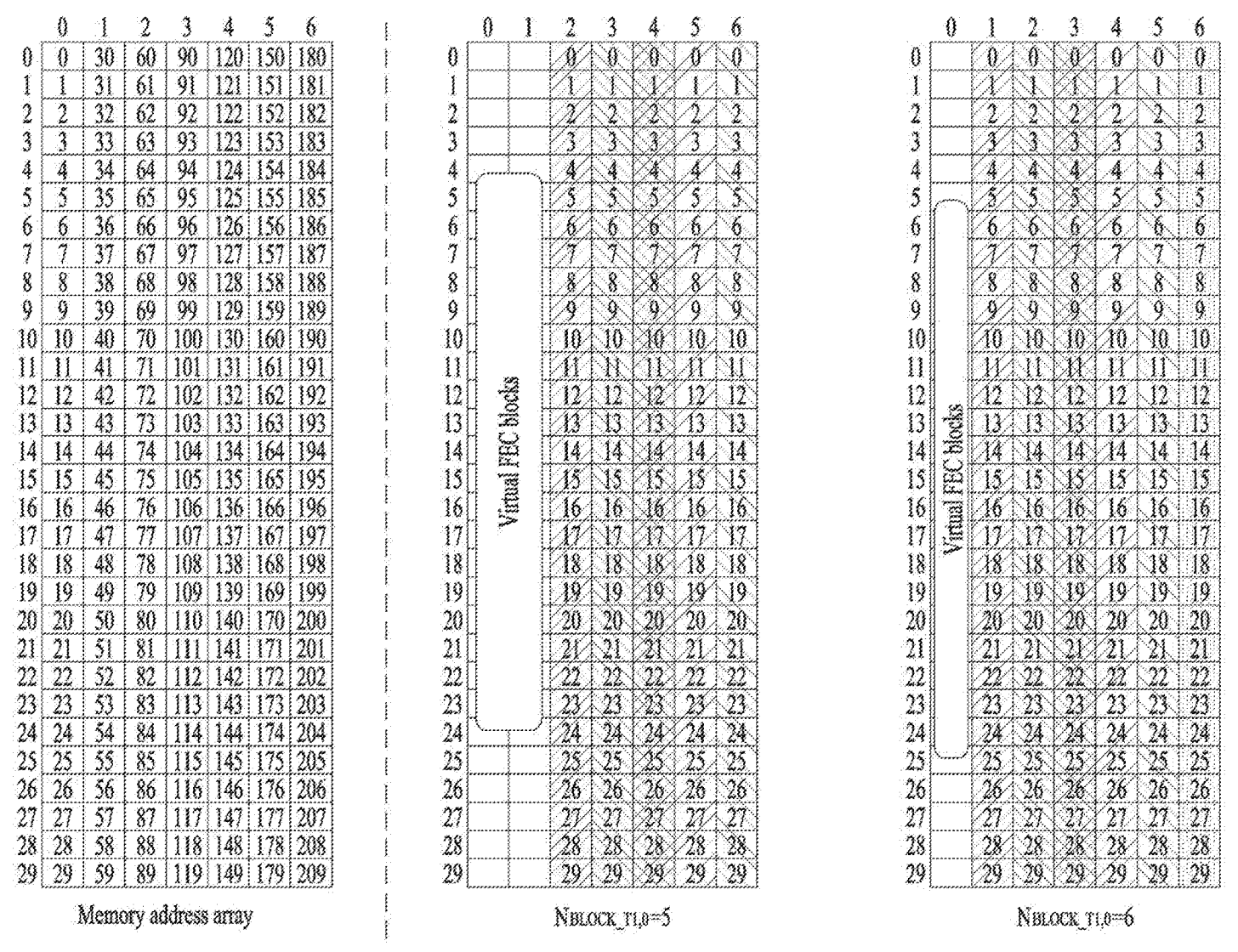

FIG. 9 is a diagram showing a writing operation of a time interleaver according to an embodiment of the present invention.

A block shown in a left portion of the drawing shows a TI memory address array and a block sho7wn in a right portion of the drawing shows a writing operation when two or one virtual FEC blocks are inserted into a frontmost group of TI groups with respect to two consecutive TI groups.

The frequency interleaver according to an embodiment of the present invention may include an interleaving address generator for generating an interleaving address to be applied to data corresponding to a symbol pair.

Figure 10:
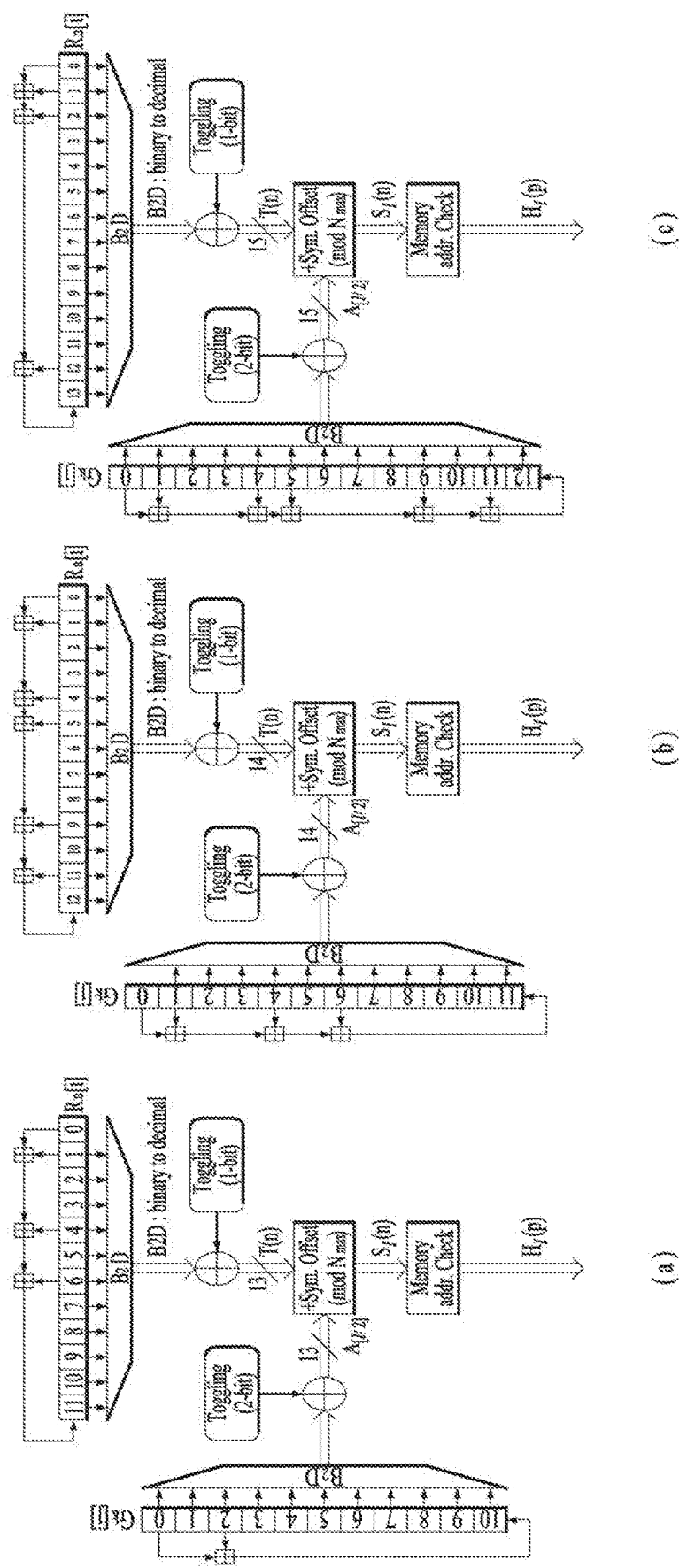
FIG. 10 is a block diagram of an interleaving address generator including a main-PRBS generator and a sub-PRBS generator according to each FFT mode, included in the frequency interleaver, according to an embodiment of the present invention.

FIG. 10 is a block diagram of an interleaving address generator including a main-PRBS generator and a sub-PRBS generator according to each FFT mode, included in the frequency interleaver, according to an embodiment of the present invention.

(a) is a block diagram of an interleaving address generator with respect to a 8K FFT mode, (b) is a block diagram of an interleaving address generator with respect to a 16K FFT mode, and (c) is a block diagram of an interleaving address generator with respect to a 32K FFT mode.

An interleaving procedure with respect to an OFDM symbol pair may use one interleaving sequence and will be described below. First, an available data cell (output cell from a cell mapper) to be interleaved in one OFDM symbol $O_{m,l}$ may be defined as $O_{m,l}=[x_{m,l,0}, \ldots, x_{m,l,p}, \ldots, x_{m,l,Ndata-1}]$ with respect to $l=0, \ldots,$ In this case, may be a $p^{th}$ cell of a $l^{th}$ OFDM symbol in a $m^{th}$ frame and $N_{data}$ may be the number of data cells. In the case of a frame signaling symbol, $N_{data}=C_{FSS}$, in the case of normal data, $N_{data}=C_{data}$, and in the case of a frame edge symbol, $N_{data}=C_{FES}$. In addition, the interleaving data cell may be defined as $P_{m,l}=[v_{m,l,0}, \ldots, v_{m,l,Ndata-1}]$ with respect to $l=0, \ldots, N_{sym}-1$.

With respect to an OFDM symbol pair, an interleaved OFDM symbol pair may be given according to $v_{m,l,Hi(p)}=x_{m,l,p}$, $p=0, \ldots, N_{data}-1$ for a first OFDM symbol of each pair and given according to $v_{m,l,p}=m_{m,l,Hi(p)}$, $p=0, \ldots, N_{data}-1$ for a second OFDM symbol of each pair. In this case, $H_l(p)$ may be an interleaving address generated based on a cyclic shift value (symbol offset) of a PRBS generator and a sub-PRBS generator.

Figure 11:
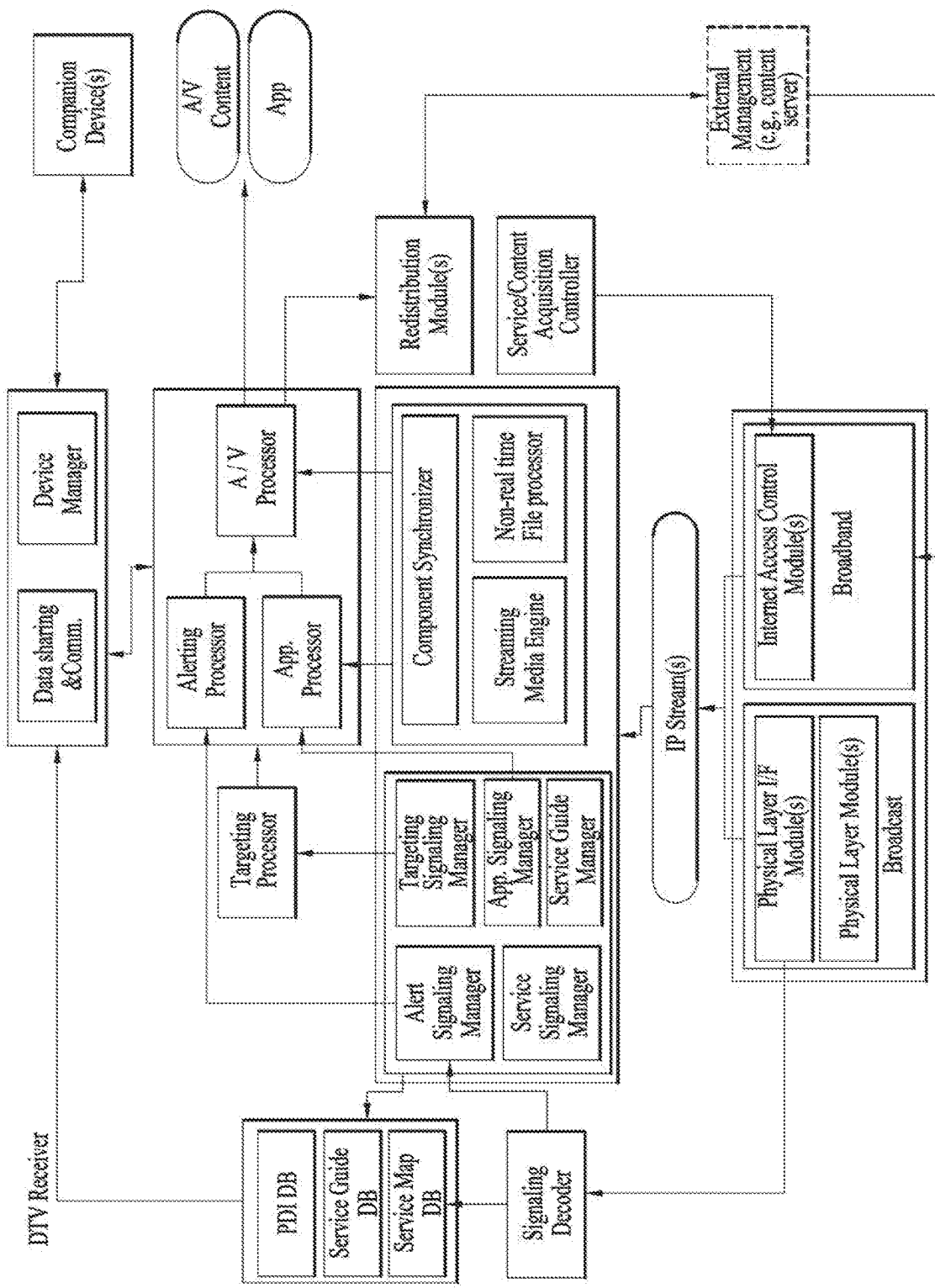
FIG. 11 is a block diagram illustrating a hybrid broadcast reception apparatus according to an embodiment of the present invention.

FIG. 11 is a block diagram illustrating a hybrid broadcast reception apparatus according to an embodiment of the present invention.

A hybrid broadcast system can transmit broadcast signals in connection with terrestrial broadcast networks and the Internet. The hybrid broadcast reception apparatus can receive broadcast signals through terrestrial broadcast networks (broadcast networks) and the Internet (broadband). The hybrid broadcast reception apparatus may include physical layer module(s), physical layer I/F module(s), service/content acquisition controller, Internet access control module(s), a signaling decoder, a service signaling manager, a service guide manager, an application signaling manager, an alert signal manager, an alert signaling parser, a targeting signaling parser, a streaming media engine, a non-real time file processor, a component synchronizer, a targeting processor, an application processor, an A/V processor, a device manager, a data sharing and communication unit, redistribution module(s), companion device(s) and/or an external management module.

The physical layer module(s) can receive a broadcast related signal through a terrestrial broadcast channel, process the received signal, convert the processed signal into an appropriate format and deliver the signal to the physical layer I/F module(s).

The physical layer I/F module(s) can acquire an IP datagram from information obtained from the physical layer module. In addition, the physical layer I/F module can convert the acquired IP datagram into a specific frame (e.g., RS frame, GSE, etc.).

The service/content acquisition controller can perform control operation for acquisition of services, content and signaling data related thereto through broadcast channels and/or broadband channels.

The Internet access control module(s) can control receiver operations for acquiring service, content, etc. through broadband channels.

The signaling decoder can decode signaling information acquired through broadcast channels.

The service signaling manager can extract signaling information related to service scan and/or content from the IP datagram, parse the extracted signaling information and manage the signaling information.

The service guide manager can extract announcement information from the IP datagram, manage a service guide (SG) database and provide a service guide.

The application signaling manager can extract signaling information related to application acquisition from the IP datagram, parse the signaling information and manage the signaling information.

The alert signaling parser can extract signaling information related to alerting from the IP datagram, parse the extracted signaling information and manage the signaling information.

The targeting signaling parser can extract signaling information related to service/content personalization or targeting from the IP datagram, parse the extracted signaling information and manage the signaling information. In addition, the targeting signaling parser can deliver the parsed signaling information to the targeting processor.

The streaming media engine can extract audio/video data for A/V streaming from the IP datagram and decode the audio/video data.

The non-real time file processor can extract NRT data and file type data such as applications, decode and manage the extracted data.

The component synchronizer can synchronize content and services such as streaming audio/video data and NRT data.

The targeting processor can process operations related to service/content personalization on the basis of the targeting signaling data received from the targeting signaling parser.

The application processor can process application related information and downloaded application state and represent parameters.

The A/V processor can perform audio/video rendering related operations on the basis of decoded audio/video data and application data.

The device manager can perform connection and data exchange with external devices. In addition, the device manager can perform operations of managing external devices connectable thereto, such as addition/deletion/update of the external devices.

The data sharing and communication unit can process information related to data transmission and exchange between a hybrid broadcast receiver and external devices. Here, data that can be transmitted and exchanged between the hybrid broadcast receiver and external devices may be signaling data, A/V data and the like.

The redistribution module(s) can acquire information related to future broadcast services and content when the broadcast receiver cannot directly receive terrestrial broadcast signals. In addition, the redistribution module can support acquisition of future broadcast services and content by future broadcast systems when the broadcast receiver cannot directly receive terrestrial broadcast signals.

The companion device(s) can share audio, video or signaling data by being connected to the broadcast receiver according to the present invention. The companion device may be an external device connected to the broadcast receiver.

The external management module can refer to a module for broadcast services/content provision. For example, the external management module can be a future broadcast services/content server. The external management module may be an external device connected to the broadcast receiver.

Figure 12:
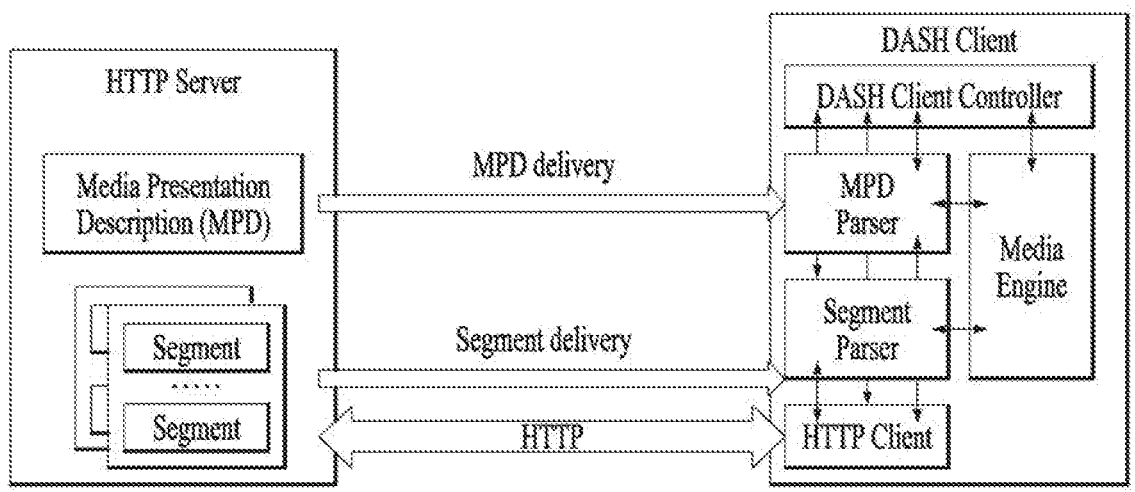
FIG. 12 is a diagram showing an overall operation of a DASH-based adaptive streaming model according to an embodiment of the present invention.

FIG. 12 is a diagram showing an overall operation of a DASH-based adaptive streaming model according to an embodiment of the present invention.

The present invention proposes a next-generation media service providing method for providing high dynamic range (HDR) supportable content. The present invention proposes related metadata and a method of transmitting the metadata when HDR content for expressing sufficient brightness is provided. Thereby, content may be adaptively adjusted according to characteristics of various scenes of content and image quality with enhanced content may be provided.

In the case of UHD broadcast, etc., brightness that is not capable of being expressed by existing content, thereby providing sense of high realism. By virtue of introduction of HDR, an expression range of brightness of a content image is increased and, thus, a difference between characteristics for respective scenes of content may be increased compared with a previous case. To effectively express characteristics for respective scenes of content on a display, metadata may be defined and transmitted to a receiver. An image of content may be appropriately provided according to intention of a service provider based on the metadata received by the receiver.

The DASH-based adaptive streaming model according to the illustrated embodiment may write an operation between an HTTP server and a DASH client. Here, a dynamic adaptive streaming over HTTP (DASH) may be a protocol for supporting HTTP-based adaptive streaming and may dynamically support streaming according to a network situation. Accordingly, AV content reproduction may be seamlessly provided.

First, the DASH client may acquire MPD. The MPD may be transmitted from a service provider such as a HTTP server. The MPD may be transmitted according to delivery according to the aforementioned embodiment. The DASH client may request a server of corresponding segments using access information to a segment described in the MPD. Here, the request may reflect a network state and may be performed.

The DASH client may acquire a corresponding segment and, then, process the segment in a media engine and, then, display the segment on a screen. The DASH client may reflect a reproduction time and/or a network situation in real time and make a request for and acquire a required segment (Adaptive Streaming). Thereby, content may be seamlessly reproduced.

The media presentation description (MPD) may be represented in the form of XML as a file containing detailed information for permitting the DASH client to dynamically acquire a segment. In some embodiments, the MPD may be the same as the aforementioned MPD.

A DASH client controller may reflect a network situation to generate a command for making a request for MPD and/or a segment. The controller may control the acquired information to be used in an internal block such as a media engine.

A MPD parser may parse the acquired MPD in real time. Thereby, the DASH client controller may generate a command for acquiring a required segment.

A segment parser may parse the acquired segment in real time. Internal blocks such as a media engine may perform a specific operation according to information included in a segment.

A HTTP client may make a request for required MPD and/or segment to a HTTP server. The HTTP client may transmit the MPD and/or segments acquired from the server to the MPD parser or the segment parser.

The media engine may display content on a screen using media data included in a segment. In this case, information of the MPD may be used.

Figure 13:
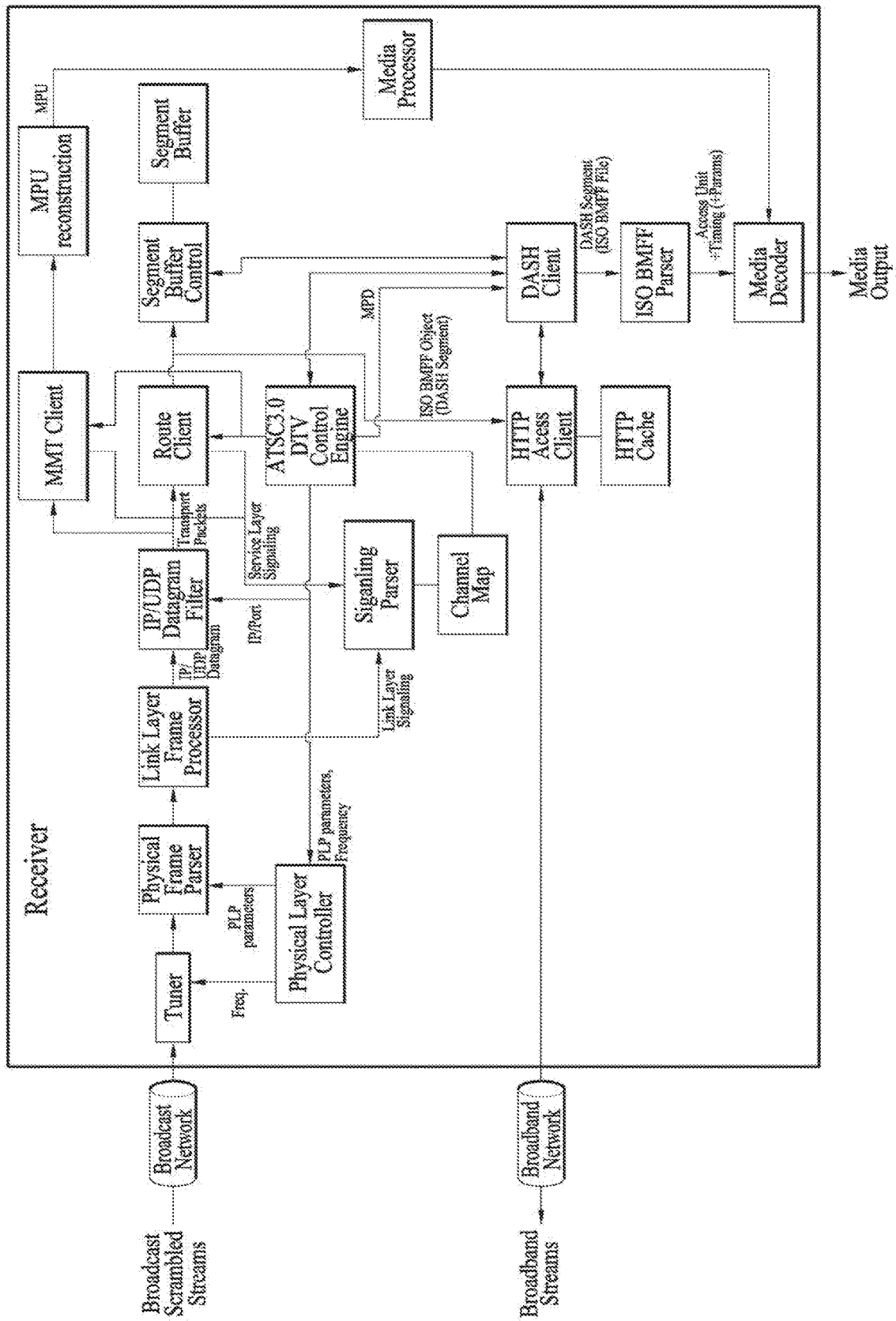
FIG. 13 is a block diagram of a receiver according to an embodiment of the present invention.

FIG. 13 is a block diagram of a receiver according to an embodiment of the present invention.

The receiver according to the illustrated embodiment may include a tuner, a physical layer controller, a physical frame parser, a link layer frame processor, an IP/UDP datagram filter, a DTV control engine, a route client, a segment buffer control, an MMT client, an MPU reconstruction, a media processor, a signaling parser, a DASH client, an ISO BMFF parser, a media decoder, and/or an HTTP access client. Each detailed block of the receiver may be a hardware processor.

The tuner may receive and process a broadcast signal through a terrestrial broadcast channel to tune the broadcast signal in a proper form (physical frame, etc.). The physical layer controller may control operations of the tuner, the physical frame parser, etc. using RF information, etc. of a broadcast channel as a reception target. The physical frame parser may parse the received physical frame and acquire a link layer frame, etc. via processing related to the physical frame.

The link layer frame processor may acquire link layer signaling, etc. from the link layer frame or may acquire IP/UDP datagram and may perform related calculation. The IP/UDP datagram filter may filter specific IP/UDP datagram from the received IP/UDP datagram. The DTV control engine may mange an interface between components and control each operation via transmission of a parameter, etc.

The route client may process a real-time object delivery over unidirectional transport (ROUTE) packet for supporting real-time object transmission and collect and process a plurality of packets to generate one or more base media file format (ISOBMFF) objects. The segment buffer control may control a buffer related to segment transmission between the route client and the dash client.

The MMT client may process a MPEG media transport (MMT) transport protocol packet for supporting real-time object transmission and collect and process a plurality of packets. The MPU reconstruction may reconfigure a media processing unit (MPU) from the MMTP packet. The media processor may collect and process the reconfigured MPU.

The signaling parser may acquire and parse DTV broadcast service related signaling (link layer/service layer signaling) and generate and/or manage a channel map, etc. based thereon. This component may process low level signaling and service level signaling.

The DASH client may perform real-time streaming or adaptive streaming related calculation and process the acquired DASH segment, etc. The ISO BMFF parser may extract data of audio/video, a related parameter, and so on from the ISO BMFF object. The media decoder may process decoding and/or presentation of the received audio and video data. The HTTP access client may make a request for specific information to the HTTP server and process response to the request.

Figure 14:
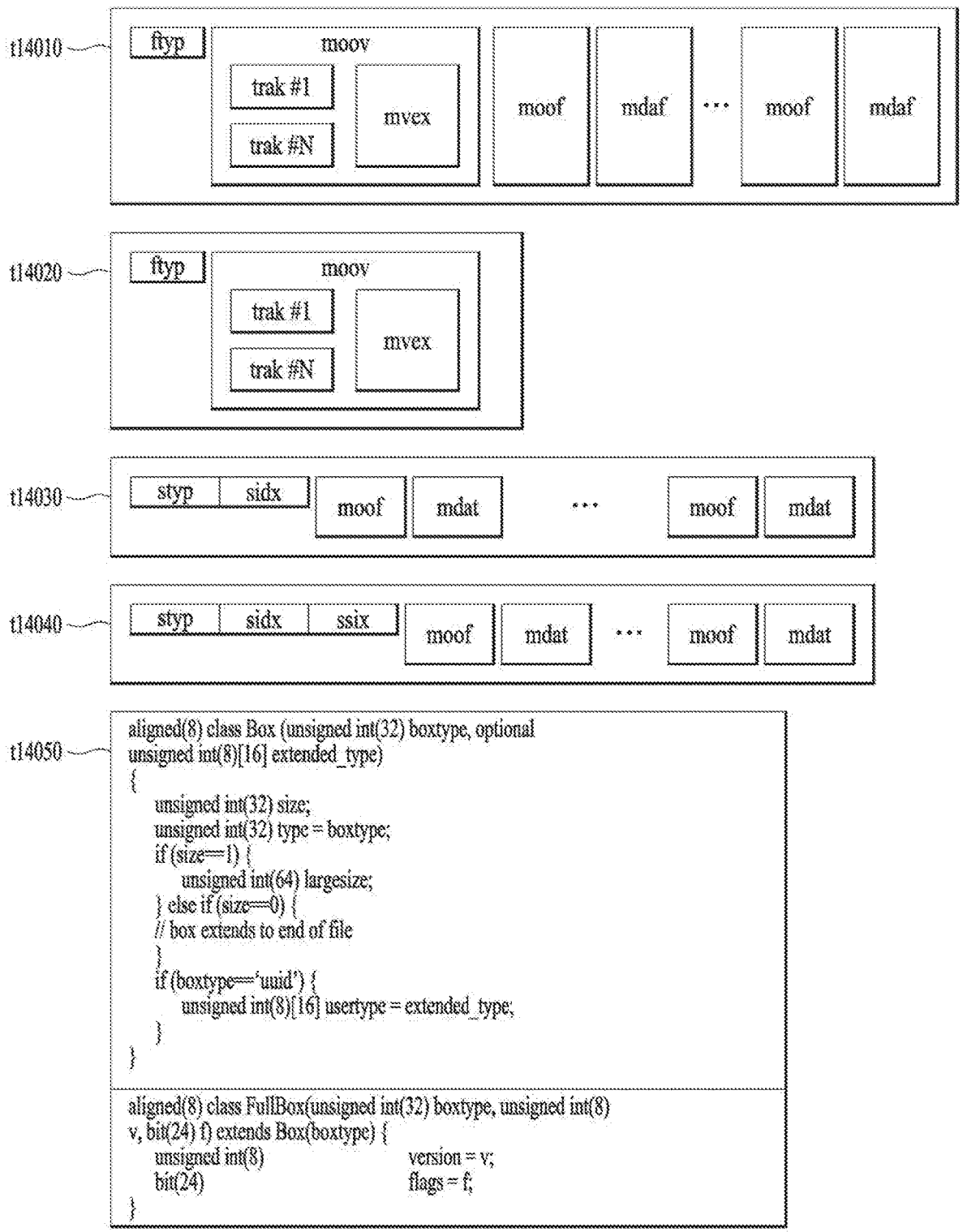
FIG. 14 is a diagram showing a configuration of a media file according to an embodiment of the present invention.

FIG. 14 is a diagram showing a configuration of a media file according to an embodiment of the present invention.

To store and transmit media data such as audio or video, formalized media file format may be defined. In some embodiments, the media file according to the present invention may have a file format based on ISO base media file format (ISO BMFF).

The media file according to the present invention may include at least one box. Here, the box may be a data block or object including media data or metadata related to media data. Boxes may be an inter-hierarchical structure and, thus, media may be classified according to the inter-hierarchical structure such that a media file has a format appropriate to store and/or transmit large-scale media data. The media file may have a structure for easily accessing media information, for example, a structure for permitting a user to move a specific point of media content.

The media file according to the present invention may include a ftyp box, a moov box, and/or a mdat box.

The ftyp box (file-type box) may provide a file type or compatibility related information of a corresponding media file. The ftyp box may include configuration version information of media data of a corresponding media file. A decoder may identify a corresponding media file with reference to the ftyp box.

The moov box (movie box) may be a box including metadata of media data of a corresponding media file. The moov box may function as a container of all metadata. The moov box may be a box of an uppermost layer among metadata related boxes. In some embodiments, only one moov box may be present in a media file.

The mdat box (media data box) may be a box containing actual media data of a corresponding media file. The media data may include an audio sample and/or video samples and the mdat box may function as a container containing the media samples.

In some embodiments, the aforementioned moov box may further include a mvhd box, a trak box, and/or a mvex box as a lower box.

The mvhd box (movie header box) may include media presentation related information of media data included in a corresponding media file. That is, the mvhd box may include information such as media generation time, change time, time interval, period, etc. of corresponding media presentation.

The trak box (track box) may provide information related to a track of corresponding media data. The trak box may include information such as stream related information, presentation related information, and access related information of an audio track or a video track. A plurality of trak boxes may be present according to the number of tracks.

In some embodiments, the trak box may further include a tkhd box (track header box) as a lower box. The tkhd box may include information on a corresponding track indicated by the trak box. The tkhd box may include information such as generation time, change time, and track identifier of a corresponding track.

The mvex box (movie extend box) may indicate that the below-described moof box is present in a corresponding media file. To know all media samples of a specific track, moof boxes need to be scanned.

In some embodiments, the media file according to the present invention may be divided into a plurality of fragments (t14010). Thereby, the media file may be segmented and stored or transmitted. Media data (mdat box) of the media file may be segmented into a plurality of fragments and each fragment may include a moof box and the segmented mdat box. In some embodiments, to use fragments, information of the ftyp box and/or the moov box may be required.

The moof box (movie fragment box) may provide metadata of media data of a corresponding fragment. The moof box may be a box of an uppermost layer among metadata related boxes of a corresponding fragment.

The mdat box (media data box) may include actual media data as described above. The mdat box may include media samples of media data corresponding to each corresponding fragment.

In some embodiments, the aforementioned moof box may include a mfhd box and/or a traf box as a lower box.

The mfhd box (movie fragment header box) may include information related to a relationship of a plurality of fragmented fragments. The mfhd box may include a sequence number and may indicate a sequence of data obtained by segmenting media data of a corresponding fragment. Whether segmented data is omitted may be checked using the mfhd box.

The traf box (track fragment box) may include information on a corresponding track fragment. The traf box may provide metadata of a segmented track fragment included in a corresponding fragment. The traf box may provide metadata to decode/reproduce media samples in a corresponding track fragment. A plurality of traf boxes may be present according to the number of track fragments.

In some embodiments, the aforementioned traf box may include a tfhd box and/or a trun box as a lower box.

The tfhd box (track fragment header box) may include header information of a corresponding track fragment. The tfhd box may provide information of a basic sample size, period, offset, and identifier with respect to media samples of a track fragment indicated by the aforementioned traf box.

The trun box (track fragment run box) may include corresponding track fragment related information. The trun box may include information such as a period, size, and reproduction time for each media sample.

The aforementioned media file and fragments of the media file may be processed and transmitted as segments. The segment may include initialization segment and/or media segment.

A file according to the illustrated embodiment t14020 may be a file containing information related to initialization of a media decoder except for media data. The file may correspond to, for example, the aforementioned initialization segment. The initialization segment may include the aforementioned ftyp box and/or moov box.

A file according to the illustrated embodiment t14030 may be a file containing the aforementioned fragment. The file may correspond to, for example, the aforementioned media segment. The media segment may include the aforementioned moof box and/or mdat box. The media segment may further include a styp box and/or a sidx box.

The styp box (segment type box) may provide information for identifying media data of a segmented fragment. The styp box may perform the same function as the aforementioned ftyp box with respect to the segmented fragment. In some embodiments, the styp box may have the same format as the ftyp box.

The sidx box (segment index box) may provide information indicating an index of a segmented fragment. Thereby, the box may indicate a sequence of the corresponding segmented fragment.

In some embodiments (t14040), a ssix box may be further included and the ssix box (sub segment index box) may be further segmented into sub segments and, in this case, may provide information indicating an index of the sub segment.

Boxes of a media file may include further extended information based on the box and FuliBox form shown in the illustrated embodiment t14050. In this embodiment, a size field and a largesize field may indicate a length of a corresponding box in units of bytes. The version field may indicate a version of a corresponding box format. The type field may indicate a type and identifier of a corresponding box. The flags field may indicate a flag, etc. related to a corresponding box.

FIG. 15 is a diagram showing an HDR configuration box for providing HDR information according to an embodiment of the present invention.

In order to provide HDR information related to video tracks or video samples in a media file, an HDR configuration box may be defined. The HDR configuration box may be located in the media file. In some embodiments, the HDR configuration box may be included in a moov box, a moof box or a third box. The HDR configuration box may be referred to as an hdrc box.

The HDR configuration box may have an hdr config field. The hdr config field may include an OETF_type field, a max_mastering_display_luminance field, a min_mastering_display_luminance field, an hdr_type_transition_flag field, an hdr_sdr_transition_flag field, an sdr_hdr_transition_ flag field, an sdr_compatibility_flag field, an average_ frame_luminance_level field and/or a max_frame_pixel_luminance field.

The OETF_type field may indicate the type of the source OETF (opto-electronic transfer function) of corresponding video data. If the value of this field is 1, 2 or 3, this may correspond to ITU-R BT.1886, ITU-R BT.709 or ITU-R BT.2020. The other values may be reserved for future use.

The max_mastering_display_luminance field may indicate the peak luminance value of the mastering display of the corresponding video data. This value may be an integer value in a range of 100 to 1000.

The min_mastering_display_luminance field may indicate the minimum luminance value of the mastering display of the corresponding video data. This value may be a fractional number in a range of 0 to 0.1.

The hdr_type_transition_flag field may be a flag indicating whether HDR information of the corresponding video data is changed to apply another type of HDR information.

The hdr_sdr_transition_flag field may be a flag indicating whether the corresponding video data transitions from HDR to SDR.

The sdr_hdr_transition_flag field may be a flag indicating whether the corresponding video data transitions from SDR to HDR.

The sdr_compatibility_flag field may be a flag indicating whether the corresponding data is compatible with an SDR decoder or an SDR display.

The average_frame_luminance_level field may indicate the average of the luminance level with respect to one video sample. In addition, this field may indicate the maximum value of averages of the luminance levels of samples belonging to a sample group or video track (stream).

The max_frame_pixel_luminance field may indicate the maximum value of the pixel luminance values with respect to one video sample. In addition, this field may indicate the largest value of the pixel luminance maximum values of samples belonging to a sample group or video track (stream).

The "corresponding video data" which is an object to be described by the above fields may be a video track or video sample group or each video sample in the media file. The description range of each field may be changed according to object to be described. For example, the hdr_type_transition_flag field may indicate transition from HDR to SDR in the corresponding video track or transition from HDR to SDR in the video sample group.

FIG. 16 is a diagram showing an HDR configuration box for providing HDR information according to another embodiment of the present invention.

In order to provide HDR information related to video tracks or video samples in a media file, an HDR configuration box may be defined. The HDR configuration box may be located in the media file. In some embodiments, the HDR configuration box may be included in a moov box, a moof box or a third box. The HDR configuration box may be referred to as an hdrc box. The HDR configuration box of the present embodiment may provide information on an HDR parameter set (e.g., a set of an EOTF, bit depth, peak luminance level, codec and metadata) associated with the video track or sample included in the ISOBMFF. The HDR related parameters may be EOTF (Electro-Optical Transfer Function), bit depth, peak luminance level, codec, related metadata, etc. For example, in the applied HDR related parameters, EOTF may be SMPTE ST 2084, bit depth may be 12 bits/pixel, peak luminance may be 10,000 nit, codec may be HEVC single codec, metadata may be SMPTE ST 2086. In order to signal information on the set of such HDR related parameters, an HDR configuration box such as d16010 may be included in the ISOBMFF.

The HDR configuration box may have at least one of an hdr_param_set field, an hdr_config_flag field and/or an hdr_config field. The hdr_param_set field may indicate an identifier indicating a set of HDR related parameters. As an embodiment, the fields may have the following values. For example, if the hdr_param_set field is set to 1, EOTF of the HDR related parameters is SMPTE ST2084, bit depth is 12 bits/pixel, peak luminance is 10,000 nit, codec is HEVC dual codec (HEVC+HEVC), and metadata is SMPTE ST 2086 or SMPTE ST 2094. If the hdr_param_set field is set to 2, EOTF is SMPTE ST2084, bit depth is 10 bits/pixel, peak luminance is 4000 nit, codec is HEVC single codec, and metadata is SMPTE ST 2086 or SMPTE ST 2094. In addition, if the hdr_param_set field is set to 3, EOTF is BBC EOTF, bit depth is 10 bits/pixel, peak luminance is 1,000 nit, and codec is HEVC single codec. The above-described combinations correspond to the embodiments and the 8-bit hdr_param_set field may identify a set of 256 HDR related parameters. Through such an hdr_config_flag field, the ISOBMFF may indicate with which HDR parameters the video tracks or samples included therein are associated, and the receiver may receive detailed information regarding which HDR parameters are used to decode or image-process the video tracks or samples included in the ISOBMFF. The hdr config_flag field may indicate whether HDRConfiguration (hdr_config) including information on HDR-related detailed parameters is included. If the value of the hdr_config_flag field is '1', this may indicate that HDRConfiguration is included. If HDRConfiguration is included, this may indicate that transition (e.g., HDR Type1→HDR Type2, HDR→SDR, SDR→HDR) is present in a sample, a sample group or a track, to which the corresponding information is applied. In addition, this may indicate whether SDR Compatibility is supported. If the value of the hdr_config_flag field is '0', this may indicate that HDR Configuration including detailed information of the HDR parameter is not included. In this case, the HDR parameter may be estimated using the hdr_parameter_set information.

The hdr_config field including HDRConfiguration information may include an OETF_type field, a max mastering_display_luminance field, a min_mastering_display_luminance field, an average_frame_luminance_level field, a max_frame_pixel_luminance field, an hdr_type_transition_flag field, an hdr_sdr_transition_flag field, an sdr_hdr_transition_flag field and/or an sdr_compatibility_flag field, like d16020. The fields were described in the previous figure.

According to another embodiment, in order to signal information on a set of HDR related parameters, the same HDR configuration box as d16030 may be included in the ISOBMFF.

The HDR configuration box may have at least one of an hdr_param_set field, an hdr_type_transition_flag field, an hdr_sdr_transition_flag field, an sdr_hdr_transition_flag field, an sdr compatibility_flag field, an hdr_config_flag field and/or an hdr_config field. The hdr_param_set field may indicate an identifier indicating a set of HDR related parameters. The embodiment was described above. The above-described combination corresponds to the embodiment, and an 8-bit hdr_param_set field may identify a set of 256 HDR related parameters. Through such an hdr_config_flag field, the ISOBMFF may indicate with which HDR parameters the video tracks or samples included therein are associated, and the receiver may receive detailed information regarding which HDR parameters are used to decode or image-process the video tracks or samples included in the ISOBMFF. The hdr_type_transition_flag field, the hdr_sdr_transition_flag field, the sdr_hdr_transition_flag field and the sdr_compatibility_flag field were described above. The hdr_config_flag field may indicate whether HDRConfiguration (hdr_config) including information on HDR-related detailed parameters is included. If the value of the hdr_config_flag field is '0', this may indicate that HDRConfiguration is not included. The hdr_config field including HDRConfiguration information may include an OETF_type field, a max_mastering_display_luminance field, a min_mastering_display luminance field, an average_rame_luminance level field and/or a max_frame_pixel_luminance field, like d16040. The fields were described in the previous figure.

FIG. 17 is a diagram showing a method of defining HDR information in a tkhd box according to an embodiment of the present invention.

The HDR information may be included and stored/transmitted in the structure of the above-described media file. In the present embodiment, HDR information (parameters) may be added to the tkhd box of the above-described moov box. The added HDR information will be described below.

In the illustrated embodiment (d17010), the hdr_flag field may be a flag indicating whether HDR video data is included in the corresponding video track described by the tkhd box. If the value of this field is 1, the HDR video data may be included in the corresponding video track. If the value of this field is 1, 5 flag fields, which will be described below, may be present. In particular, if the value of the hdr_flag field is 1, the tkhd box may include an hdr_param_set field indicating an HDR parameter set.

Based on the hdr_flag and flag field values, which will be described below, whether the video data in the corresponding video track may be processed in a video decoder may be determined. For example, it can be seen that, in the case of a decoder capable of processing only SDR, HDR_flag=1 and, in the case of SDR_compatibility=0, the corresponding video data cannot be processed.

The hdr_param_set field may indicate an identifier indicating a set of HDR related parameters applied to the corresponding video track. As described with respect to the previous figures, a specific HDR parameter set may be indicated accroding to the value of the hdr_param_set field.

The hdr_type_transition_flag field may be a flag indicating whether HDR information (parameters) related to the HDR video data in the corresponding track transitions. If the value of this field is 1, the HDR information (parameters) related to the HDR video data in the corresponding track may transition to other HDR information.

The hdr_sdr_transition_flag field may be a flag indicating whether the video data in the corresponding video track transitions from HDR to SDR. If the value of this field is 1, it can be seen that the corresponding video data transitions from HDR to SDR.

The sdr_hdr_transition_flag field may be a flag indicating whether the video data in the corresponding video track transitions from SDR to HDR. If the value of this field is 1, it can be seen that the corresponding video data transitions from SDR to HDR.

The sdr_compatibility_flag field may be a flag indicating whether the video data in the corresponding video track is compatible with a decoder or display supporting SDR. If the value of this field is 1, it can be seen that the HDR video data in the corresponding video track is compatible with apparatuses supporting SDR. If the value of this field is 1, decoders/display apparatuses supporting SDR may determine whether the HDR video data included in the corresponding video track is decoded/displayed.

In some embodiments, if a transition related flag is set to 1, before processing video data in the decoder, data (SEI, etc.) in video related thereto may be checked.

In some embodiments (d17020), the above-described HDR configuration box may be added in the tkhd box. The hdr_flag field of the present embodiment may be equal to the hdr_flag field of the above-described embodiment (d17010). In this case, when the value of hdr_flag field is 1, this may indicate that the hdr_config box having the HDR configuration box type is present in the tkhd box instead of the above-described five flags.

Here, the hdr_config box may include HDR information of the video data included in the corresponding video track. This box has the above-described HDR configuration box and thus, as described above, may include an hdr_param_set field, an OETF_type field, a max_mastering_display_luminance field, a min_mastering_display_luminance field, an hdr_type_transition_flag field, an hdr_sdr_transition_flag field, an sdr_hdr_transition_flag field, an sdr_compatibility_flag field, an average_frame_luminance_level field and/or a max_frame_pixel_luminance field.

Definition of these fields is equal to previous definition. However, in this embodiment, since the HDR configuration box is present in the tkhd box, these fields may describe information on the corresponding video track. For example, the OETF_type field may indicate the OETF type of the video data in the "corresponding video track". In particular, the hdr_param_set field, the hdr_type_transition_flag field, the hdr_sdr_transition_flag field, the sdr_hdr_transition_flag field and/or the sdr_compatibility_flag field may have the same meanings as the five flag fields in the above-described embodiment (d17010).

In some embodiments, the average_frame_luminance_level field in this HDR configuration box may indicate the maximum value of averages of the luminance levels of the video samples in the corresponding video track. In addition, the max_frame_pixel_luminance field may indicate the largest value of the maximum values of the pixel luminance of the video samples in the corresponding video track.

FIG. 18 is a diagram showing a method of defining HDR information in a vmhd box according to an embodiment of the present invention.

The HDR information may be included and stored/transmitted in the structure of the above-described media file. In the present embodiment, HDR information (parameters) may be added to the vmhd box of the above-described trak box. The added HDR information is shaded.

Here, vmhd box (video media header box) is a sub-box of the above-described trak box, and may provide information related to general presentation of the corresponding video track.

In the illustrated embodiment (d18010), an hdr_flag field may be included. In addition, according to the value of the hdr_flag field, an hdr_param_set field, an hdr_type_transition_flag field, an hdr_sdr_transition_flag field, an sdr_hdr_transition_flag field and/or an sdr_compatibility_flag field may be further included. These fields may play the same roles as the fields having the same names in the above-described tkhd box.

In addition, in the illustrated embodiment (d18020), an hdr_flag field may be included. In addition, according to the value of the hdr_flag field, an hdr_config box, which is the HDR configuration box, may be further included. The hdr_flag field and the hdr_config box may play the same roles as the field and box having the same names in the above-described tkhd box.

That is, in the illustrated embodiments, the HDR information in the vmhd box may provide HDR information of the video data included in the corresponding video track.

In some embodiments, the HDR information may be simultaneously included in the tkhd box and the vmhd box. In this case, the embodiments of the HDR information structure included in the boxes may be combined. If the HDR information is simultaneously included in the tkhd box and the vmhd box, the value of the HDR information defined in the tkhd box may be overwritten by the value of the HDR information defined in the vmhd box. That is, if the values of the HDR information defined in both boxes are different, the value of the vmhd box may be used. If the HDR information is not included in the vmhd box, the HDR information in the tkhd box may be used.

FIG. 19 is a diagram showing a method of defining HDR information in a trex box according to an embodiment of the present invention.

The HDR information may be included and stored/transmitted in the structure of the above-described media file. In the present embodiment. HDR information (parameters) may be added to the trex box of the above-described mvex box. The added HDR information is shaded.

Here, the trex box (track extend box) is a sub-box of the above-described mvex box and may set default values used by each movie fragment. This box may provide a default value, thereby reducing a space in the traf box and complexity.

The trex box may include a default_hdr_flag field and/or a default_sample_hdr_flag field. According to the value of the default hdr_flag field, a default_hdr_config box, which is the HDR configuration box, may be further included. In addition, according to the value of the default_sample_hdr_flag field, a default_sample_hdr_config box, which is the HDR configuration box, may be further included.

The default_hdr_flag field may be a flag indicating whether HDR video data is included in a video track fragment included in a movie fragment. If the value of this field is 1, this may indicate that HDR video data is included in the movie fragment by default. If the value of this field is 1, a default_hdr_config box, which is the HDR configuration box, may be further included.

The default_hdr_config box may include HDR information commonly applicable to video samples included in the corresponding video track fragment. This box is the above-described HDR configuration box and may include the fields of the above-described HDR configuration box.

The fields except for the average_frame_luminance_level field and/or the max_frame_pixel_luminance field among the fields of this box may play the same roles as the fields having the same names in the HDR configuration box included in the above-described tkhd box. The average_frame_luminance_level field may indicate a maximum value of the averages of the luminance levels of the video samples belonging to the movie fragment. The max_frame_pixel_luminance field may indicate the largest value of the maximum values of the pixel luminance of the video samples belonging to the movie fragment.

The default_sample_hdr_flag field may be a flag indicating whether HDR video samples are included in the video track fragment included in the movie fragment by default. If the value of this field is 1, this may indicate that HDR video samples are included in the corresponding fragment by default. If the value of this field is 1, a default_sample_hdr_config box, which is the HDR configuration box, may be further included.

The default_sample_hdr_config box may include HDR information applicable to the video samples included in the corresponding movie fragment. This box is the above-described HDR configuration box and may include the fields of the above-described HDR configuration box.

The fields except for the average_frame_luminance_level field and/or max_frame_pixel_luminance field among the fields of this box may play the same role as the fields having the same names in the HDR configuration box included in the above-described tkhd box. The average_frame_luminance_level field may indicate the average of the luminance level of each of the video samples belonging to the track fragment in the corresponding fragment. The max_frame_pixel_luminance field may indicate the maximum value of the pixel luminance of each of the video samples belonging to the track fragment in the corresponding fragment.

FIG. 20 is a diagram showing a method of defining HDR information in a tfhd box according to an embodiment of the present invention.

The HDR information may be included and stored/transmitted in the structure of the above-described media file. In the present embodiment, HDR information (parameters) may be added to the tfhd box of the above-described moof box. The added HDR information is shaded.

In the illustrated embodiment (d20010), the hdr_flag field may be a flag indicating whether HDR video data is included in the corresponding video track fragment described in the tfhd box. If the value of this field is 1, HDR video data may be included in the corresponding video track fragment.

If the value of the hdr_flag field is 1, an hdr_param_set field, an hdr_type_transition_flag field, an hdr_sdr_transition_flag field, an sdr_hdr_transition_flag field and/or an sdr_compatibility_flag field may be further included. These fields may play the same roles as the fields having the same names in the above-described tkhd box. However, in this case, these fields may describe the corresponding video track fragment, not the entire video track.

That is, the hdr_param_set field may indicate an identifier indicating a set of HDR related parameters applied to the track fragment included in the movie fragment. The hdr_type_transition_flag field may indicate whether HDR information transitions with respect to media data related to the track fragment in the corresponding track fragment. The hdr_sdr_transition_flag field may indicate that the corresponding track fragment transitions from HDR to SDR. The sdr_hdr_transition_flag field may indicate that the corresponding track fragment transitions from SDR to HDR. The sdr_compatibility_flag field may indicate whether the HDR video data of the corresponding track fragment is compatible with an SDR decoder/display.

In the illustrated embodiment (d20020), the tfhd box may include the above-described HDR configuration box. According to the value of the hdr_flag field, whether an hdr_config box, which is the HDR configuration box, is included may be indicated. The hdr_config box may provide HDR information commonly applicable to the video samples of the corresponding track fragment.

The fields except for the average_frame_luminance_level field and/or the max_frame_pixel_luminance field among the fields of this box may play the same roles as the fields having the same names in the HDR configuration box included in the above-described tkhd box. However, in this case, these fields may describe the corresponding video track fragment, not the entire video track.

The average_frame_luminance_level field may indicate the maximum value of the averages of the luminance levels of the video samples belonging to the track fragment in the corresponding fragment. The max frame_pixel_luminance field may indicate the largest value of the maximum values of the pixel luminance of the video samples belonging to the track fragment in the corresponding fragment.

In the illustrated embodiment (d20030), the tfhd box may further include HDR information according to a tf_flags value. The tr_flags may indicate flags associated with the corresponding box. For example, if tr_flags includes a value of 0x000001, this may indicate that base data offset information is included in the tfhd box, and if tr_flags includes a value of 0x000002, this may indicate that sample description index information is included in the tfhd box.

In some embodiments, if the tf_flags value includes a value of 0x100000, this may indicate that the default value of the HDR information of the video samples included in the track fragment in the corresponding fragment is present. The tf_flags value indicating that the HDR information is present may have a value other than a value of 0x100000 in some embodiments. (0x100000: default-sample-hdr-configuration-present).

If the tf_flags value includes a value of 0x100000, a deafult_sample_hdr_config box, which is the HDR configuration box, may be included in the tfhd box. The deafult_sample_hdr_config box may play the same role as the deafult_sample_hdr_config box in the above-described trex box.

FIG. 21 is a diagram showing a method of defining HDR information in a trun box according to an embodiment of the present invention.

The HDR information may be included and stored/transmitted in the structure of the above-described media file. In the present embodiment, HDR information (parameters) may be added to the trun box of the above-described traf box. The added HDR information is shaded.

In the illustrated embodiment (d21010), the trun box may include an hdr_flag field. In addition, according to the value of the hdr_flag field, an hdr_param_set field, an hdr_type_transition_flag field, an hdr_sdr_transition_flag field, an sdr_hdr_transition_flag field and/or an sdr_compatibility_flag field may be further included. These fields may signal HDR related data commonly applicable to the video samples in the corresponding track fragment. These fields may have the same meanings as the fields having the same names in the above-described tfhd box.

In some embodiments, HDR information may be simultaneously included in the tfhd box and the trun box. In this case, the embodiments of the HDR information structures included in the boxes may be combined. If HDR information is simultaneously included in the tfhd box and the trun box, the values of HDR information defined in the tfhd box may be overwritten by the values of the HDR information defined in the trun box. That is, if the values of the HDR information included in both boxes are different, the value in the trun box may be used. If the HDR information is not included in the trun box, the HDR information in the tfhd box may be used.

In the illustrated embodiment (d21020), the trun box may include an hdr_flag field and may further include an hdr_config box, which is the HDR configuration box, according to the value of the hdr_flag field. This box may include HDR information commonly applicable to the video samples in the corresponding track fragment. These fields in this box may have the same meanings as the fields having the same names of the HDR configuration box in the above-described tfhd box.

In the illustrated embodiment (d21030), the trun box may further include HDR information according to a tf_flags value. The tr_flags may indicate flags associated with the corresponding box. For example, if tr_flags includes a value of 0x000001, this may indicate that data offset information is included in the trun box, and if tr_flags includes a value of 0x000004, this may indicate that first sample flag information is included in the trun box.

In some embodiments, if the tf_flags value includes a value of 0x002000, this may indicate whether HDR information commonly applicable to the video samples included in the track fragment in the corresponding fragment is present. The tf_flags value indicating that the HDR information is present may have a value other than a value of 0x002000 in some embodiments. (0x002000: hdr-configuration-present)

If the tf_flags value includes a value of 0x002000, an hdr_config box, which is the HDR configuration box, may be included in the trun box. The hdr_config box may play the same role as the hdr_config box in the above-described tfhd box.

In the illustrated embodiment (d21040), the trun box may further include HDR information according to a tf_flags value. In some embodiments, if the tf_flags value includes a value of 0x001000, this may indicate whether the HDR information applicable to the video samples included in the track fragment in the corresponding fragment is present. The tf_flags value indicating that the HDR information is present may have a value other than a value of 0x001000 in some embodiments. (0x001000: sample-hdr-configuration-present)

If the tf_flags value includes a value of 0x001000, a sample_hdr_config box, which is the HDR configuration box, may be included in the trun box. The sample hdr_config box may provide the HDR information of the corresponding sample.

The meaning of the information in the sample_hdr_config box may be equal to that of the information in the deafult_sample_hdr_config box of the above-described tfhd box. That is, the deafult_sample_hdr_config box of the tfhd box may provide default HDR information applicable to each sample and the sample_hdr_config box of the trun box may provide individual HDR information applicable to a corresponding sample to each sample.

However, the average_frame_luminance_level field and/or the max_frame_pixel_luminance field of the sample_hdr_config box may have a different meaning from that of the default sample_hdr_config box. The average_frame_luminance_level field may indicate the average of the luminance level of the corresponding video sample. The max_frame_pixel_luminance field may indicate the maximum value of the pixel luminance of the corresponding video sample.

Figure 22:
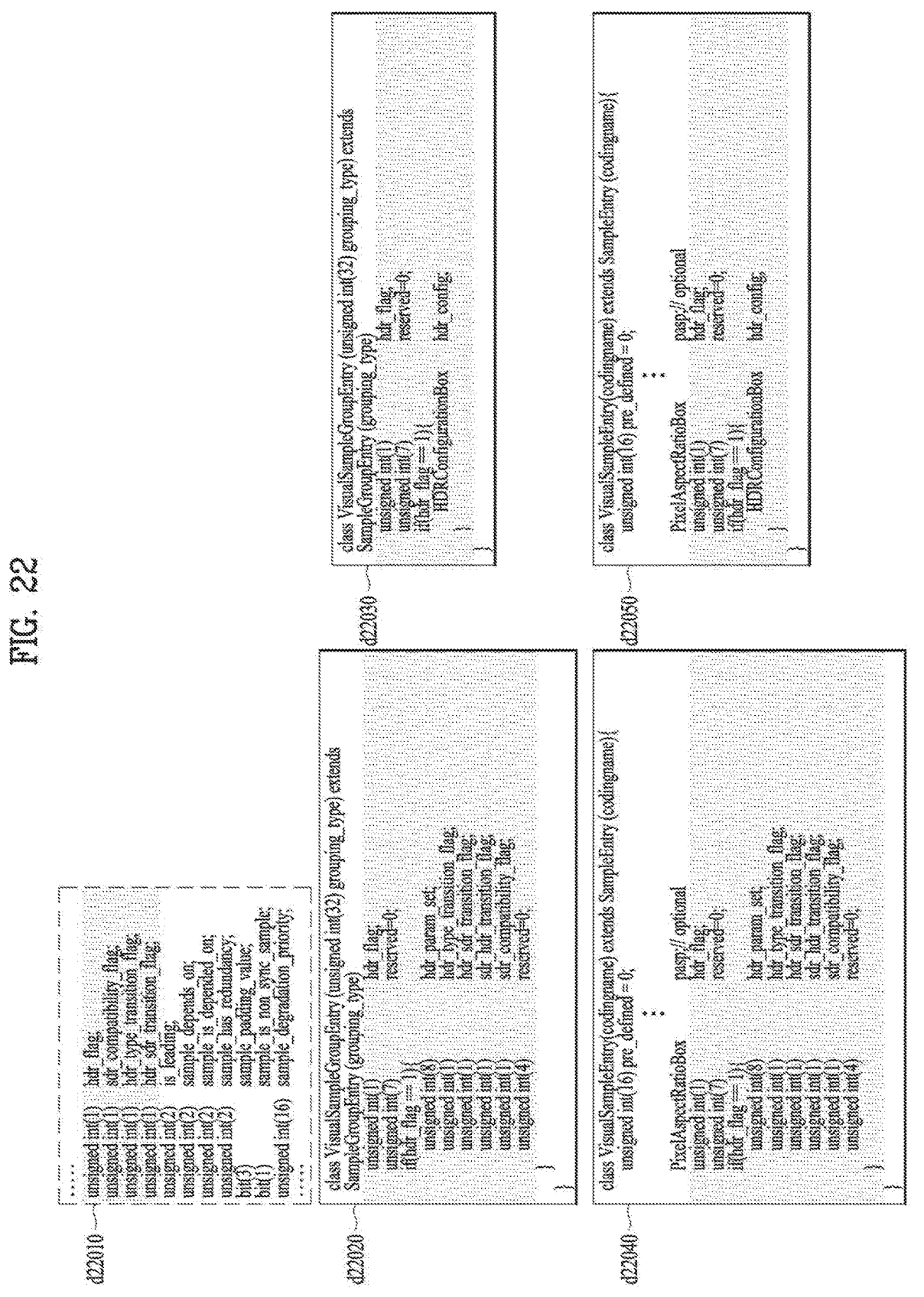

FIG. 22 is a diagram showing a method of defining HDR information in various types of flags, sample group entries or sample entries according to an embodiment of the present invention.

In the illustrated embodiment (d22010). HDR related flags shown in the default_sample_flags in the trex box, the default_sample_flags in the tfhd box, the sample_flags in the trun box and/or the first sample_flags in the trun box may be added.

First, an hdr_flag field may be included on each flag. The hdr_flag field may indicate whether each media sample in the track is an HDR video sample or not. If the value of this field is 1, this may indicate that each sample in the corresponding track is an HDR video sample. In some embodiments, presence/absence of the below-described flag fields may be determined by the value of the hdr_flag field.

The sdr_compatibility_flag field, the hdr_type_transition_flag field and/or the hdr_sdr_transition_flag field may be equal in meaning to the above-described fields having the same names, but may be different therefrom in that the corresponding media sample (HDR video sample) is described.

That is, the sdr_compatibility_flag field may indicate whether the corresponding HDR video sample is compatible with a decoder/display supporting SDR. The hdr_type_transition_flag field may indicate that the HDR information (parameters) of the corresponding HDR video sample and the HDR information of the subsequent HDR video sample thereof may be different. If the value of this field is 1, this may indicate that a current sample is a last HDR video sample, to which existing HDR information is applied, and different HDR information is applicable to subsequent samples thereof. The hdr_sdr_transition_flag field may be a flag indicating whether a current HDR video sample is a last HDR sample and subsequent samples thereof are SDR samples. If the value of this field is 1, this may indicate that the corresponding sample is a last HDR sample and SDR samples follow thereafter.

In the illustrated embodiment (d22020), HDR information may be included in a visual sample group entry. If the same HDR related flag is applicable to one or more video samples present in one track, the same HDR flags as the illustrated embodiment may be further included in the visual sample group entry.

The illustrated HDR related flags may have the same meaning as the above-described flags having the same names, but, in this case, the corresponding sample group may be described. That is, the hdr_flag field may indicate whether the corresponding sample group is composed of HDR video samples. The hdr_param_set field may indicate an identifier indicating a set of HDR related parameter applied to the corresponding sample group. The hdr_type_transition_flag field may indicate whether HDR information (parameters) related to HDR video samples transitions to other HDR information and applies within the corresponding HDR video sample group. The hdr_sdr_transition_flag field may indicate whether transition from HDR to SDR is performed in the corresponding video sample group. The sdr_hdr_transition_flag field may indicate whether transition from SDR to HDR is performed in the corresponding video sample group. The sdr_compatibility_flag field may indicate whether the HDR video samples in the corresponding video sample group are compatible with a decoder/display supporting SDR.

In the illustrated embodiment (d22030), HDR information may be included in a visual sample group entry. If the same HDR information (parameters) is applicable to one or more video samples present in one media file or fragment, an hdr_flag field and an HDR configuration box may be further included in the visual sample group entry as in the illustrated embodiment.

Here, the hdr_flag field may have the same meaning as the hdr_flag field in the above-described visual sample group entry. The information in the HDR configuration box may have the same meaning as the information in the above-described HDR configuration box. However, in this case, the information may describe the corresponding sample group. That is, the information in the HDR configuration box may provide default HDR information (parameters) commonly applicable to the HDR video sample of the corresponding sample group. Here, the average_frame_luminance_level field and/or the max_frame_pixel_luminance field may have different meanings, and the average_frame_luminance_level field may indicate the maximum value of the averages of the luminance levels of the video samples belonging to the corresponding sample group. The max_frame_pixel_luminance field may indicate the largest value of the maximum values of the pixel luminance of the video samples belonging to the corresponding sample group.

In the illustrated embodiment (d22040), HDR information may be included in a visual sample entry. As initialization information necessary to decode the video samples present in one media file or fragment, HDR flag information related to the corresponding sample may be further included in the visual sample entry.

The hdr_flag field may indicate whether the associated video track or sample includes an HDR video sample. The hdr_param_set field may indicate an identifier indicating a set of HDR related parameters applied to the video sample. The hdr_type_transition_flag field may indicate HDR information (parameters) of the associated video track or sample is changed and other HDR information is applied. The hdr_sdr_transition_flag field may be a flag indicating whether the associated video track or sample transitions from HDR to SDR. The sdr_hdr_transition_flag field may be a flag indicating whether the associated video track or sample transitions from SDR to HDR. The sdr_compatibility_flag field may be a flag indicating whether the associated video track or sample is compatible with a decoder/display supporting SDR.

In the illustrated embodiment (d22050), HDR information may be included in a visual sample entry. As initialization information necessary to decode the video samples present in one media file or fragment, HDR information (parameters) related to the corresponding sample may be further included in the visual sample entry.

The hdr_flag field may indicate whether the associated video track or sample includes an HDR video sample. The hdr_config box is an HDR configuration box, and may include HDR information (parameters) of the associated video track or sample. The information included in the above-described HDR configuration box was described above. However, in this case, the information may describe the associated video track or sample.

FIG. 23 is a diagram showing a method of defining HDR information in an HEVC sample entry, an HEVC configuration box or an HEVC decoder configuration record according to an embodiment of the present invention.

In the illustrated embodiment (d23010), HDR information may be included in an HEVCSampleEntry. As initialization information necessary to decode the HEVC samples present in a media file or fragment, HDR information related to each HEVC sample may be added as shown in the figure. The added HDR information may be added in the form of the above-described HDR configuration box, in some embodiments. In some embodiments, the HDR information may be added to an AVCSampleEntry, an AVC2SampleEntry, an SVCSampleEntry, an MVCSampleEntry, etc. using the same method.

In the illustrated embodiment (d23020), HDR information may be included in an HEVCConfigurationBox. As initialization information necessary to decode the HEVC samples present in a media file or fragment, HDR information related to each HEVC sample may be added as shown in the figure. The added HDR information may be added in the form of the above-described HDR configuration box, in some embodiments. In some embodiments, the HDR information may be added to an AVCConfigurationBox, an SVCConfigurationBox, an MVCConfigurationBox, etc. using the same method.

In the illustrated embodiment (d23030), HDR information may be an HEVCDecoderConfigurationRecord. As initialization information necessary to decode the HEVC samples present in a media file or fragment, HDR information related to each HEVC sample may be added as shown in the figure. The added HDR information may be added in the form of the above-described HDR configuration box, in some embodiments. In this case, addition of the HDR configuration box may be performed by an hdr_flag field. In some embodiments, the HDR information may be added to an AVCDecoderConfigurationRecord, an SVCDecoderConfigurationRecord, an MVCDecoderConfigurationRecord, etc. using the same method.

FIG. 24 is a diagram showing a method of defining an HDR information SEI box to store/deliver HDR information according to an embodiment of the present invention.

The present invention defines an HDRInformationSEIBox (d24010). This box includes an SEI NAL unit, and this SEI NAL unit may have an SEI message including HDR related information. The HDR information SEI box may be referred to as an hisb box.

The HDR information SEI box may be included in the visual sample entry, the HEVC configuration box and/or the HEVC sample entry, as in the illustrated embodiments (d24020, d24030 and d24040). In addition, in some embodiments, HDR information SEI box may be included in the AVC sample entry, the MVC sample entry or the SVC sample entry.

Figure 25:
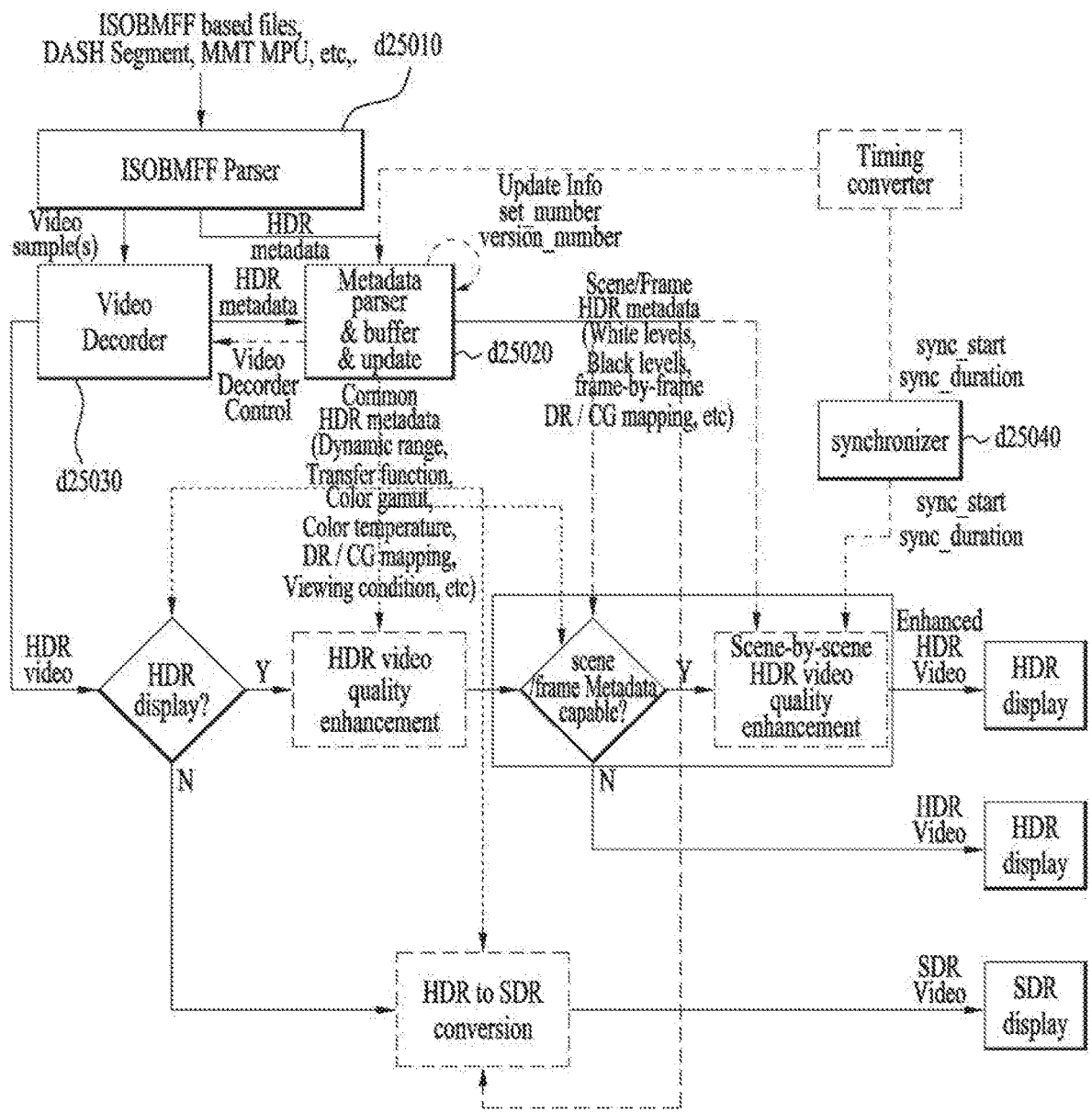
FIG. 25 is a diagram showing media engine operation of a receiver based on HDR information processing capabilities according to an embodiment of the present invention.

FIG. 25 is a diagram showing media engine operation of a receiver based on HDR information processing capabilities according to an embodiment of the present invention.

A parser (ISOBMFF parser) of the receiver may parse an ISOBMFF based media file, a DASH segment and/or an MMT MPU. According to the parsed result, video samples may be delivered to a video decoder and HDR information (metadata) may be delivered to a metadata parser.

A video decoder may decode the video sample to acquire HDR video data. If there is HDR information acquired in this process, this may be delivered to the metadata parser.

The metadata parser may parse the received HDR metadata. Using the metadata acquired herein, control information necessary for a video decoder may be delivered to the video decoder. The metadata parser may be responsible for buffering or metadata update. Update may be performed using a set_number, a version number, etc.

The number of cases may be divided depending on whether the receiver is capable of performing HDR display. If display of HDR video is impossible, HDR video data may be delivered to an SDR display block through HDR-SDR conversion. The SDR display block is a hardware block which may receive and reproduce converted SDR video. At this time, information received from the metadata parser may be used for conversion.

If the receiver is capable of performing HDR display, quality enhancement may be performed with respect to HDR video. At this time, quality enhancement may be performed using common HDR information (dynamic range, transfer function, color gamut, color temperature, DR/CG mapping, Viewing condition, etc.) received from the metadata parser.

The number of cases may be divided depending on whether the receiver is capable of processing scene-by-scene/frame-by-frame metadata. If scene-by-scene/frame-by-frame metadata is not capable of being processed, the HDR display block of the receiver may reproduce the received HDR video data.

If scene-by-scene/frame-by-frame metadata is capable of being processed, scene-by-scene HDR video quality enhancement may be performed. At this time, quality enhancement may be performed using scene/frame HDR metadata (while levels, black levels, frame-by-frame, DR/CG mapping, etc.) received from the metadata parser. In this case, the HDR display block of the receiver may reproduce the enhanced HDR video data. The HDR display block may be a hardware block.

A timing converter may deliver time related information to the metadata parser, a synchronizer, etc. The synchronizer may provide information necessary for scene-by-scene HDR video quality enhancement operation using information such as sync_start or sync_duration.

Figure 26:
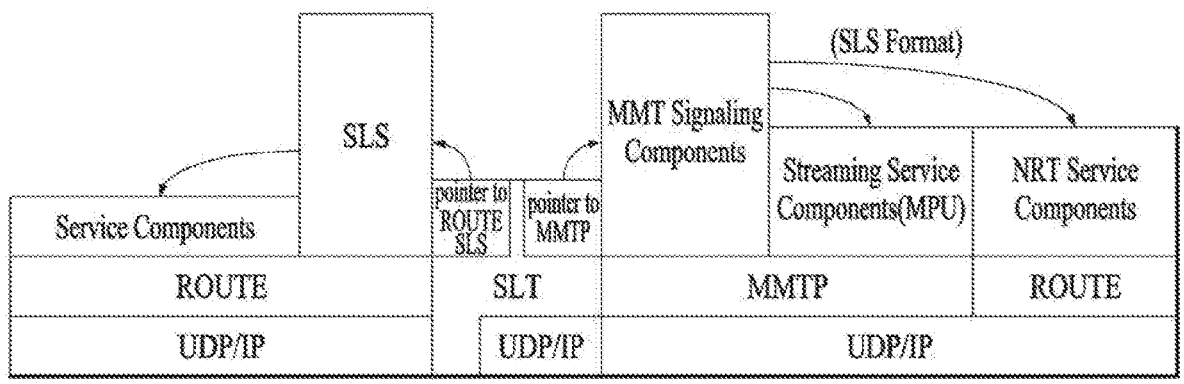
FIG. 26 is a diagram illustrating a bootstrapping process through an SLT according to an embodiment of the present invention.

FIG. 26 is a diagram illustrating a bootstrapping process through an SLT according to an embodiment of the present invention.

As described above, SLS bootstrapping may be performed through bootstrap information of an SLT. As described above, the SLT may be processed into IP/UDP and transmitted or may be transmitted without being processed into IP/UDP. In general, low level signaling (LLS) such as SLT may be delivered by a most robust method in transmission.

If the SLS is transmitted by the ROUTE protocol, the receiver may access the SLS through the bootstrap information of the SLT. Using the information of the ROUTE SLS, the service components of the service may be acquired. Here, the SLS and the service components may be transmitted by the ROUTE, UDP and IP protocols.

If the SLS is transmitted by the MMT protocol, the receiver may access the SLS through the bootstrap information of the SLT. Using the information of the MMTP SLS, the service components of the service may be acquired. The MMTP SLS may include a USBD and/or MMTP message. As described above, the USBD may reference to the MMTP message and the MPT message of the MMTP message may provide information for acquiring streaming components delivered by the MMT protocol. The USBD of the MMT may further reference an S-TSID for acquiring the NRT components of the service delivered by the ROUTE protocol. In addition to the above-described MPT message, other MMTP messages for providing other information may be defined. Here, the SLS and the service components may be transmitted by the MMT, UDP and IP protocols. Here, the NRT components may be transmitted by the ROUTE, UDP and IP protocols. The detailed bootstrapping method has been as described above.

Figure 27:
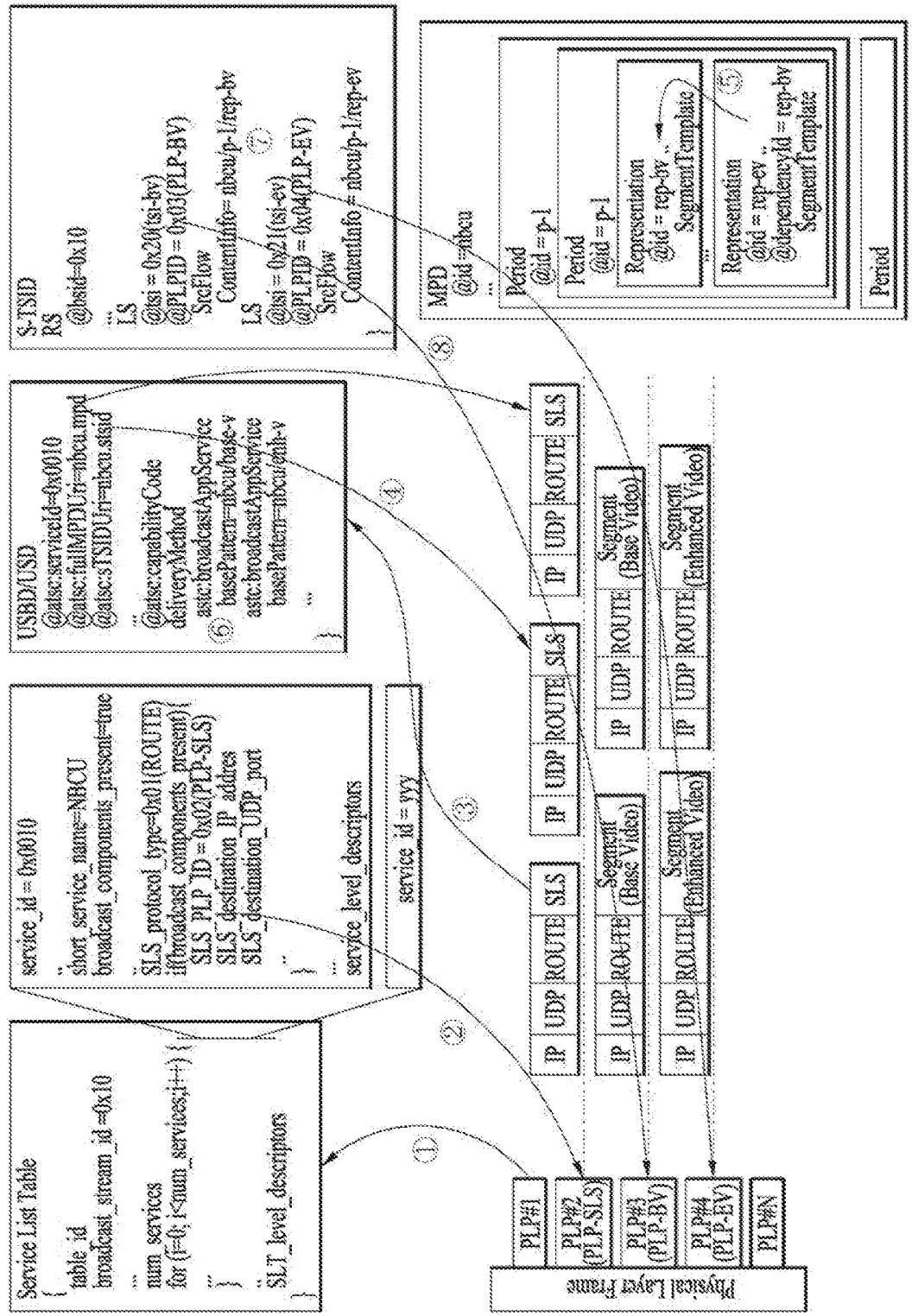
FIG. 27 is a diagram illustrating ROUTE protocol based signaling flow according to an embodiment of the present invention.

FIG. 27 is a diagram illustrating ROUTE protocol based signaling flow according to an embodiment of the present invention.

First, the receiver may acquire an SLT from a physical layer frame (signal frame). The SLT has been described above. Through the SLT, information on a path for acquiring the SLS related to a specific service may be acquired. The SLS (USBD, etc.) may be acquired from the path (transport session, etc.).

Information on the path capable of acquiring the MPD and the S-TSID from the USBD may be acquired and the MPD and the S-TSID may be acquired therefrom. The SLS fragments were as described above. A DASH representation may be selected through the MPD and information such as a segment URL and an ID related to the DASH representation may be acquired. In the illustrated embodiment, information on a representation @id=rep-bv for a base layer of scalable coding content and/or a representation @id=rep-ev for an enhancement layer may be acquired. Here, the representation may correspond to the service component of the service.

Whether segments associated with the DASH representations are transmitted over the broadcast network or broadband network may be checked using the information on the USBD. If the segments are transmitted over the broadcast network, a path (transport session, etc.) capable of acquiring the segments may be acquired using the S-TSID. The receiver may acquire, decode and play the segments back. The detailed bootstrapping process has been described above.

Figure 28:
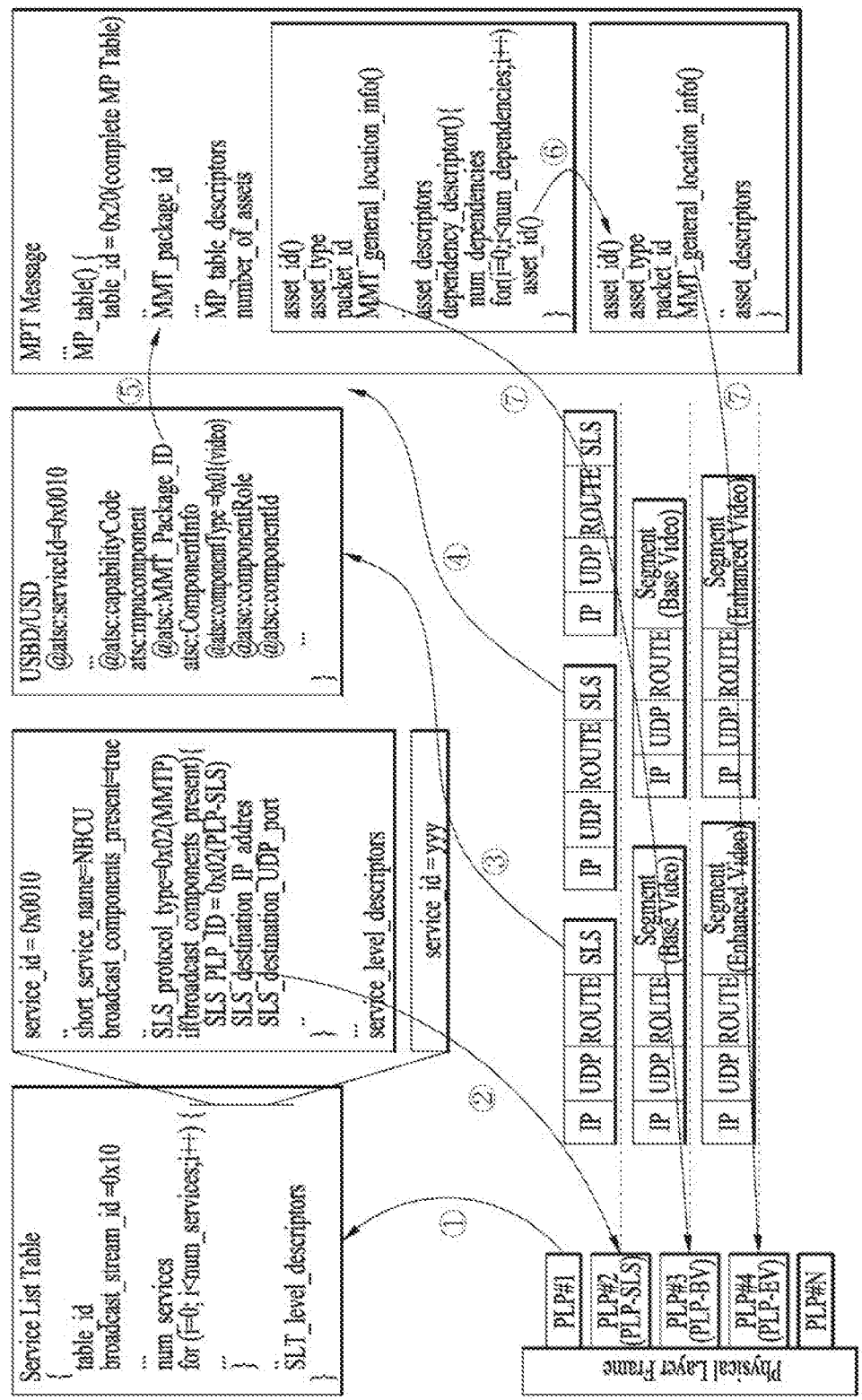
FIG. 28 is a diagram illustrating MMT protocol based signaling flow according to an embodiment of the present invention.

FIG. 28 is a diagram illustrating MMT protocol based signaling flow according to an embodiment of the present invention.

First, a process of acquiring an SLT and acquiring an SLS using the SLT may be identical. In the case of MMT based signaling, the SLS may include a USBD and/or MMTP messages. Information on an MMT package associated with the service may be acquired from the USBD. Using this information, an MPT (MP table) message may be acquired from a service signaling channel. The service components of the service may be acquired through the MPT message. In the illustrated embodiment, information on an asset for a base layer of scalable coding content and/or information on an asset for an enhancement layer may be acquired. In addition, a path (transport session, etc.) capable of acquiring each asset may be acquired. Here, the asset may correspond to the service component of the service. MPUs may be acquired, decoded and played back through the path. The detailed bootstrapping process has been described above.

In some embodiments, MMPT messages other than the MPT message may be defined. Additional information of the service may be delivered through these messages. For example, scalable coding related information, 3D related information, HDR related information, color gamut related information, additional information of service components, etc. may be delivered through these messages. In some embodiments, an MPD for service components delivered over broadband, a table for app signaling and event information may also be delivered through these messages.

FIG. 29 is a diagram showing a portion of USBD according to another embodiment of the present invention. Like a user service description (USD) for ROUTE, MMT, 3GPP, or the like, service signaling information including information on a service may signal service level information, as shown in the drawing. Syntax thereof is the same as in the drawing. The element or attributes may be included in MMT signaling information (e.g., MP Table) or a portion of 3GPP service signaling or ROUTE signaling. Details of the information items have been as described with reference to FIGS. 4 and 5.

FIG. 30 is a diagram showing a portion of USBD according to another embodiment of the present invention. The present invention proposes a method of signaling capability information of a broadcast service and service components included in the service. The present invention proposes a method of signaling video/audio/closed caption information of a service/service component. The present invention proposes a method of signaling information on SMPTE-TT or CEA-809 based closed caption of a service/service component. In some embodiments, the aforementioned information items may be transmitted in SLT or other service signaling information. In some embodiments, the information items may be transmitted in USBD according to ROUTE or MMT. In some embodiments, the information items may be defined as one of ROUTE SLS and may be transmitted with other SLS or may be defined as one of MMTP SLS and may be transmitted in one of the aforementioned MMTP messages. In some embodiments, the information items may be transmitted in MPD and, in this case, may be transmitted in the aforementioned EssentialProperty and/or SupplementalProperty. In some embodiments, the information items may be included in the aforementioned MPT message of MMTP messages or may be transmitted in one of separately defined MMTP messages. In some embodiments, the information items may be defined by various descriptors in an XML or binary form or may be configured with an element and may be transmitted in signaling information according to ROUTE, MMT, 3GPP, or the like. The information items will be described below in detail.

In some embodiments, the aforementioned USBD of ROUTE or MMT may include a ComponentInfo element. The ComponentInfo element has been as described above. In some embodiments, the ComponentInfo element may be extended to further include the illustrated fields.

In the illustrated embodiment, the ComponentInfo element may further include @componentType, @componentRole, @componentGroupId, @essentialIndicator, @dependentComponentID, @protocolType, @rt, @targetDevice, @componentCodec, @componentProfile, @componentLang, @width, @height, Accessibility, Capability, Rating, Targeting, ComponentDescription, and/or ComponentProperty. In some embodiments, only some of the added fields may be added to the ComponentInfo element.

The @componentType may indicate a component type and, when corresponding attribute is set to 2, this may indicate a caption component.

The @componentRole may be attributes indicating a type or role of a component. With regard to the present invention, the @componentRole may indicate that video including a caption as a component is included in a corresponding component. In this case, the @componentRole may be set to 11. The @componentRole may be used for a caption component. When the aforementioned @componentType has a value of 2, @componentRole with 0 may indicate main, @componentRole with 1 may indicate alternate, @componentRole with 2 may indicate supplementary, @componentRole with 3 may indicate Normal, @componentRole with 4 may indicate Easy reader, and @componentRole with 5 may indicate textual description (a textual description describing video component).

The @componentGroupId may be an identifier of a component group. Here, the component group may be collection of components. Components included in a component group may indicate the same scene or may be components that are combined to generate presentation. For example, service components including music, dialog, and sound effects that are used to provide completed audio may be grouped as one component group. Service components including left and right images of a 3D image may be grouped as one component group.

The @essentialIndicator may indicate whether a corresponding component is an essential component for a corresponding service. When this field is 1, the corresponding component may be an essential component for a corresponding service. The @dependentComponentID may indicate identifier(s) of dependent component(s). For example, with regard to an enhanced video component, this field may indicate identifier(s) of base video component(s).

The @protocolType may indicate a transport protocol for transmitting a corresponding component. For example, this field may indicate an ROUTE or MMT protocol. @rt may indicate whether a corresponding component is a real time component.

The @targetDevice may indicate a target device targeted by a corresponding component. For example, when a value of this field is 0, 1, 2, and 3, corresponding components may indicate a primary device, a companion device, primary & companion devices, and a component for inset on a primary screen, respectively.

The @componentCodec may provide codec information for a corresponding component. The @componentProfile may indicate a profile of a corresponding component. The @componentLang may indicate a language used in a corresponding component. This field may be used, in particular, audio and closed caption component. The @width may indicate a horizontal size of video media presentation transmitted by a corresponding video component. The @height may indicate a vertical height of video media presentation transmitted by a corresponding video component.

Accessibility may provide accessibility related information of a corresponding component. Capability may provide capability related information of a corresponding component. Rating may provide rating related information of a corresponding component. Targeting may provide targeting or personalization related information of a corresponding component. The ComponentDescription may provide component description information of a corresponding component. The information may include codec dependent encoding parameters. The ComponentProperty may provide component attributes for processing a corresponding component.

The aforementioned @componentType field in the ComponentInfo element may indicate a type of a corresponding component and, in this regard, when the field has a value of 0, 1, 2, and 3, corresponding components may indicate audio, video, caption, and application components, respectively.

The @componentRole field may indicate a role of a corresponding component. The role may be indicated according to an indicated component type and, in the case of an audio component, when the field has a value of 1, 2, 3, 4, 5, 6, and 7, a corresponding audio component may perform roles of complete main, music, effect, dialog, commentary, visually impaired, hearing impaired, voice over, and subset. Here, the visually/hearing impaired may mean that a corresponding audio component is an audio component for visually/hearing impaired people. The voice over may mean that a corresponding audio component describes a video component.

In the case of a video component, according to a value of the field, a corresponding video component may perform a role of primary video, alternate camera view, sign language, a 3D left image, a 3D right image, 3D video depth information, caption containing video, or the like. In the case of a caption component, according to a value of the field, a corresponding caption component may perform a role of main, alternate, supplementary, normal, easy reader, and the like.

In some embodiments, the remaining part of USBD of the aforementioned ROUTE or MMT may be modified. The modifications may be combined according to the number of cases. In some embodiments, the USBD may further include @providerid, @serviceCategory, @spIndicator, @serviceStatus, @shortServiceName, and/or capabilityCode.

The @providerid may identify a service provider of a corresponding service. The @serviceCategory may indicate a category of a corresponding service. The @spIndicator may be the same as the aforementioned @protected attribute. The @serviceStatus may be the same as the aforementioned @servicestatus attribute. The @shortServiceName may indicate a short name of a corresponding service. The capabilityCode may indicate capability and capability group required to provide meaningful media presentation of a corresponding service by a receiver.

In some embodiments, the USBD may further include @majorChannelNo, @minorChannelNo, and/or @serviceLang as well as the aforementioned Channel element.

The @majorChannelNo and the @minorChannelNo may indicate a major/minor channel number of a corresponding service. The @serviceLang may indicate a primary language of a corresponding service.

In some embodiments, the USBD may further include a dashComponent element instead of the aforementioned routeComponent and broadbnadComponet. The dashComponent element may include @fullMPDUri, @sTSIDUri, and/or deliveryMethod elements.

The @fullMPDUri may provide reference information of MPD for service components transmitted through a broadcast network or a broadband. The @sTSIDUri may provide a transport session related information of a service component of a corresponding service. The deliveryMethod may provide transport related information items of service components of a corresponding service. As described above, the field may further include an element of each of components transmitted through a broadcast network/broadband and/or basePattern information thereof.

FIG. 31 is a diagram showing capability codes according to an embodiment of the present invention.

The capability codes may indicate capabilities of the service or service component as described above. The illustrated codes may be values used in the above-described capability_code field. The categories (video, audio, etc.) of the illustrated capability codes may be values used in the capability_category field.

In some embodiments, the front digits (e.g., 0x01, 0x02, 0x03, . . . ) of the illustrated capability codes may be used to identify the capability category. In this case, the remaining digits of the capability codes may be used to identify the capability.

FIG. 32 is a diagram showing a part of an MP table according to an embodiment of the present invention.

The above-described MPT message may deliver an MP table. As described above, information such as accessibility, 3D and captioning may be delivered through the MMTP message. As illustrated, the information may be delivered in the MPT message as a portion thereof or may be delivered through a separately defined MMTP message as MMT signaling. This information and a delivery method thereof will be described in detail below.

This information may be delivered within the MPT message or the other MMTP message in the format of a descriptor and, in some embodiments, these descriptors may correspond to asset descriptors. In addition, these descriptors may be delivered in DVB SI service signaling such as SDT or EIT or may be delivered along with DVB SI service signaling such as SDT or EIT In some embodiments, in the MMT, information on a service component (corresponding to an asset) may be signaled as illustrated. The MMTP message may further include the below-described fields.

A service_type field may indicate a type of a corresponding service. That is, at least one asset included in a corresponding MP table may refer to a last service for combining and providing at least one asset. For example, the corresponding field may indicate a stereoscopic 3D service, a multiview service, a panorama service, and so on.

An asset_role_flag field may indicate whether role information of the service component (asset) is included. An asset_target_flag field may indicate whether target screen information of the service component is included. An asset_group_flag field may indicate whether the service component belongs to a specific component group. When the service component is included in the specific component group, the value of this field may be 1. An rt_flag field may indicate whether the service component is transmitted in real time or in non-real time. If the value of this field is 1, this may indicate that the service component is transmitted in real time.

An asset_role field may indicate the role of the service component. For example, when the value of this field is 0, 1, 2, 3, 4, 5, 6 or 7, this may indicate that the service component serves the role of primary video, alternate camera view, another alternate video component, sign language, follow subject video, 3D left view, 3D right view or 3D depth information.

An asset target field may indicate a target device of the service component. This may have the same definition as the above-described @targetDevice. The asset_group_id field may provide the identifier of the component group including the service component. The component group has been described above.

FIG. 33 is a diagram showing an asset group descriptor according to an embodiment of the present invention.

The asset group descriptor may describe a component group (asset group) in delivery of a service through an MMT protocol. This descriptor may be delivered through the same path as the above description.

The asset group descriptor may include an asset_group_id field for identifying the component group, a num_of_accessiblity field indicating the number of components (assets) included in the component group and/or an asset_id( ) for identifying each component.

FIG. 34 is a diagram showing accessibility information according to an embodiment of the present invention.

Accessibility information may include information related to accessibility of the service or service component. The accessibility information may be defined in the form of one of the descriptors according to the above-described embodiments or may be defined in the form of an element.

In the illustrated embodiment (t25010), the accessibility information may be defined in the form of a descriptor. @schemeIdUri may be a URI for identifying that the descriptor has an accessibility scheme related to accessibility information. In this case, @schemeIdUri may have a value of unEatsc3.0:accessibility:201x. @value may have values according to the meaning of accessibility scheme. These values will be described below. @id may indicate the identifier of the descriptor. If the same identifier is used, the same scheme ID, value and parameter may be included.

The illustrated embodiment (t25020) may indicate the parameters of the above-described @value. Visually impaired may indicate that a service component is targeted at a viewer who is visually impaired or a viewer with poor vision. Hearing impaired may indicate that a service component is targeted at a hearing-impaired viewer or a viewer with poor hearing. enhanced-audio-intelligibility may indicate whether the audio service component is an audio service component enhanced in terms of intelligibility. 3D supported may indicate whether the service component supports a 3D function. In some embodiments, this may indicate that the service component is included in a 3D service. Normal may indicate whether the service component is a service component for normal viewers (mainly with respect to the closed caption component). Easy reader may indicate whether the service component is an easy reader type service component (mainly with respect to the closed caption component). The easy reader may mean closed captioning which can be easily read.

In some embodiments, the accessibility information may be defined in the form of an accessibility element having the parameters of the above-described @value as sub fields.

In the illustrated embodiment (t25030), the accessibility information may be defined in the form of a descriptor. This descriptor may be delivered in MMT signaling information as described above. This descriptor may be included in the MP table and the DCI table of the above-described MMT. This descriptor may be a type of asset descriptor.

A num_of_accessiblity field may indicate the number of following accessiblity_codes. The accessiblity_code field may indicate accessibility related information. The accessibility related information may be expressed by an accessibility code. For example, if the accessibility code has a value of 0x00, 0x01 or 0x02, these may indicate visually impaired, hearing impaired or 3D support. The accessibility information was as described above. Values 0x03-0xFF may be reserved for future use.

Figure 35:
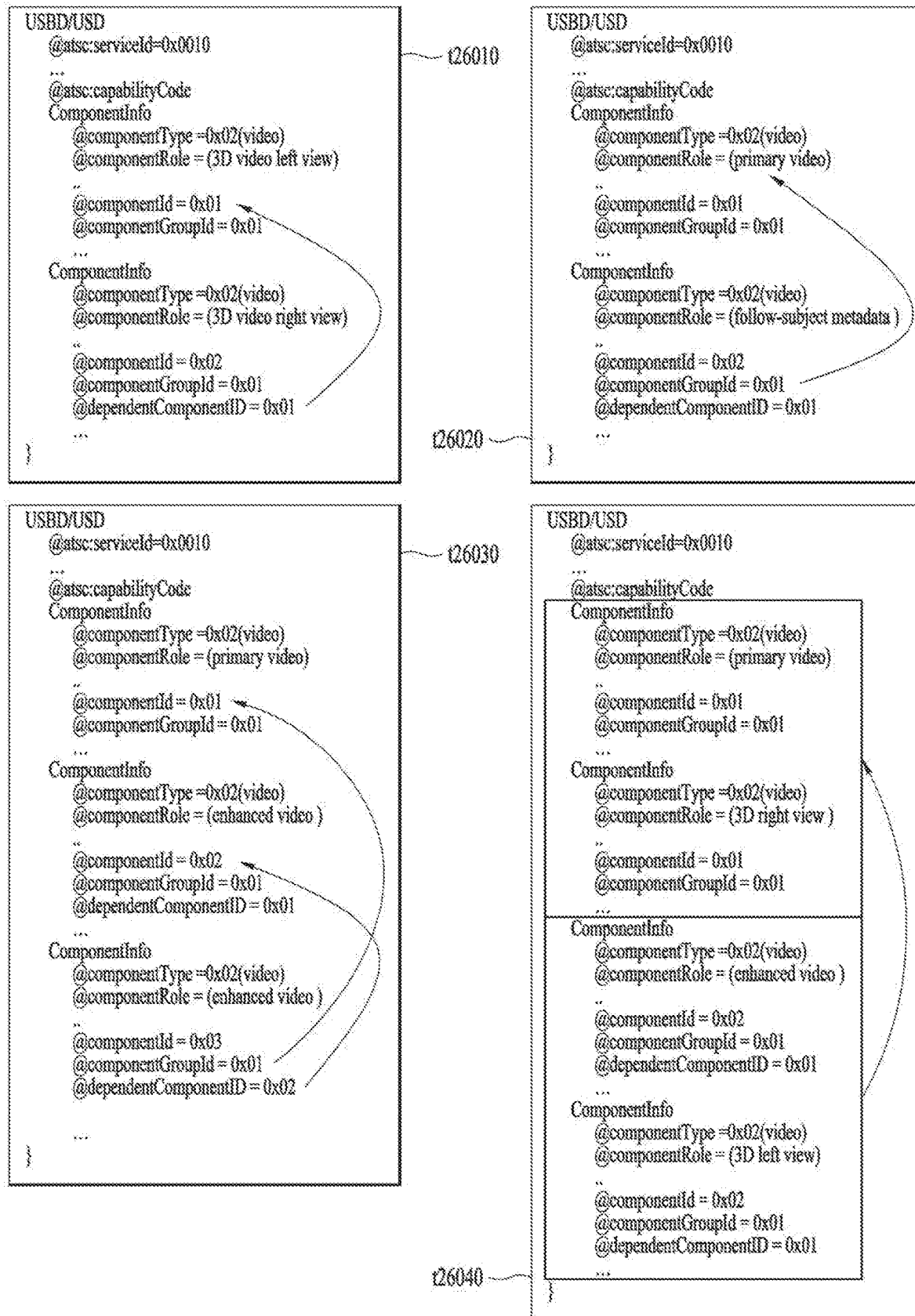
FIG. 35 is a diagram showing ComponentInfo elements in a USBD according to an embodiment of the present invention.

FIG. 35 is a diagram showing ComponentInfo elements in a USBD according to an embodiment of the present invention.

In the illustrated embodiment (t26010), components configuring 3D video are signaled. A first component may be a video component (0x02, video), may indicate that the role of a 3D left view is served (@componentRole=3D video left view) and may have a component ID of 0x01. A second component may also be a video component (0x02, Video), may indicate that the role of a 3D right view is served (@componentRole=3D video right view), and may have a component ID of 0x02.

The two service components may be associated with each other as service components configuring one 3D video and thus may be grouped into the same component group. This component group may have an identifier of 0x01 and this content may be signaled in each componentInfo.Element. If a second component has dependency (dependencyu) on a first component, the @dependentComponentID of the second component may have a value of 0x01 to indicate the component ID of the first component.

In the illustrated embodiment (t26020), follow-subject metadataon another component for a specific video component may be signaled. The first component may be a video component to serve the role of primary video. The second component may be a component which serves the role of the follow-subject metadata of the first component. This role may be signaled and @dependentComponentID may indicate the component ID of the first component. In addition, as the associated components, the first/second component may be included in the same component group (0x01).

In the illustrated embodiment (t26030), one base video component and two enhanced video components may be signaled. If one enhanced video has dependency on the base video and the other enhanced video has dependency on the first enhanced video, as shown, this relation may be signaled using the @dependentComponentID field. In addition, since the video components may configure the same scene, these may be included in the same component group.

In the illustrated embodiment (t26040), the role of a 3D component for two service components and the role in scalable coding are signaled. Since the video components may configure the same scene, these may be included in the same component group.

A first service component (ID=0x01) may serve the roles of a base video component and a right view of a 3D service. For the first service component, two ComponentInfo elements may be described. The elements may have the same service component ID (ID=0x01).

A second service ID (ID=0x02) may serve the roles of an enhanced video component and a left view of a 3D service. Similarly, two ComponentInfo elements may describe the second service component. These elements may have the same service component ID (ID=0x02). In addition, the second service component may have dependency on the first component. The @dependentComponentID may indicate the ID of the first service component.

FIG. 36 is a diagram showing component property information according to an embodiment of the present invention.

The component attribute information may include information related to the attributes of the service or the service component. The component attribute information may be in the form of one of the descriptors according to the above-described embodiments or in the form of an element.

The component attribute information may be referred to as view configuration information in some embodiments. In some embodiments, the component attribute information may mean view configuration information of a video component. Here, the component is a video component and may be a portion of multiview video. If the video component is a portion of a video array, the @role attribute of the view configuration information may indicate the <x, y>-th video component of the <n, m>array.

In the illustrated embodiment (t2710), the component attribute information may be defined in the form of a descriptor. @schemeIdUri may be a URI for identifying that the descriptor has a component attribute scheme related to the component attribute information. In this case, @schemeIdUri may have a value of urn:atsc3.0:view-conf: 201x. @value may have values according to the meaning of the component attribute scheme. These values may be referred to as parameters and may be distinguished by ','. These values will be described below. @id may indicate the identifier of the descriptor. If the same identifier is used, the same scheme ID, value and parameter may be included.

The illustrated embodiment (t27020) may indicate the parameters of the above-described @value. View_x and/or View_y may indicate the origin point of the view of the video component based on the top left of the screen. The fields may indicate the x and y coordinates of the origin point of the view. View_width and View_height may indicate the width and/or height of the view of the video component. View_total_width and/or View_total_height may indicate width and/or height of the entire region in which the video array is displayed based on the top left of the screen. View_display_priority may indicate the priority of the view of the video component. Priority may be priority in display of the view. If views overlap, a view having higher priority may be displayed in front of the other views. That is, the view having higher priority may be overlaid on overlapping portions of the other views. As the value of this field decreases, priority may be regarded as increasing. A view having a value of 0 may be displayed front-most on the screen. A Source_id may be an identifier of the source of the video component. If simultaneously displayed multiview (video array) is divided into several video components to be delivered, the source IDs of the video components may be the same.

In some embodiments, the component attribute information may be defined in the form of a component attribute element having the parameters of the above-described @value as subfields.

In the illustrated embodiment (t27030), the component attribute information may be defined in the form of a descriptor. This descriptor may be delivered in MMT signaling information as described above. This descriptor may be delivered in the above-described MPT message or the other MMTP message. This descriptor may be a kind of asset descriptor.

view_x, view_y, view_width, view height, total_width, total_height, source_id and/or view_priority were as described above. total_width, total_height, and view_priority may be equal to view_total_width, view_total_height, and view_display_priority, respectively.

The source_id_flag may indicate presence of the source_id. The view_total_info_flag field may indicate whether information on the area in which the simultaneously displayed multiview is displayed is included. According to this field, there are total_width and total_height. The view_priority_flag field may indicate whether priority information of the video component is included. According to this field, there is view_priority.

Figure 37:
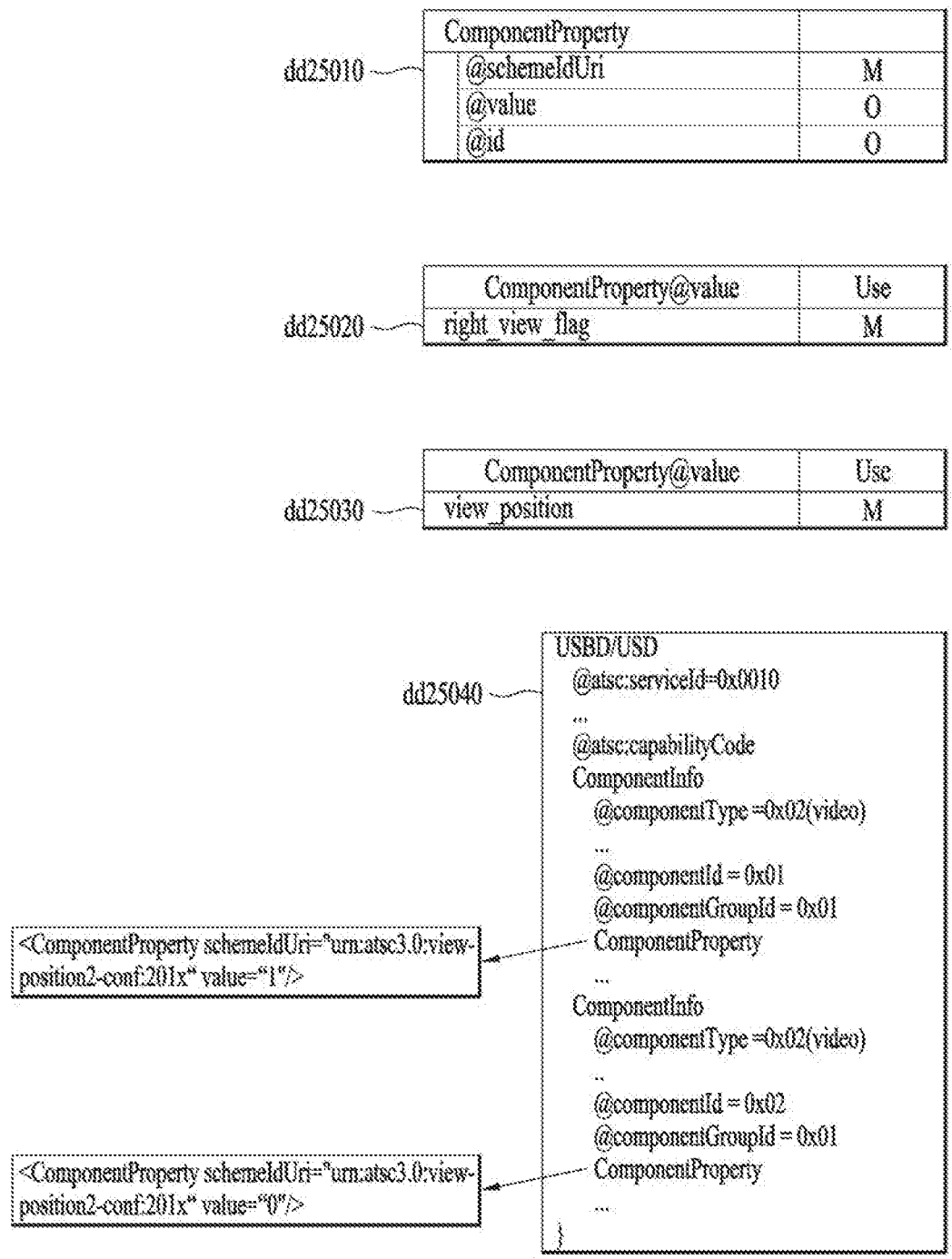
FIG. 37 is a diagram showing component property information according to an embodiment of the present invention.

FIG. 37 is a diagram showing component property information according to an embodiment of the present invention.

The component attribute information may include information related to the attributes of the service or the service component. The component attribute information may be in the form of one of the descriptors according to the above-described embodiments or in the form of an element.

The component attribute information may be referred to as view configuration information in some embodiments. In some embodiments, the component attribute information may mean view configuration information of a video component. Here, the component is a video component and may be a portion of a stereoscopic 3D service.

In the illustrated embodiment (d25010), the component attribute information may be defined in the form of a descriptor. @schemeIdUri may be a URI for identifying that the descriptor has a component attribute scheme related to the component attribute information. In this case, @schemeIdUri may have a value of urn:atsc3.0:view-position-conf:201x. @value may have values according to the meaning of the component attribute scheme. These values may be referred to as parameters and may be distinguished by ','. These values will be described below. @id may indicate the identifier of the descriptor. If the same identifier is used, the same scheme ID, value and parameter may be included.

The illustrated embodiment (d25020) may indicate the parameters of the above-described @value. A right_view_flag field may indicate whether a corresponding video component is a right view or a left view. When the video component is a left view, the value may have 0 and, when the video component is a right view, the value may have 1. When left/right video components constituting the stereoscopic 3D service are separately transmitted, view position configuration information of each video component may be signaled as shown in d25040 by using the above component property element. Left/right video components constitute one scene and, thus, may have the same componentGroupId value.

The component attribute information may be referred to as view position2 configuration information in some embodiments. In some embodiments, the component attribute information may mean view configuration information of a video component. Here, the component is a video component and may be a portion of multiview video.

In the illustrated embodiment (d25010), the component attribute information may be defined in the form of a descriptor. @schemeIdUri may be a URI for identifying that the descriptor has a component attribute scheme related to the component attribute information. In this case, @schemeIdUri may have a value of urn:atsc3.0:view-position2-conf:201x. @value may have values according to the meaning of the component attribute scheme. These values may be referred to as parameters and may be distinguished by ','. These values will be described below. @id may indicate the identifier of the descriptor. If the same identifier is used, the same scheme ID, value and parameter may be included.

The illustrated embodiment (d25030) may indicate the parameters of the above-described @value. View position information (view_position field) may refer to view position information of a corresponding video component in a multiview service. The view position information (view_position field) may be set to 0 with respect to a first view positioned in a leftmost portion among multiviews. In addition, the view position information may be set to a value that is increased by 1 whenever being moved to a next view from a first view in a direction toward a right side from a left side. Here, the multiview may be a 3D multiview or a multiview for a panorama. Here, in the case of the 3D multiview, the aforementioned view position information may include the meaning of a left view or a right view for each view. That is, based on view position information expressed in the number, whether a view included in the corresponding component is a left view or a right view for providing a 3D service may be verified. When video components corresponding to the respective views constituting a multiview service are separately transmitted, view position2 configuration information for each video component may be signaled as shown in d25040 by using the above component property element. Video components constituting one scene among multiviews may have the same componentGroupId value. In addition, video components constituting another scene may have different componentGroupID values.

Figure 38:
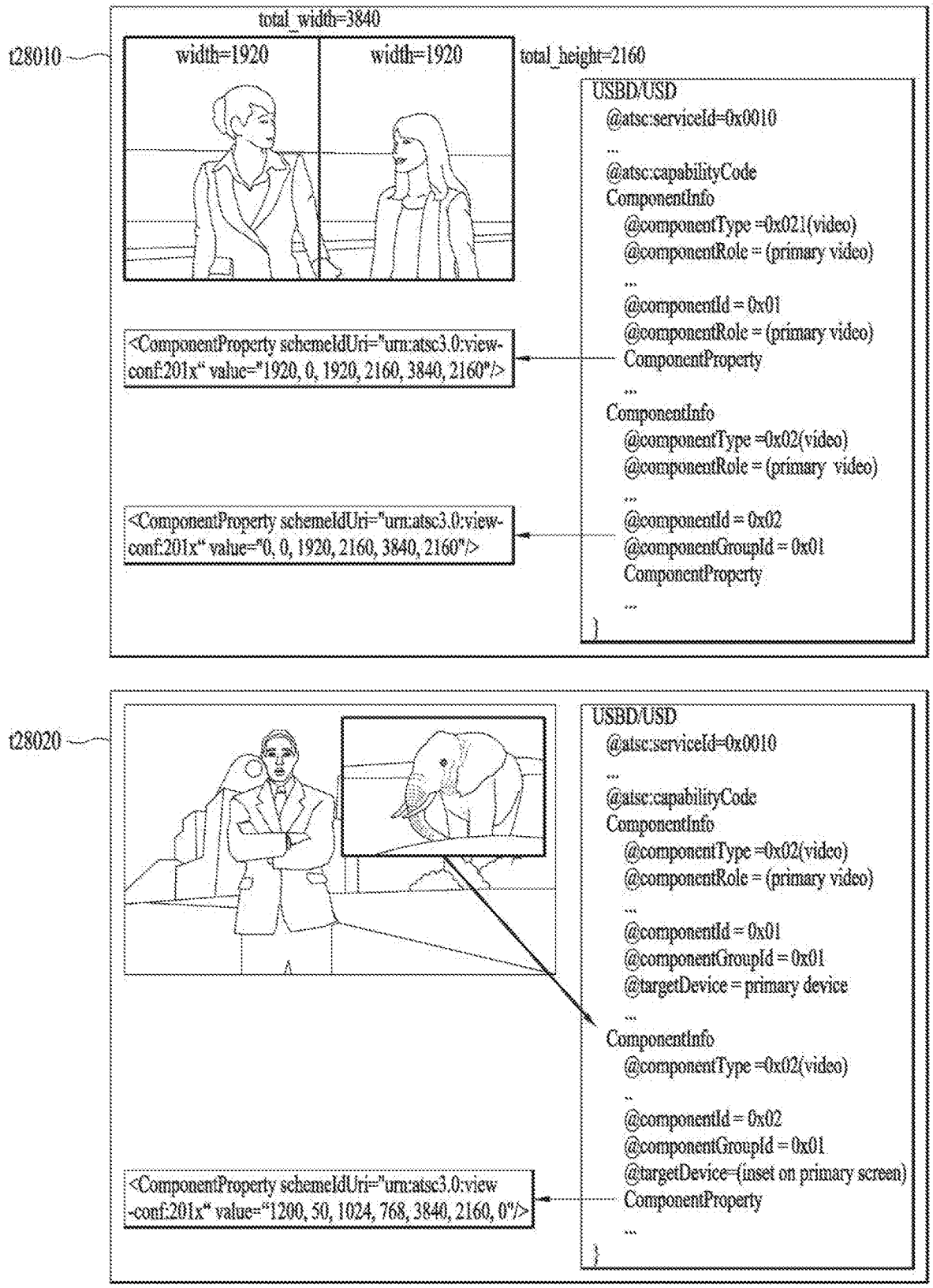
FIG. 38 is a diagram showing usage of component property information according to an embodiment of the present invention.

FIG. 38 is a diagram showing usage of component property information according to an embodiment of the present invention.

In the illustrated embodiment (t28010), one screen may be divided into two video components and delivered. In this case, view configuration information of eachvideo component may be signaled as a componentProperty element as described above. These configure one scene and thus have the same componentGroupId value. The componentProperty element of the ComponentInfo element of each component may have the above-described view configuration information.

Both components have a scheme ID of urn:atsc3.0:view-conf:201x and @value may have "1920, 0, 1920, 2160, 3840, 2160", and "0, 0, 1920, 2160, 3840, 2160". The parameters of @value may have meanings according to the definitions of the above-described parameters in this order.

In the illustrated embodiment (t28020), a video component including sign language may be delivered along with a video component for providing one main video. In this case, the sign language video component may provide information where the sign language view is displayed in a region in which main video is displayed. This information may be signaled in the form of the above-described view configuration information.

Similarly, PIP (Picture in Picture) may also provide view configuration information similarly to the sign language. Here, the sign language or the PIP view is displayed in front of the main video and thus may have higher priority than the main video. These components may be included in the same component group and the sign language component or the PIP component may indicate that the @targetDevice attribute is "inset of the primary screen".

The view configuration information of the sign language component or the PIP component may have a scheme ID of urn:atsc3.0:view-conf:201x and @value may have "1200, 50, 1024, 768, 3840, 2160, 0". The parameters of the @value may have meanings according to the definitions of the above-described parameters in this order.

The above-described capability information may also be signaled. The capability information may be in the form of one of the descriptors according to the above-described embodiments or in the form of an element. The capability scheme ID of the capability information may be defined and the values thereof may be defined. In addition, the capability information may be defined in the form of a capability element having the parameters of @value as sub fields. The capability information may be defined in the form of a descriptor and may be delivered in the MMT signaling information. This descriptor may be delivered in the above-described MPT message or the other MMTP message. This descriptor may be a kind of asset descriptor. The fields, parameters and structure of the capability were as described above.

FIG. 39 is a diagram showing a device capabilities information (DCI) table as a signaling table according to an embodiment of the present invention. MMT signaling may include a DCI table as a signaling table for providing information on device capabilities required for component consumption of a broadcast service. The DCI table may include table_id, version, length, number_of_assets, asset id( ) mime_type( ) and codec_complexity_flag information. The DCI table may further include information such as video_average_bitrate, video_maximum_bitrate, horizontal_ resolution, vertical_resolution, temporal_resolution, and video_minimum_buffer_size of video_codec_complexity when codec_complexity_flag is set to 1 and top level mime_type( ) of each asset is video. The DCI table may further include information such as audio_average_bitrate, audio_maximum_bitrte, and audio_minimum_buffer_size of audio_codec_complexity when codec_complexity_flag is set to 1 and top level mime_type( ) of each asset is audio. The DCI table may further include required_storage information of download_capability when codec_complexity_flag is set to 0. The DCI table may further include asset_descriptors and may further include num_asset_descriptors information therein. The DCI table may further include asset_descriptors corresponding to num_asset_descriptors and may further include asset_descriptors_byte information including content of each of asset_descriptors.

The table_id information may indicate an identifier of a DCI table. The version information may indicate version information of a DCI table. The length information may indicate length information of fields subsequent to a corresponding field. The number_of_assets information may indicate the number of assets, which is specified by a DCI table. The asset_id( ) may indicate an identifier of each asset and the mime_type( ) information may indicate mime time of each asset. The codec_complexity_flag may be flag information indicating codec complexity. The video_average_bitrate information may indicate an average bitrate of video data and the video_maximum_bitrate information may indicate a maximum bitrate of video data. The horizontal_resolution information may indicate horizontal resolution, the vertical_resolution information may indicate vertical resolution, and the temporal_resolution information may indicate time resolution. The video_minimum_buffer_size information may indicate a minimum buffer size for video data. The audio_average_bitrate information may indicate an average bitrate of audio data⊖ average bitrate and the audio_maximum_bitrate information may indicate a maximum bitrate of audio data. The audio_minimum_buffer_size information may indicate a minimum buffer size for audio data. The download_capability may define capability required for downloading and may include required_storage information indicating a storage size required for downloading. The num_asset_descriptors information may indicate the number of asset descriptors. The asset_descriptors_byte information may include an asset level descriptor including asset related detailed information, etc. according to a value or the like of the mime_type( ).

FIG. 40 is a diagram showing HEVC video component description information according to an embodiment of the present invention.

The HEVC video component description information may include information related to HEVC video of the service or the service component. The HEVC video component description information may be referred to as HEVC video information. The HEVC video information may include a component related encoding parameter or a parameter for rendering the component. The HEVC video information may be in the form of one of the descriptors according to the above-described embodiments or in the form of an element.

In the illustrated embodiment (t29010), the HEVC video information may be defined in the form of a descriptor. @schemeIdUri may be a URI for identifying that the descriptor has an HEVC video scheme related to HEVC video information. In this case, @schemeIdUri may have a value of urn:atsc3.0:hevc:201x. @value may have values according to the meaning of the HEVC video information scheme. These values will be described below. @id may indicate the identifier of the descriptor. If the same identifier is used, the same scheme ID, value and parameter may be included.

The illustrated embodiment (t29020) may indicate the parameters of the above-described @value.

profile_space may be equal to the general_profile_space value included in the SPS of the bitstream with respect to the HEVC video stream. An HEVC temporal video subset or HEVC temporal video sub-bitstream may be equal to the sub_layer_profile_space value included in the SPS of the bitstream.

tier_flag may be equal to the general_tier_flag value included in the SPS of the bitstream with respect to the HEVC video stream. An HEVC temporal video subset or HEVC temporal video sub-bitstream may be equal to the sub_layer_tier_flag value included in the SPS of the bitstream.

profile_idc may be equal to the general_profile_value included in the SPS of the bitstream with respect to the HEVC video stream. An HEVC temporal video subset or HEVC temporal video sub-bitstream may be equal to the sub_layer_profile_idc value included in the SPS of thebitstream.

profile_compatibility_indication may be equal to the general_profile_compatibility_flag[i] value included in the SPS of the bitstream with respect to the HEVC video stream. An HEVC temporal video subset or HEVC temporal video sub-bitstreammay be equal to the sub layer_profile_compatibility_flag[i] included in the SPS of the bitstream.

progressive_source_flag may be equal to the general_progressive_source_flag value included in the SPS of the bitstream with respect to the HEVC video stream. An HEVC temporal video subset or HEVC temporal video sub-bitstream may be equal to the sub_layer_progressive_source_flag value included in the SPS of the bitstream interlaced_source_flag may be equal to the value included in the SPS of the bitstream with respect to the HEVC video stream. An HEVC temporal video subset or HEVC temporal video sub-bitstream may be equal to the sub_layer_interlaced source flag value included in the SPS of the bitstream.

non_packed_constraint_flag may be equal to the general_non_packed_constraint_flag value included in the SPS of the bitstream with respect to the HEVC video stream. An HEVC temporal video subset or HEVC temporal video sub-bitstream may be equal to the sub_layer_non_packed_constraint_flag included in the SPS of the bitstream.

frame_only_constraint_flag may be equal to general_frame_only_constraint_flag value included in the SPS of the bitstream with respect to the HEVC video stream. An HEVC temporal video subset or HEVC temporal video sub-bitstream may be equal to the sub_layer_frame_only_ constraint_flag included in the SPS of the bitstream.

reserved_zero_44 bits may be equal to the general_reserved_zero_44 bits value included in the SPS of the bitstream with respect to the HEVC video stream. An HEVC temporal video subset or HEVC temporal video sub-bitstream may be equal to the sub_layer_reserved_zero_44 bits included in the SPS of the bitstream.

level_idc may be equal to the general_level_idc value included in the SPS of the bitstream with respect to the HEVC video stream. An HEVC temporal video subset or HEVC temporal video sub-bitstream may be equal to the sub_layer_level_idc value included in the SPS of the bitstream.

HEVC_still_present_flag may indicate whether the HEVC video stream or HEVC highest temporal sub-layer representation includes HEVC still pictures.

HEVC_24 hr_picture_present_flag may indicate whether the HEVC video stream or HEVC highest temporal sub-layer representation includes HEVC 24-hours pictures.

temporal_id_min and/or temporal_id_max may indicate the smallest temporalId value and/or the largest temporalId value among HEVC AUs included in the HEVC video stream.

In some embodiments, the HEVC video information may be defined in the form of an HEVC video information element having the parameters of the above-described @value as sub fields.

In the illustrated embodiment (t29030), the HEVC video information may be defined in the form of a descriptor. This descriptor may be delivered in MMT signaling information as described above. This descriptor may be delivered in the above-described MPT message or the other MMTP message. This descriptor may be a type of asset descriptor. If an MMT asset is an HEVC video stream component, the asset type of the MP table may be assigned a value corresponding to the HEVC video stream.

profile_space, tier_flag, profile_idc, profile_compatibility_indication, progressive_source_flag, interlaced_source_flag, non_packed_constraint_flag, frame_only_ constraint_flag, reserved_zero_44 bits, level_idc, HE still_present_flag, HEVC_24 hr_picture_present_flag, temporal_id_ min and temporal_id_max may be included in the descriptor and the meanings thereof were as described above.

FIG. 41 is a diagram showing HEVC timing & HRD information according to an embodiment of the present invention.

The HEVC timing & HRD information may include timing information and HRD description associated with the HEVC video stream component. The HEVC timing & HRD information may be in the form of one of the descriptors according to the above-described embodiments or in the form of an element. This may be expressed by the above-described componentProperty element.

In the illustrated embodiment, the HEVC timing & HRD information may be defined in the form of a descriptor. @schemeIdUri may be a URI for identifying that the descriptor has a scheme related to the HEVC timing & HRD information. In this case, @schemeIdUri may have a value of urn:atsc3.0:hevc-timing:201x. @value may have values according to the meaning of the scheme. These values will be described below. @id may indicate the identifier of the descriptor. If the same identifier is used, the same scheme ID, value and parameter may be included.

The illustrated embodiment (t30010) may indicate the parameters of the above-described @value. hrd_management_valid_flag may indicate whether Buffering Period SEI and Picture Timing SEI messages are present in the HEVC video stream or the HEVC highest temporal sub-layer representation. picture_and_timing_info_present_flag may indicate whether 90 kHz_flag for accurate mapping with a 90-kHz system clock and parameters associated therewith are included in this descriptor. 90 kHz_flag may indicate whether frequency of the time base of the HEVC video stream is 90 kHz or not. N and/or K may provide N and K parameter values related to a time scale. In the HEVC video stream or the HEVC highest temporal sub-layer representation, the frequency of the HEVC time base may be defined by the vui_time_scale element of the VUI parameter. A relation between HEVC time_scale and STC may be defined by the N and K parameters and may be expressed by HEVC time_scale=(N×system_clock_frequency)/K. If 90 kHz_flag is 1, N may have a value of 1 and K may have a value of 300. If 90 kHz_flag is 0, N and K values may be provided by the N and K fields. num_units_in_tick may be coded into the vui_num_units_in_tick field of the VUI parameter, and the value of this field is applicable to the HEVC video stream or the HEVC highest temporal sub-layer representation related to the HEVC timing & HRD description information.

In some embodiments, HEVC timing & HRD information may be defined in the form of an HEVC timing & HRD information element having the parameters of the above-described @value as sub fields.

In the illustrated embodiment (t30020), the HEVC timing & HRD information may be defined in the form of a descriptor. This descriptor may be delivered in MMT signaling information as described above. This descriptor may be included in the MP table and the DCI table of the above-described MMT. This descriptor may be a type of asset descriptor.

hrd_management_valid_flag, picture_and_timing_info_present_flag, 90 kHz_flag, N, K and/or num_units_in_tick may be included in this descriptor and the meanings thereof were as described above.

FIG. 42 is a diagram showing caption information according to an embodiment of the present invention.

The caption information may include caption description information if the service component is a closed caption stream component. The caption information may be in the form of one of the descriptors according to the above-described embodiments or in the form of an element. This may be indicated by the above-described componentProperty element.

In the illustrated embodiment, the caption information may be defined in the form of a descriptor. @schemeIdUri may be a URI for identifying that the descriptor has a caption scheme related to the caption information. In this case, @schemeIdUri may have a value of urn:atsc3.0:caption:201x. @value may have values according to the meaning of the caption information. These values will be described below. @id may indicate the identifier of the descriptor. If the same identifier is used, the same scheme ID, value and parameter may be included.

The illustrated embodiment (t31010) may indicate the parameters of the above-described @value. caption_codec may indicate the encoding type of the caption component. In some embodiments, "CEA-608", "CEA-708", "SMPTE-TT", etc. may be indicated. lang may include language information of the caption component. A caption_service_number value may include the service number of the caption if the type of the caption is CEA-708. An easy_reader_flag value may indicate whether the caption component is of an easy reader type. An aspect_ratio value may indicate a display aspect ratio of the caption component. In some embodiments, an aspect ratio of "4:3" or "16:9" may be indicated. 3D supported may indicate whether the caption component supports 3D.

In some embodiments, the caption information may be defined in the form of a caption element having the parameters of the above-described @value as sub fields.

In the illustrated embodiment (t31020), the caption information may be defined in the form of a descriptor. This descriptor may be delivered in MMT signaling information as described above. This descriptor may be included in the MP table and the DCI table of the above-described MMT. If the MMT asset is a closed caption component, the asset type of the MP table may be assigned a value corresponding to a closed caption stream. In some embodiments, the asset type of the MP table may include a descriptor illustrated as an asset descriptor while indicating the value corresponding to the HEVC video stream. In this case, this may indicate that closed caption data is included in the HEVC video bitstream. This descriptor may be a type of asset descriptor.

caption_lang, caption_codec, easy_reader, wide_aspect_ratio, 3d_supported and/or caption_service_number may be included in this descriptor and the meanings thereof were as described above. caption_lang, easy_reader and wide_aspect_ratio may be equal to the above-described lang, easy_reader_flag, and aspect_ratio. If the value of the caption_codec is 0x01, 0x02, 0x03, 0x04 or 0x05, this may indicate that the encoding types of "CEA-608", "CEA-708", "SMPTE timed text", "EBU-TT-D" or "CFF-TT" were respectively used. The url_flag, URL_length and URL_text fields may be equal to those of the above-described caption information.

For example, if the closed caption component includes an English caption based on SMPTE-TT, the descriptor may have a scheme ID of "urn:atsc3.0:caption:201x" and @value may have values of "SMPTE-TT, ENG, false, 4:3,false". The parameters of @value may have meanings according to the definitions of the above-described parameters in this order.

If the closed caption data based on CEA-708 is included in the bitstream of the HEVC video stream component, the closed caption information may be signaled by the above-described method, along with the above-described HEVC video data related information.

FIG. 43 is a diagram showing caption information according to another embodiment of the present invention. When a corresponding service component is a closed caption stream component, the caption information may include caption description information related thereto. The caption information may have one of forms of the descriptors according to the aforementioned embodiments or may have a form of an element. The information may be represented by the aforementioned componentProperty element or the like. Furthermore, when Representation/AdaptationSet, etc. include a closed caption/subtitle in DASH, the information may include the following form as an Essential Property Descriptor, a supplemental Property Descriptor, or the like of DASH MPD. In the illustrated embodiment, caption information may be defined in the form of a descriptor. The @schemeIdUri may be a URI for identifying that a corresponding descriptor has a caption scheme related to caption information. In this case, the @schemeldUri may have a value of urn:atsc3.0:caption:201x. The @value may have values, the meaning of which is defined according to a caption scheme. The values will be described below. The illustrated embodiment may indicate each of parameters of the aforementioned @value. The caption_codec may indicate an encoding type of a corresponding caption component. In some embodiments, the field may indicate "CEA-608", "CEA-708", "SMPTE-TT", or the like. The lang may include language information of a corresponding caption component. The caption_service_number may include a service number of a corresponding caption when a type of a corresponding caption component is CEA-708. The accessibility may indicate a target user, etc. of a closed caption/subtitle included in a corresponding caption component and information thereof may have the following values. In detail, the information may indicate 0: normal, 1: easy reader, 2: visually impaired, and 3: hearing impaired. The aspect ratio may indicate a display aspect ratio of a corresponding caption component. In some embodiments, the field may indicate "4:3", "16:9", "21:9", and the like. The alternative_aspect_ratio may indicate a compatible display aspect ratio of a corresponding caption component. In some embodiments, the field may indicate "4:3", "16:9", "21:9", and the like. The scaling_support may indicate whether an original closed caption/subtitle region of the closed caption/subtitle is extensible as necessary during presentation on a receiver. Alternatively, the field may indicate whether the closed caption/subtitle, etc. include a detailed parameter according to extension. When a corresponding region is extensible during presentation on a receiver, the field may have '1'. The scrolling_support may indicate whether scrolling of an original closed caption/subtitle region of the closed caption/subtitle is supported on a receiver. Alternatively, the field may indicate whether a detailed parameter according to thereto is included in a closed caption/subtitle. When scrolling is enabled, corresponding information may have '1'. The playout_speed may indicate play-out speed of an original closed caption/subtitle region of the closed caption/subtitle during presentation on a receiver. The extended_color_use may indicate whether the closed caption/subtitle uses a color value configured with 8 bits or more. The 3D supported may indicate whether a corresponding caption component supports 3D. The 3D_disparity may indicate a 3D location of the front-most closed caption/subtitle of a caption based on a screen when the closed caption/subtitle supports 3D. When the 3D_disparity has a negative value, the information may indicate a degree of a forward protrusion effect based on a screen and, when the 3D_disparity has a positive value, this may be used in an opposite way. The information may explicitly indicate a front-most value (minimum disparity) of disparity of a plurality of closed caption regions in video. In some embodiments, the caption information may be defined in the form of a caption element having each of parameters of the aforementioned @value as a sub field.

FIG. 44 is a diagram showing detailed information of caption related information according to an embodiment of the present invention. When the closed caption/subtitle supports scrolling or the like, MPD may signal a detailed parameter or the like in a format shown in an upper part of the drawing. A scrolling related detailed parameter may include @schmeldUri and, for example, may be set like urn:mpeg:dash:closed-caption-scroll:201x. This may indicate a scheme ID for a closed caption/subtitle scrolling configuration scheme. @value may include Scrolling_direction, scrolling_type, scrolling_amount, and/or scrolling_speed information. The Scrolling_direction information may indicate information on a direction in which a closed caption/subtitle region of the closed caption/subtitle is scrolled on a receiver. In detail, the corresponding information may have a value of "Top2Bottom", "Bottom2Top", "Left2Right", "Right2Left", and the like. This has been as described above. The scrolling_type information may indicate a proceeding type of scrolling, etc. when the closed caption/subtitle region of the closed caption/subtitle supports scrolling on a receiver. For example, this may indicate whether scrolling is performed in units of lines (or cells) or is performed in units of pixels. The scrolling_amount information may indicate a scrolling degree, etc. when the closed caption/subtitle information of the closed caption/subtitle supports scrolling on a receiver. This may be represented by a cell number, a pixel number, or the like. The scrolling_speed information may indicate scrolling speed, etc. when an original closed caption/subtitle region of the closed caption/subtitle supports scrolling on a receiver. This may be represented in units of seconds (if necessary, this may be represented down to decimal places).

MPD may signal a detailed parameter, etc. in the illustrated format when an original closed caption/subtitle region of the closed caption/subtitle is extensible as necessary during presentation on a receiver. The scaling related detailed parameter may include @schmeldUri and, for example, may be set like urn:mpeg:dash:closed-caption-scale:201x. This may indicate a scheme ID for a closed caption/subtitle scaling configuration scheme. @value may include scale_direction and/or scale_limit information. The scale_direction information may indicate information on a direction in which a closed caption/subtitle region of a closed caption/subtitle is extensible. In detail, the corresponding information may have a value of "Top", "Bottom", "TomNBottom", "Left", "Right", "LeftNRight", "All", or the like. This has been as described above. The scale_limit information may indicate an extension limit degree or the like when the closed caption/subtitle region of the closed caption/subtitle is extensible. This may be represented by a cell number, a pixel number, or the like or may be represented by a percentage degree or the like. This has been as described above.

FIG. 45 is a diagram showing detailed information of caption related information according to an embodiment of the present invention. MPD may signal offset of presentation timing included in the closed caption/subtitle in the form shown in a lower part of the drawing. Furthermore, the MPD may indicate presentation offset of a video/audio component or the like. A presentation timing offset related detailed parameter may include @schmeldUri and, for example, may be set like urn:mpeg:dash:presentation_offset:201x. This may indicate a scheme ID for presentation offset of media essence including the closed caption/subtitle. The @value may include Time_format and/or Time_value information. The Time_format information may indicate format information of presentation timing offset. This may have a value of clock, offset, or the like. The Time_value information may include a presentation timing offset value. This may be represented in different formats according to the time_format. For example, when the time_format is clock, this may be represented in the form of hour: minute: second (seconds or frames of decimal places). This may be represented in the form of hours ":" minutes ":" seconds (fraction ":" frames ("." sub-frames)). According to another embodiment of the present invention, when the time_format is offset, this may be represented in the form of a tick number based on tick_rate: tick_rate. When the closed caption/subtitle is based on a timed text, the caption information may include information on presentation start and end of the closed caption. A receiver may adjust presentation timing included in the closed caption/subtitle based on the above signaling information.

FIG. 46 is a diagram showing HDR information according to an embodiment of the present invention.

The HDR information may include HDR parameter information if the service component is a video component. The HDR information may be in the form of one of the descriptors according to the above-described embodiments or in the form of an element. This may be indicated by the above-described componentProperty element or ComponentDescription element.

In the illustrated embodiment, the HDR information may be defined in the form of a descriptor. @schemeldUri may be a URI for identifying that the descriptor has an HDR scheme related to the HDR information. In this case, @schemeldUri may have a value of urn:atsc3.0:hdr:201x. @value may have values according to the meaning of the HDR scheme. These values will be described below. @id may indicate the identifier of the descriptor. If the same identifier is used, the same scheme ID, value and parameter may be included.

The illustrated embodiment (t32010) may indicate the parameters of the above-described @value. OETF_type may indicate the type of the source OETF (opto-electronic transfer function) of this video data. The values 1, 2 and 3 of this field may correspond to ITU-R BT.1886, ITU-R BT.709, and ITU-R BT.2020 types, respectively. The other values may be reserved for future use.

max_mastering_display_luminance may indicate the peak luminance value of the mastering display of this video data. This value may be an integer from 100 to 1000. min_mastering_display_luminance may indicate the minimum luminance value of the mastering display of this video data. This value may be a fractional number from 0 to 0.1.

average_frame_luminance_level may indicate the average value of the luminance value of one video sample. In addition, this field may indicate a maximum value among the average values of the luminance levels of the samples belonging to a video track (stream) or a sample group. max_frame_pixel_luminance may indicate a maximum value of the pixel luminance values of one video sample. In addition, this field may indicate the largest value of the maximum values of the pixel luminance belonging to a video track (stream) or a sample group.

hdr_type_transition_flag may be a flag indicating whether the HDR information of this video data is changed and thus another type of HDR information is applied. For example, if the HDR parameters which were oeft:3, max_lurn:100, min_lurn:0.5, max_frame_lurn:0, max_pixel_lurn:0 are changed to oeft:1, max_lurn:1000, min_lurn:0.05, max_frame_lurn:0, max_pixel_lurn:0, this field may have a true value. hdr_sdr_transition_flag may be a flag indicating whether this video data transitions from HDR to SDR. sdr_hdr_transition_flag may be a flag indicating whether this video data transitions from SDR to HDR. sdr_compatibility_flag may be a flag indicating whether this video data is compatible with an SDR decoder or an SDR display.

In some embodiments, the HDR information may be defined in the form of an HDR element having the parameters of the above-described @value as sub fields.

In the illustrated embodiment (t32020), the HDR information may be defined in the form of a descriptor. This descriptor may be delivered in MMT signaling information as described above. This descriptor may be delivered in the above-described MPT message or the other MMTP message. This descriptor may be a type of asset descriptor. In addition, this descriptor may be delivered in or along with DVB SI service signaling such as SDT or EIT.

OETF_type, max_mastering_display_luminance, min_mastering_display_average_frame_luminance_level, max frame_pixel luminance, hdr_type_transition flag, hdr_sdr_transition_flag, sdr_hdr_transition flag and/or sdr_compatibility_flag may be included in this descriptor and the meanings thereof were as described above.

In some embodiments, HDRTypeTransitionFlag, HDRSDRTransitionFlag, and SDRHDRTransitionFlag may not be simultaneously true. For example, if the HDRSDRTransitionFlag value is true, the HDRTypeTransitionFlag, SDRHDRTransitionFlag value may be false.

FIG. 47 is a diagram showing HDR information according to another embodiment of the present invention.

If a corresponding service component is a video component, the HDR information may include HDR parameter information related thereto or information on an HDR parameter set. The HDR information may have one of the forms of the descriptors according to the aforementioned embodiments or may take the form of an element. This may be represented by the above-described componentProperty element or ComponentDescription element.

In the illustrated embodiment, the HDR information may be defined in the form of the descriptor. The @schemeIdUri may be a URI for identifying that a corresponding descriptor has an HDR scheme related to HDR information. In this case, the @schemeIdUri may have a value of urn:atsc3.0:hdr:201x. The @value may have values, the meanings of which are defined according to an HDR scheme. The values will be described below. The @id may indicate the identifier of the corresponding descriptor. If the same identifier is included, the same scheme ID, value and parameter may be included.

The illustrated embodiment (d47010) may indicate the parameters of the above-described @value. The HDR_Param_Set may indicate the identifier indicating a set of HDR related parameters. The embodiment may have the following values. For example, if the HDR_Param_Set field is 0, this may indicate that the HDR related parameter is not defined by a set. In this case, the HDR related parameter may be defined by the following other field. If the HDR_Param_Set field is set to 1, EOTF of the HDR related parameters is SMPTE ST2084, bit depth is 12 bits/pixel, peak luminance is 10,000 nit, codec is HEVC dual codec (HEVC+HEVC), and metadata is SMPTE ST 2086, or SMPTE ST 2094. If the HDR_Param_Set field is 2, EOTF is SMPTE ST 2084, bit depth is 10 bits/pixel, peak luminance is 4000 nit, codec is HEVC single codec, and metadata is SMPTE ST 2086, or SMPTE ST 2094. In addition, if the HDR_Param_ Set field is set to 3, EOTF is BBC EOTF, bit depth is 10 bits/pixel, peak luminance is 1,000 nit, and codec is HEVC single codec. The above-described set corresponds to the embodiment and the 8-bit HDR_Param_Set field may identify a set of 256 HDR related parameters. Through such an HDR_Param_Set field, a corresponding descriptor may indicate with which HDR parameters content supporting HDR is associated, and the receiver may receive information regarding which HDR parameters are used to decode or image-process the received content. If the HDR_Param_Set field value is 0, the values of the following OETF_type, max_mastering_display_luminance, min_mastering_display_luminance, average_frame_luminance_level, max_frame_pixel_luminance are mandatorily included, and if the HDR_Param_Set field values has the other values. OETF_type, max_mastering_display_luminance, min_mastering_display_luminance, average_frame_luminance_level, and max_frame_pixel_luminance may be included, selectively included or repeatedly included.

The OETF_type may indicate the type of the source OETF (opto-electronic transfer function) of the corresponding data. If the value of this field is 1, 2 and 3, these may correspond to ITU-R BT.1886, ITU-R BT.709 and ITU-R BT.2020, respectively. The other values may be reserved for future use.

The max_mastering_display_luminance may indicate the peak luminance value of the mastering display of the corresponding data. This value may be an integer value in a range of 100 to 1000. The min_mastering_display_luminance may indicate the minimum luminance value of the mastering display of the corresponding data. This value may be a fractional number in a range of 0 to 0.1.

The average_frame_luminance_level may indicate the average of the luminance level with respect to one video sample. In addition, this field may indicate the maximum value of the averages of the luminance levels of the samples belonging to a sample group or a video track (stream). The max_frame_pixel_luminance may indicate the maximum value of the pixel luminance values with respect to one video sample. In addition, this field may indicate the largest value of the pixel luminance maximum values belonging to a sample group or a video track (stream).

The hdr_type_transition_flag may be a flag indicating whether HDR information of the corresponding data is changed and another type of HDR information is applied. For example, HDR parameters transition from oeft:3, max_lurn:100, min_lurn:0.5, max_frame_lurn:0, and max_pixel lurn:0 to oeft:1, max_lurn:1000, max_frame_lurn:0, and max_pixel_lurn:0, this field may have a true value. The hdr_sdr_transition_flag may be a flag indicating whether the corresponding data transitions from HDR to SDR. The sdr_hdr_transition_flag may be a flag indicating whether the corresponding data transitions from SDR to HDR. sdr_compatibility_flag may be a flag indicating whether the corresponding data is compatible with an SDR decoder or an SDR display.

In some embodiments, the HDR information may be defined in the form of an HDR element having the parameters of the above-described @value as sub fields.

In the illustrated embodiment (d47020), the HDR information may be defined in the form of a descriptor. This descriptor may be delivered in MMT signaling information as described above. This descriptor may be delivered in the above-described MPT message or another MMTP message. This descriptor may be delivered in the above-described MP table and/or DCI Table. This descriptor may be a type of asset descriptor. In addition, these descriptors may be delivered in or along with DVB SI service signaling such as SDT or EIT.

A descriptor_tag, a descriptor_length, an hdr_type_transition_flag, an hdr_sdr_transition_flag, an sdr_hdr_transition_flag, an sdr_compatibility_flag, an OETF_type, a max_mastering_display_luminance, a min_mastering_display_luminance, an average_frame_luminance_level and/or a max_frame_pixel_luminance may be included in an HDR_descriptor descriptor, the meanings of which have been described above.

The descriptor tag field may be the identifier of the HDR descriptor.

The descriptor_length field may indicate the length of the corresponding HDR_descriptor.

The hdr_param_set field may indicate an identifier indicating a set of specific HDR related parameters of a video component to be signaled. For example, if the hdr_param_set field is set to 1, EOTF of the HDR related parameters is SMPTE ST2084, bit depth is 12 bits/pixel, peak luminance is 10,000 nit, codec is HEVC dual codec (HEVC+HEVC), and metadata is SMPTE ST 2086 or SMPTE ST 2094. If the hdr_param_set field is set to 2, EOTF is SMPTE ST2084, bit depth is 10 bits/pixel, peak luminance is 4000 nit, codec is HEVC single codec, and metadata is SMPTE ST 2086 or SMPTE ST 2094. In addition, if the hdr_param_ set field is set to 3, EOTF is BBC EOTF, bit depth is 10 bits/pixel, peak luminance is 1,000 nit, and codec is HEVC single codec. The above-described set corresponds to the embodiment and an 8-bit hdr_param_set field may identify a set of 256 HDR related parameters. Through such an hdr_param_set field, the corresponding descriptor may indicate with which HDR parameters content supporting HDR is associated, and the receiver may receive information regarding which HDR parameters are used to decode or image-process the received content.

The hdr_type_transition_flag field may be a flag indicating whether an HDR parameter is changed within a video component. For example, if an HDR related parameter (HDR type #1 oeft:3, max_lurn:100, min_lurn:0.5, max_frame_lurn:0, max_pixel_lurn:0) is changed to another HDR related parameter (e.g. HDR type #2 oeft:1, max_lurn:1000, min_lurn:0.05, max_frame_lurn:0, max_pixel_lurn:0) within the video component, the hdr_type_transition flag value may be set to true.

The hdr_sdr_transition_flag field may be a flag indicating whether the video component transitions from HDR content to SDR content.

The sdr_hdr_transition_flag field may be a flag indicating whether the video component transitions from SDR content to HDR content.

The sdr_compatibility_flag field may be a flag indicating whether compatibility with a display/decoder supporting SDR is supported if the video component provides HDR content.

The hdr_config_flag field may be a flag indicating whether detailed information of the HDR parameter is included. If the value is '1', OETF_type, max_mastering_display_luminance, min mastering_display_luminance, average_frame_luminance_level, and max_frame_pixel_luminance field values may be present.

The OETF_type field may indicate the identifier of the opto-electronic transfer function applied to the source picture of the video component. The values thereof are as follows.

0: reserved, 1: ITU-R BT.1886, 2: ITU-R REC.709, 3:ITU-R BT.2020, 4-255: reserved for future use max_mastering_display_luminance: This may indicate the peak luminance value of the mastering display. This may have a value in a range of 100 to 10000.

The min_mastering_display_luminance field may indicate the minimum luminance value (fractional value) of the mastering display. This may have a value in a range of 0 to 1.0.

The average_frame_luminance_level field may indicate the maximum value of the averages of the luminance levels of the frame in the video component.

The max frame_pixel_luminance field may indicate the largest value of the maximum values of the pixel luminance of the frame in the video component.

FIG. 48 is a diagram showing WCG information according to an embodiment of the present invention.

If the service component is a video component, the WCG information may include WCG information related thereto. The WCG information may be in the form of one of the descriptors according to the above-described embodiments or in the form of an element. This may be indicated by the above-described componentProperty element or ComponentDescription element.

The WCG information may be referred to as color gamut information. The color gamut information may include two types: container color gamut and content color gamut. The container color gamut may include color gamut related information used in an encoding or decoding step and/or a process of mapping a decoded pixel value. The content color gamut may include information on the color gamut of an original source. That is, the content color gamut may indicate a valid color space volume applied to actual content.

In the illustrated embodiment (t33010), the content WCG information may be defined in the form of a descriptor. @schemeIdUri may be a URI for identifying that the descriptor has a content WCG scheme related to the content WCG information. In this case, @schemeIdUri may have a value of urn:atsc3.0:wcg:content:201x. @value may have values according to the meaning of the content WCG scheme. These values will be described below. @id may indicate the identifier of the descriptor. If the same identifier is used, the same scheme ID, value and parameter may be included.

The illustrated embodiment (t33010) may indicate the parameters of the above-described @value.

contentColorGamutType may indicate the type of the color gamut of this video data. That is, this field may indicate chromaticity coordinates of source primaries. This value may be equal to color primaries of VUI (video usability information). If the value of the VUI parameter is not present, the color primary values of the VUI may be unspecified and the below-described parameters may have values.

contentColorPrimaryRx and contentColorPrimaryRy may indicate x and y coordinate values of the R-color of this video source, respectively. This may be a fractional number from 0 to 1. contentColorPrimaryGx and contentColorPrimaryGy may indicate the x and y coordinate values of the B-color of this video source, respectively. This may be a fractional number from 0 to 1. contentWhitePx and contentWhitePy may indicate the x and y coordinate values of the white point of this video source, respectively. This may be a fractional number from 0 to 1.

contentWCGTransition may be a flag whether the content color gamut of this video data transitions from WCG (Wide Color Gamut) to SCG (Standard Color Gamut). In some embodiments, this may indicate the end of the video data supporting WCG may be included in this video component. contentSCGCompatibility may be a flag indicating whether the content color gamut of this WCG video is compatible with the SCG based decoder and display.

In the illustrated embodiment (t33020), the container WCG information may be defined in the form of a descriptor. @schemeIdUri may be a URI for identifying that the descriptor has a container WCG scheme related to the container WCG information. In this case, @schemeIdUri may have a value of urn:atsc3.0:wcg:container:201*x*. @value may have values according to the meaning of the containerWCG scheme. These values will be described below. @id may indicate the identifier of the descriptor. If the same identifier is used, the same scheme ID, value and parameter may be included.

The illustrated embodiment (t33020) may indicate the parameters of the above-described @value. These parameters may be equal to the parameters of the content color gamut. However, these parameters may describe the container color gamut. For example, containerColorGamutType may indicate the color gamut type of this video. That is, this may indicate chromaticity coordinates of color primaries which are used upon encoding or will be used upon decoding.

containerColorPrimaryRx, containerColorPrimaryRy, containerColorPrimaryGx, containerColorPrimaryGy, containerColorPrimaryBx, containerColorPrimaryBy, containerWhitePx and containerWhitePy may indicate the x and y coordinates of the RGB colors of the color primaries and white point which is used or will be used upon encoding or decoding. That is, the coordinates of the color gamut of the container may be indicated.

containerWCGTransition may be a flag indicating whether the container color gamut of this video data transitions from WCG to SCG. In some embodiments, this may indicate that the end of the video data supporting WCG of the container is included in this video component. containerSCGCompatibility may be a flag indicating whether the container color gamut of this WCG video is compatible with the SCG based decoder and display.

In some embodiments, the content/container WCG information may be defined in the form of a content/container WCG element having the parameters of the above-described @value as sub fields.

In the illustrated embodiment (t33030), the content/container WCG information may be defined in the form of a descriptor. This descriptor may be delivered in MMT signaling information as described above. This descriptor may be included in the MP table and the DCI table of the above-described MMT. If the MMT asset is a video stream component including content supporting WCG, a descriptor illustrated as an asset descriptor may be included. In addition, this descriptor may be delivered in or along with DVB SI service signaling such as SDT or EIT.

This descriptor (t33030) may include the content WCG information and the container WCG information.

color_gamut_type may be equal to the above-described containerColorGamutType. color_space_transition_flag may be a flag indicating whether chromaticity coordinates of color primaries which are used upon encoding or will be used upon decoding transition to other chromaticity coordinates, with respect to the video samples of this video component. wcg_scg_transition_flag may be a flag indicating whether the container color gamut of the video samples of this video component transitions from WCG to SCG. For example, this may indicate whether the container color gamut transitions from BT.2020 to BT.709. scg_wcg_transition_flag may be a flag indicating whether the container color gamut of the video samples of this video component transitions from SCG to WCG. scg_compatibility_flag may be a flag indicating whether the container color gamut of the video samples of this video data is compatible with an SDR based decoder or an SDR display. That is, when an existing SCG decoder or display is used, whether the WCG video can be output without separate mapping information or upgrade while causing quality problems may be determined using this field. Since this is container color gamut information, this field may indicate whether this video data may be decoded even when the SCG based decoder/display does not know a color gamut such as BT.2020. color_primary_flag may be a flag indicating whether detailed information of chromaticity coordinates of color primaries which may be used upon encoding/decoding the video samples of this video content is present. According to the value of the color_primary_flag, a color_primaryRx field, a color_primaryRy field, a color_primaryGx field, a color_primaryGy field, a color_primaryBx field, a color_primaryBy field, a color_whitePx field and/or a color_whitePy field may be included. These fields may indicate the x and y coordinates of the RGB colors of the color primaries and white color which are used or will be used upon encoding or decoding.

content_wcg_flag may indicate whether detailed information of the content color gamut is included in this descriptor with respect to this video component. content_color_gamut_type may indicate the content color gamut type of this video stream. That is, this field may indicate the chromaticity coordinates of the original source primaries of this video data. content_color_space_transition_flag may be a flag indicating whether the chromaticity coordinates transition to other chromaticity coordinates with respect to the original source primaries of the video data of this video component. content_wcg_scg_transition_flag may be a flag indicating whether the content color gamut of the video data of this video component transitions from WCG to SCG. A content_scg_wcg_transition_flag field may be a flag indicating whether the content color gamut of the video data of this video component transitions from SCG to WCG. A content_scg compatibility_flag field may be a flag indicating whether the content color gamut of the video data of this video component is compatible with an SCG based decoder or display. That is, if the value of this field is 1, this may indicate that the valid color gamut of this video data is compatible with SCG and mapping does not need to be performed. A content_color_primary_flag field may be a flag indicating whether detailed information of chromaticity coordinates of the original source primaries of the video data of this component is present. According to the value of the content_color_primary_flag field, a content_color_primaryRx field, a content_color_primaryRy field, a content_color_primaryGx field, a content_color_primaryGy field, a content_color_primaryBx field, a content_color_primaryBy field, a content_color_whitePx field and/or a content_color_whitePy field may be included. These fields may indicate the x and y coordinates of the RGB colors of the original source primaries and white point, respectively.

In some embodiments, the above-described color gamut_type and/or content_color_gamut_type may have the following meanings.

0: reserved/1: Rec. ITU-R BT.709-5, Rec. ITU-R BT.1361 conventional colourgamut system and extended colour gamut system, IEC 61966-2-1 (sRGB or sYCC),IEC 61966-2-4, Society of Motion Picture and Television Engineers RP 177 (1993)/2: unspecified/3: Reserved for future use/4: Rec. ITU-R BT.470-6 System M(historical), United States National Television System Committee 1953Recommendation for transmission standards for colour television, United StatesFederal Communications Commission Title 47 Code of Federal Regulations (2003)73.682 (a)/5: Rec. ITU-R BT.470-6 System B, G (historical), Rec. ITU-R BT.601-6625, Rec. ITU-R BT.1358 625, Rec. ITU-R BT.1700 625 PAL and 625 SECAM/6:Rec. ITU-R BT.601-6 525, Rec. ITU-R BT.1358 525, Rec. ITU-R BT.1700 NTSC, Society of Motion Picture and Television Engineers 170M (2004)/7: Society of Motion Picture and Television Engineers 240M (1999)/8: Generic film (colour filters using Illuminant C)/9: Rec. ITU-R BT.2020/10-255: Reserved for future use FIG. 49 is a diagram showing HFR information/pull down information according to an embodiment of the present invention.

If this video service component supports HFR, the HFR information may include HFR information related thereto. The HFT information may be in the form of one of the descriptors according to the above-described embodiments or in the form of an element. This may be indicated by the above-described componentProperty element or ComponentDescription element. As described above, the HFR information may be included in an MPD.

In the illustrated embodiment (t34010), the HFR information may be defined in the form of a descriptor. @schemeIdUri may be a URI for identifying that the descriptor has an HFR scheme related to the HFR information. In this case, @schemeIdUri may have a value of urn:atsc3.0:hfr:201x. @value may have values according to the meaning of the HFR scheme. These values will be described below. @id may indicate the identifier of the descriptor. If the same identifier is used, the same scheme ID, value and parameter may be included.

The illustrated embodiment (t34010) may indicate the parameters of the above-described @value. SFRCompatibility may indicate whether this video component is compatible with a standard frame rate (SFR) or a legacy frame rate. SFR HFR Transition may indicate whether this video component includes transition from a normal frame rate (SFR or legacy frame rate) to HFR. HFR_SFR_Transition may indicate whether this video component includes transition from HFR to a normal frame rate (SFR or legacy frame rate).

The pull down information may include pull down recovery configuration information of this service component. The pull down information may be in the form of one of the descriptors according to the above-described embodiments or in the form of an element. This may be indicated by the above-described componentProperty element or ComponentDescription element.

The pull down recovery configuration will now be described. For example, if an original source is a film mode (e.g. 24p), this may be changed to another frame rate for encoding (e.g. 60i). In this case, dirty frames may be generated. The dirty frames may be generated by the following method.

All original film frames may be regarded as including two fields: one frame is for odd-numbered lines of an image and the other frame is for even-numbered lines of the image. Accordingly, there are eight fields every four film frames. Here, the four film frames may be referred to as A, B, C and D, respectively. The eight fields may be stretched to 10 fields. This may be performed by repeating the two fields (top and bottom).

The A frame may be across three fields (At, Ab, Ab), the B frame may be across two fields (Bt, Bb), the C frame may be across three fields (Ct, Ct, Cb), and the B frame may be across two fields (Dt, Db). These may be denoted by At-Ab-Ab-Bt-Bb-Ct-Ct-Cb-Dt-Db, 3-2-3-2 pull down or 3-2 pull down. Here, At may mean the top field of the A frame and Bb may mean the bottom field of the B frame.

In the "At-Ab-Ab-Bt-Bb-Ct-Ct-Cb-Dt-Db" case, the Ab-Bt frame and the Bb-Ct frame may be referred to as dirty frames. However, the receiver can confirm the original frame rate through the pull down recovery configuration. The receiver may restore the original frame rate stream from the encoded/transmitted frame rate stream. Here, restoration may be a process of eliminating the dirty frames.

The term "pull down" may be used in association with a post production process of delivering a film or video in film making/TV production. The film frame rate may be transformed into a broadcast frame rate by a broadcaster. However, the frame rate related information of the system level may include only broadcast frame rate information. Accordingly, in order to restore the original frame rate, system level signaling may signal information related to the original frame rate. For example, the original frame rate (e.g., 24p) information and/or the pull down type information (e.g., 3:2 pull down) may be included in signaling information. In addition, the video level information of the pulled-down video may request restoration to the original video.

In the illustrated embodiment (t34020), the pull down information may be defined in the form of a descriptor. @schemeIdUri may be a URI for identifying that the descriptor has a pull down scheme related to the pull down information. In this case, @schemeIdUri may have a value of urn:atsc3.0:pulldown:201x. @value may have values according to the meaning of the pull down scheme. These values will be described below. @id may indicate the identifier of the descriptor. If the same identifier is used, the same scheme ID, value and parameter may be included.

The illustrated embodiment (t34020) may indicate the parameters of the above-described @value. PullDownType may indicate the type of pull-down applied to the encoded video stream. This may be expressed by a decimal integer which is not a negative number. This field may indicate 0—reserved, 1—2:2 pull-down, 2—2:3 pull down, 3—3:2 pull-down, 4—4:4 pull-down, 5—5:5 pull-down, 6—6:4 pull-down, according to the value thereof.

PullDownTransition may indicate whether transition from the pulled-down data to the original frame rate is included in this video component. In some embodiments, this field may indicate whether the end of the pulled-down data is included in this video component.

OriginalFrameRate may indicate the original frame rate (captured frame rate) of this video data. This field may be expressed by a decimal integer which is not a negative number. This information may be provided to restore the encoding frame rate to the original frame rate. This field may indicate the original frame rate such as 0—reserved, 1-120, 2-120/1.001, 3-100, 4-60, 5-60/1.001, 6-50, 7-30, 8-30/1.001, 9-25, 10-24, 11-24/1.001, 12~14—reserved, according to the value thereof.

OriginalScanType may indicate the scanning type of the original video corresponding to this video. This field may be expressed by a decimal integer which is not a negative number. This field may indicate types such as 0—reserved, 1—interlaced, 2—progressive, and 3—unspecified according to the value thereof.

In some embodiments, the pull down information may be defined in the form of a pull down element having the parameters of the above-described @value as sub fields.

In the illustrated embodiment (t34030), the HFR information & pull down information may be defined in the form of a descriptor. This descriptor may be delivered in MMT signaling information as described above. This descriptor may be included in the MP table and the DCI table of the above-described MMT. If the MMT asset is a video stream component including content supporting HFR, a descriptor illustrated as an asset descriptor may be included. In addition, this descriptor may be delivered in or along with DVB SI service signaling such as SDT or EIT.

This descriptor (t34030) may include HFR information&pull down information. sfr_compatibility_flag, sfr_hfr_transition_flag, hfr_sfr_transition_flag, pull_down_type, pull_down_transition_flag, original_framerate and/or original_scan_type may be equal to the above-described SFRCompatibility, SFR_HFR_Transition, HFR_SFR_Transition, PullDownType, PullDownTransition, OriginalFrameRate and OriginalScanType. The original_framerate_flag may indicate whether the original_framerate field is present in this descriptor. The original_scane type_flag field may indicate whether the original_scane_type field is present in this descriptor.

FIG. 50 is a diagram showing 3D audio information according to an embodiment of the present invention.

If the audio service component is a 3D audio component, the 3D audio information may include 3D audio information related thereto. The 3D audio information may be defined in the form of one of the descriptors according to the above-described embodiments or may be defined in the form of an element. This may be indicated by the above-described componentProperty element or ComponentDescription element.

As described above, if a DASH representation includes 3D audio data (AC-4, MPEG-H, etc.), this information may be included as the essential property descriptor and/or supplementary property descriptor of the DASH MPD.

In the illustrated embodiment, the 3D audio information may be defined in the form of a descriptor. @schemeIdUri may be a URI for identifying that the descriptor has a 3D audio scheme related to the 3D audio information. In this case, @schemeIdUri may have a value of urn:atsc3.0:3d-audio:201x. @value may have values according to the meaning of the 3D audio scheme. These values will be described below. @id may indicate the identifier of the descriptor. If the same identifier is used, the same scheme ID, value and parameter may be included.

The illustrated embodiment (t39010) may indicate the parameters of the above-described @value. codec may indicate the encoding format, that is, codec information of this audio component. In some embodiments, the values 1 and 2 of this field may indicate AC-4 and MPEG-H Audio, respectively. The values 3 to 255 of this field may be reserved for future use. profile may indicate information on the profile and level of the encoding format of the audio component. dialog_enhancement_enabled may indicate whether dialog enhancement information is included in this audio component. channel_mode may indicate the channel mode of this audio component. The values 0, 1 and 2 of this field may indicate mono content, stereo content and multi-channel content, respectively.

object_enabled may indicate whether an object signal is included in this audio component. HOA_enabled may indicate that a higher order ambisonics (HOA) signal is included in this audio component. SAOC_enabled may indicate whether a spatial audio object coding (SAOC) signal is included in this audio component.

referenceLayout may describe a loudspeaker layout intended upon manufacturing or the original design of the audio stream of this audio component. targetLayout may describe a target loudspeaker layout which is an actual loudspeaker constellation for rendering this audio content. If the target layout cannot be confirmed, it is assumed that the target layout is equal to a reference layout. Decoder_configuration may include audio decoder related information according to the encoding format of this audio component. In some embodiments, in the case of an AC-4 audio stream, ac4_dsi_byte included in AC-4 TOC may be included in this field. In some embodiments, in the case of an MPEG-H audio stream, mpegh3daConfig( ) in this bitstream may be included in this field.

In some embodiments, the 3D audio information may be defined in the form of a 3D audio element having the parameters of the above-described @value as sub fields.

In the illustrated embodiment (t39020), the 3D audio information may be defined in the form of a descriptor. This descriptor may be delivered in MMT signaling information as described above. This descriptor may be included in the MP table and the DCI table of the above-described MMT. This descriptor may be a type of asset descriptor. In this case, the asset type may indicate a value corresponding to an MPEG-H audio component or an AC-4 audio component. In addition, this descriptor may be delivered in or along with DVB SI service signaling such as SDT or EIT.

codec, ProfileLevelIndication, dialog enhancement_enabled, channel_mode, object_enabled, HOA_enabled, SAOC_enabled, referenceLayout and targetLayout may be included in this descriptor and the meanings thereof were as described above. ProfileLevelIndication may be equal to the above-described profile.

config_flag may indicate whether channel_mode, dialog_enhancement_enabled, object_enabled, HOA_enabled, and/or SAOC_enabled are included in this descriptor. If these fields are included, config_flag may be set to 1. referenceLayout_flag may indicate whether referenceLayout is included in this descriptor. If the value of this field is 1, referenceLayout may be present. targetLayout_flag may indicate whether targetLayout is included in this descriptor. If the value of this field is 1, targetLayout may be present.

ConfigLength may indicate the length of the following ac4_dsi_byte or mpegh3daConfig_bytes( ). ac4_dsi_byte may include ac4_dsi including information on AC-4 TOC. mpegh3daConfig_bytes may include mpegh3daConfig( ) information in the MPEG-H bitstream. additional_info_byte may be reserved for future use.

FIG. 51 is a diagram showing AC-4 audio information according to an embodiment of the present invention.

If the audio service component is an AC-4 audio component, the AC-4 audio information may include AC-4 audio information related thereto. The AC-4 audio information may be defined in the form of one of the descriptors according to the above-described embodiments or may be defined in the form of an element. This may be indicated by the above-described componentProperty element or ComponentDescription element.

As described above, if a DASH representation includes AC-4 audio data, this information may be included as the essential property descriptor and/or supplementary property descriptor of the DASH MPD.

In the illustrated embodiment, the AC-4 audio information may be defined in the form of a descriptor. @schemeIdUri may be a URI for identifying that the descriptor has an AC-4 audio scheme related to the AC-4 audio information. In this case, @schemeIdUri may have a value of urn:atsc3.0:ac-4:201x. @value may have values according to the meaning of the AC-4 audio scheme. These values will be described below. @id may indicate the identifier of the descriptor. If the same identifier is used, the same scheme ID, value and parameter may be included.

The illustrated embodiment (t40010) may indicate the parameters of the above-described @value. ac4_dialog_enhancement enabled, ac4_channel_mode, ac4_object_enabled, ac4_HOA_enabled, referenceLayout, targetLayout and ac4_dsi_byte may be included as parameters. The respective fields have the definitions as dialog_enhancement_enabled, channel mode, object_enabled, HOA_enabled, referenceLayout and/or targetLayout described above, for the AC-4 audio stream, and may describe the information according to the definitions. ac4_dsi_byte was as described above.

In some embodiments, the AC-4 audio information may be defined in the form of an AC-4 audio element having the parameters of the above-described @value as sub fields.

In the illustrated embodiment (t40020), the AC-4 audio information may be defined in the form of a descriptor. This descriptor may be delivered in MMT signaling information as described above. This descriptor may be included in the MP table and the DCI table of the above-described MMT. This descriptor may be a type of asset descriptor. In this case, the asset type may indicate a value corresponding to an AC-4 audio component. In addition, this descriptor may be delivered in or along with DVB SI service signaling such as SDT or EIT.

ac4_config_flag, referenceLayout_flag, targetLayout_flag, ac4_dialog_enhancement_enabled, ac4_channel mode, ac4_object_enabled, ac4HOA_enabled, referenceLayout, targetLayout and/or additional_info_byte may be included in this descriptor. The respective fields may have the same definitions as config_flag, referenceLayout_flag, targetLayout_flag, dialog_enhancement_enabled, channel_mode, object_enabled, HOA_enabled, referenceLayout, targetLayout and/or additional_info_byte described above, for the AC-4 audio stream, and may describe the information according to the definitions.

ac4_toc_flag may indicate whether AC-4 TOC information is present in this descriptor. ac4_toc_len may indicate the length of the AC-4 TOC information. If the value of ac4_toc_flag is 1, this field may be present. ac4_dsi_byte is an eight-bit field and the sequence of the ac4_dsi_byte fields may specify the ac4_dsi field. The ac4_dsi field may include AC-4 TOC information. This field may be present if ac4_toc_len is present and may have a value greater than 0.

FIG. 52 is a diagram showing MPEG-H audio information according to an embodiment of the present invention.

If the audio service component is an MPEG-H audio component, the MPEG-H audio information may include MPEG-H audio information related thereto. The MPEG-H audio information may be defined in the form of one of the descriptors according to the above-described embodiments or may be defined in the form of an element. This may be indicated by the above-described corn ponentProperty element or ComponentDescription element.

As described above, if a DASH representation includes MPEG-H audio data, this information may be included as the essential property descriptor and/or supplementary property descriptor of the DASH MPD.

In the illustrated embodiment, the MPEG-H audio information may be defined in the form of a descriptor. @schemeIdUri may be a URI for identifying that the descriptor has an MPEG-H audio scheme related to the MPEG-H audio information. In this case, @schemeIdUri may have a value of urn:atsc3.0:mpeg-h:201x. @value may have values according to the meaning of the MPEG-H audio scheme. These values will be described below. @id may indicate the identifier of the descriptor. If the same identifier is used, the same scheme ID, value and parameter may be included.

The illustrated embodiment (t41010) may indicate the parameters of the above-described @value. profile, dialog_enhancement enabled, channel_mode, object_enabled, HOA_enabled, SAOC_enabled, referenceLayout, targetLayout and/or Decoder_configuration may be included as parameters. The respective fields have the definitions as profile, dialog_enhancement_enabled, channel_mode, object_enabled, HOA_enabled, SAOC_enabled, referenceLayout, targetLayout and/or Decoder_configuration described above, for the MPEG-H audio stream, and may describe the information according to the definitions. Decoder_configuration may include the above-described mpegh3daConfig( ).

In some embodiments, the MPEG-H audio information may be defined in the form of an MPEG-H audio element having the parameters of the above-described @value as sub fields.

In the illustrated embodiment (t41020), the MPEG-H audio information may be defined in the form of a descriptor. This descriptor may be delivered in MMT signaling information as described above. This descriptor may be included in the MP table and the DCI table of the above-described MMT. This descriptor may be a type of asset descriptor. In this case, the asset type may indicate a value corresponding to an MPEG-H audio component. In addition, this descriptor may be delivered in or along with DVB SI service signaling such as SDT or EIT.

mpegh3daProfileLevelIndcation, mpegh_config_flag, referenceLayout_flag, targetLayout_flag, dialog_enhancement_enabled, channel_mode, object_enabled, HOA_enabled, SAOC_enabled, referenceLayout, additional info_byte and/or targetLayout may be included in this descriptor. The respective fields may have the same definitions as ProfileLevelIndication, config_flag, referenceLayout flag, targetLayout flag, dialog_enhancement_enabled, channel_mode, object_enabled, HOA_enabled, SAOC_enabled, referenceLayout, additional_info_byte and/or targetLayout described above, for the MPEG-H audio stream, and may describe the information according to the definitions.

mpegh3daConfigLength may indicate the length of mpegh3daConfig_bytes( ) information. mpegh3daConfig_bytes may include mpegh3daConfig( ) in the MPEG-H bitstream.

FIG. 53 illustrates a 3D service and multiview service related signaling information according to an embodiment of the present invention. When a MMT asset is a video stream component for a stereoscopic 3D service, the MMT asset may include a view_position_descriptor d33010 as asset_descriptor in MP table. The view_position_descriptor may include stereoscopic 3D parameter information, etc. This may be included in another signaling table of MMT, SI (SDT or EIT) of DVB, or the like. The view_position_descriptor may include at least one of the following fields. A descriptor_tag field may be an identifier of view_position_descriptor. A descriptor_length field may indicate a length of view_position_descriptor. A right_view_flag field may indicate whether a component of a corresponding vide stream is a right view component. When a field value is 0, this may indicate that a component of a corresponding video stream indicates a left view component and, when a field value is 1, this may indicate that the component is a right view component.

When an MMT asset is a video stream component for a Multiview service, the MMT asset may include view_position2_descriptor d33020 as asset_descriptor in MP_table. The view_position2_descriptor may include Multiview parameter information and so on. The view_position2_descriptor may include dependency information between components. This may be included in another signaling table of the MMT or SI (SDT or EIT), etc. of DVB. The view_position2_descriptor may include at least one of the following fields. A descriptor_tag field may be an identifier of the view_position2_descriptor. A descriptor_length field may indicate a length of the view_position2_descriptor. A num_of_views field may indicate the number of total views included in the view_position2_descriptor. That is, this may indicate a total number of views provided by a multivew service. In the case of multiview, a view position field may refer to view position information of a corresponding video component. Here, the view position information may be set to 0 with respect to a first view positioned in a leftmost portion among multiviews. In addition, the view position information may be set to a value that is increased by 1 whenever being moved to a next view from a first view in a direction toward a right side from a left side. (The view position means the order for the left-most view being equal to 0 and the value of the order increasing by 1 for next view from left to right.) Here, the multiview may be a 3D multiview or a multiview for a panorama. Here, in the case of the 3D multiview, the aforementioned view position information may include the meaning of a left view or a right view for each view. That is, based on view position information expressed in the number, whether a view included in the corresponding component is a left view or a right view for providing a 3D service may be verified.

FIG. 54 is a diagram showing a method of signaling caption related information according to another embodiment of the present invention. When an MMT asset is a closed caption stream component, the information may include a closed caption descriptor shown as an asset_descriptor of an MP table, a DCI Table, and the like of the aforementioned MMT. Alternatively, this may indicate that closed caption data is included in an HEVC video bitstream when the asset_type has the following closed caption descriptor as an asset descriptor while having a value corresponding to an HEVC video stream.

This may be included in another signaling table of MMT. As shown in the drawing, information items related to a caption of a broadcast service may be signaled through the aforementioned table. The closed caption descriptor may further include the following fields in the aforementioned fields included in FIG. 44. A repeated description will not be given here. The target accessibility field may indicate a target user or the like of a closed caption, etc. and information thereof is now described. The information may have the following value. 0: normal, 1: easy reader, 2: visually impaired, and 3: hearing impaired. The aspect_ratio field may indicate an intended aspect ratio intended by a closed caption author. The field may have the following values, in some embodiments. 0x01-4:3, 0x02-16:9, 0x03: 21:9, 0x04-: reserved for future use. The alternative_aspect_ratio_flag field may indicate whether compatible aspect ratio information of a closed caption is included. The scrolling_supported field may be a flag indicating whether a scroll function in a region of a closed caption is supportable. The scaling_supported field may be a flag indicating whether an original closed caption region of a closed caption is extensible on a receiver during presentation as necessary. The playout_speed_flag field may be a flag indicating whether playout speed information of a closed caption is included. The extended_color_use field may indicate whether a color value configured with 8 bits or more of a closed caption is used. The min_disparity field may indicate a 3D location of the front-most closed caption/subtitle of a caption based on a screen when a closed caption supports 3D. When the information has a negative value, the information may indicate a degree of a forward protrusion effect based on a screen and, when the information has a positive value, this may be used in an opposite way. The information may explicitly indicate a front-most value (minimum disparity) of disparity of a plurality of closed caption regions in video. The scroll direction field may indicate information of a direction in which a closed caption/subtitle region of the closed caption/subtitle is scrolled on a receiver. The field may indicate a value of "Top2Bottom", "Bottom2Top", "Left2Right", "Right2Left", and the like. The scroll_type field may indicate a proceeding type of scrolling, etc. when the closed caption/subtitle region of the closed caption/subtitle supports scrolling on a receiver. For example, this may indicate whether scrolling is performed in units of lines (or cells) or is performed in units of pixels. The scroll_amount field may indicate a scrolling degree, etc. when the closed caption/subtitle information of the closed caption/subtitle supports scrolling on a receiver. This may be represented by a cell number, a pixel number, or the like. The scroll_speed field may indicate scrolling speed, etc. when a closed caption/subtitle region of a closed caption/subtitle supports scrolling on a receiver. This may be represented in units of seconds (if necessary, this may be represented down to decimal places). The scale_direction field may indicate information on a direction in which a closed caption/subtitle region of a closed caption/subtitle is extensible. This may have a value of "Top", "Bottom", "TomNBottom", "Left", "Right", "LeftNRight", "All", and the like. The Scale_limit_format field may indicate an extension limit degree or the like when the closed caption/subtitle region of the closed caption/subtitle is extensible. This may be represented by a cell number, a pixel number, or the like or may be represented by a percentage degree or the like. The Scale_limit_value field may indicate an extension limit degree or the like when the closed caption/subtitle region of the closed caption/subtitle is extensible. The Playout_speed field may indicate play-out speed of an original closed caption/subtitle region of the closed caption/subtitle during presentation on a receiver. This may be represented in units of seconds (if necessary, this may be represented down to decimal places).

FIG. 55 is a diagram showing a presentation timing offset descriptor according to an embodiment of the present invention. The presentation timing offset descriptor includes information on start and end of presentation of closed captioning if a closed caption/subtitle is based on a timed text. The receiver may adjust presentation timing included in the closed caption/subtitle based on the signaling information included in a corresponding description. This is applicable to an audio/video component.

This may be included in another signaling table of an MMT. A descriptor_tag field may be an identifier indicating that the corresponding descriptor includes information on a presentation timing offset.

A descriptor_length field may indicate the length of the corresponding descriptor.

A timestamp_format field may indicate a format for representing the presentation timing offset. In some embodiments, the following values may be represented. For example, if the timestamp_format field is set to 0x00, a time stamp may be represented based on the number of ticks per second. In addition, if the timestamp_format field is set to 0x01, a clock time based media time composed of hour, minute, second (down to decimal places), frame, etc. may be represented. NTP (Network Time Protocol) may be indicated if the timestamp_format field is 0x02, PTP may be indicated if the timestamp_format field is 0x03, a timecode may be indicated if the timestamp format field is 0x04, 0x05 to 0x0F may be reserved for future use. A ticks_second field may indicate the number of ticks per second. A media_ticks field may indicate a presentation timing offset represented based on the number of ticks per second. A media_clock_time field may indicate a clock time based media time composed of hour, minute, second (down to decimal places), frame, etc. A timestamp field may indicate a presentation timing offset in a different format according to the value of the field of the timestamp_format. A data_bytes( ) field may indicate a presentation timing offset according to unspecified timestamp_format.

Figure 56:
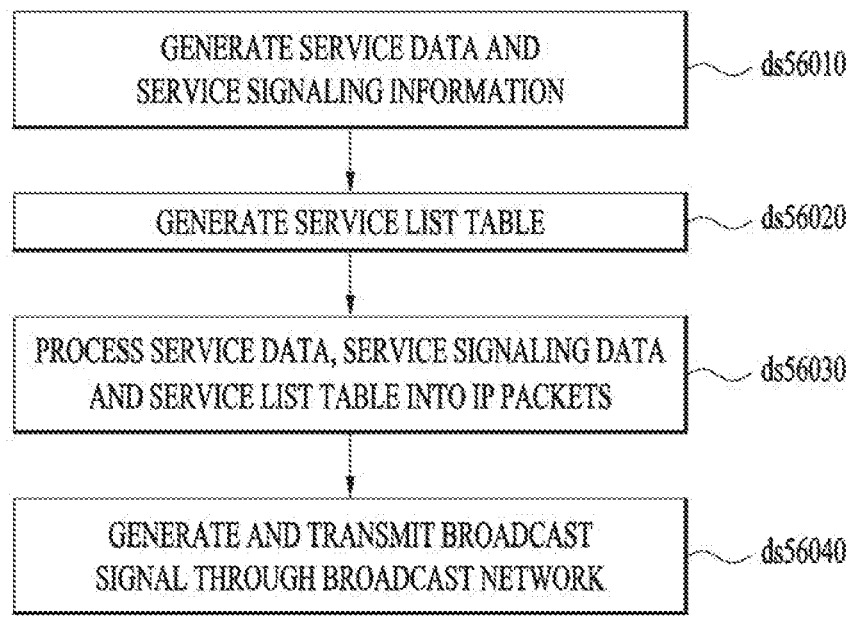
FIG. 56 is a diagram showing a method of transmitting a broadcast signal according to an embodiment of the present invention.

FIG. 56 is a diagram showing a method of transmitting a broadcast signal according to an embodiment of the present invention.

The method of transmitting the broadcast signal according to the embodiment of the present invention may include generating service data and service signaling information (ds56010), generating a service list table (ds56020), processing the service data, the service signaling information and the service list table into IP (Internet Protocol) packets (ds56030) and/or generating and transmitting a broadcast signal through a broadcast network (ds56040).

First, a service data generator d56010 of a transmission side may generate service data of a broadcast service and/or service signaling information for signaling the broadcast service. Here, the service data may include media data included in a corresponding broadcast service, NRT data, streaming data, etc. The service data may include the service components of a corresponding service. Here, the service signaling information may correspond to the above-described SLS. The service data generator is a block for generating data related to a real service in order for a service provider to provide a service and may be a hardware element.

A low-level signaling generator d56020 of the transmission side may generate a service list table. The service list table may correspond to the above-described SLT. The service list table may include bootstrap information for identifying a transport session in which service signaling information is transmitted, as described above. The bootstrap information was described above. The transport session may be an MMTP session and/or a ROUTE session, in some embodiments. The low-level signaling generator is a block for managing generation of low level signaling (LLS) such as SLT and may be a hardware element.

A transport layer processor d56030 of the transmission side may process the generated service components, the service signaling information and/or the service list table into IP packets. Prior to this, the data may be processed according to UDP. The transport layer processor is a block for processing the data of a higher layer for transmission and may be a hardware element.

A physical layer processor d56040 of the transmission side may process the generated IP packets, generate a broadcast signal and transmit the broadcast signal through the broadcast network. In this process, other operations are first performed at the above-described link layer and higher layer data (IP packets, etc.) may be encapsulated into link layer packets. Thereafter, the link layer packets may be processed into the broadcast signal through encoding/interleaving according to operations defined in the physical layer. The generated broadcast signal may be transmitted through the broadcast network. In some embodiments, the above-described data may be delivered through broadband. The physical layer processor is a block for processing the above-described link layer and/or the physical layer and may be a hardware element.

In a method of transmitting a broadcast signal according to another embodiment of the present invention, service signaling information may include a USBD. As described above, the USBD may operate as a signaling hub describing technological information related to the broadcast service. The USBD may further include service type information. Here, the service type information may mean the type of a final service provided by combining components described in the USBD. The service type information may include stereoscopic 3D, Multiview, etc.

In a method of transmitting a broadcast signal according to another embodiment of the present invention, the service list table or the USBD may further include capability information. This may mean a variety of capability information included in the above-described SLT or USBD. The capability information may describe at least one capability required to significantly present the broadcast service. Here, the capability information may be described using a predefined capability code. In some embodiments, the capability information may be described by a capability category code indicating the category of the capability. In some embodiments, the capability category code and a capability code indicating certain capability information in the corresponding category may be combined to describe the corresponding capability information. The capability information was described above.

In a method of transmitting a broadcast signal according to another embodiment of the present invention, if the service signaling information of the broadcast service is transmitted by an MMT protocol, the service signaling information may further include a signaling message including HDR information of the broadcast service. As described above, if the SLS is transmitted according to the MMTP, signaling information may be transmitted through an MMTP message. In some embodiments, a variety of information (multiview, caption, 3D, WCG, HDR, etc.) may be delivered in an MPT message or a newly defined MMTP message. In some embodiments, one MMTP message may simultaneously include a plurality of pieces of information. In addition, the MPT message or the newly defined MMTP message may further include service type information. Here, the service type information may mean the type of the final service provided by combining assets described in the MPT message or the newly defined MMTP message. The service type information may include stereoscopic 3D, Multiview, etc.

This HDR information may include information on a set of HDR parameters for a video stream component including content supporting HDR. This may correspond to the above-described hdr_param_set field. The information of the set of HDR parameters may indicate a combination of at least two of EOTF (Electro-Optical Transfer Function) information, bit depth information, peak luminance information, codec information and metadata information. The HDR information may further include information on detailed HDR parameters in addition to the information on the set of parameters. The HDR information may include an HDR descriptor as an asset_descriptor in a DCI Table or an MP table of an MMT. As described above, the HDR information may be included in the MPD.

In a method of transmitting a broadcast signal according to another embodiment of the present invention, the USBD may include component information of the service components of the broadcast service. The component information was described above. The component information may include component type information indicating the type of the corresponding service component and/or component role information indicating the role of the service component according to the type of the service component. The information may correspond to the above-described @componentType attribute and/or @componentRole attribute. The component role information may indicate whether the audio or video component of the broadcast service is a service component for a hearing-impaired person or a visually impaired person. That is, this information may indicate whether the component is a component for the hearing/visually impaired.

In a method of transmitting a broadcast signal according to another embodiment of the present invention, if the service signaling information of the broadcast service is transmitted by the ROUTE protocol, the USBD may further include information for referencing the MPD. The MPD may include resource identifiers of the service data of the broadcast service and/or context information of resources, as described above. As described above, this MPD may include the above-described information on the components. In some embodiments, the MPD may further include caption information and/or 3D related information of the broadcast service.

A method of receiving a broadcast signal according to an embodiment of the present invention will be described. This method is not shown in the figure.

A method of receiving a broadcast signal according to an embodiment of the present invention may include a physical layer processor of a reception side processing a broadcast signal, acquiring IP packets from the broadcast signal, a low-level signaling processor acquiring an SLT and acquiring bootstrap information from the SLT, identifying a transport session for transmitting an SLS using the bootstrap information and accessing the transport session to acquire the SLS, acquiring service components of a broadcast service using the SLS, and/or a display unit providing the broadcast service using the acquired service components. In some embodiments, information such as the above-described caption, 3D, HDR, WCG, multiview, etc. may be acquired from the information of the SLT and/or SLS. Depending on which of the MMTP or ROUTE protocol is used, the information may be acquired from the MMTP message of the SLS or the MPD of the SLS. The physical layer processor, the low-level signaling processor and/or the display unit of the reception side may be hardware elements.

The methods of receiving the broadcast signal according to the embodiments of the present invention may correspond to the methods of transmitting the broadcast signal according to the embodiments of the present invention. The methods of receiving the broadcast signal may be performed by the hardware modules corresponding to the modules (e.g., the service data generator, the transport layer processor, the low-level signaling generator, the physical layer processor, etc.) used in the method of transmitting the broadcast signal. The method of receiving the broadcast signal may have embodiments corresponding to the embodiments of the method of transmitting the broadcast signal.

The above-described steps may be omitted or replaced by the other steps of performing similar/equal operations in some embodiments.

Figure 57:
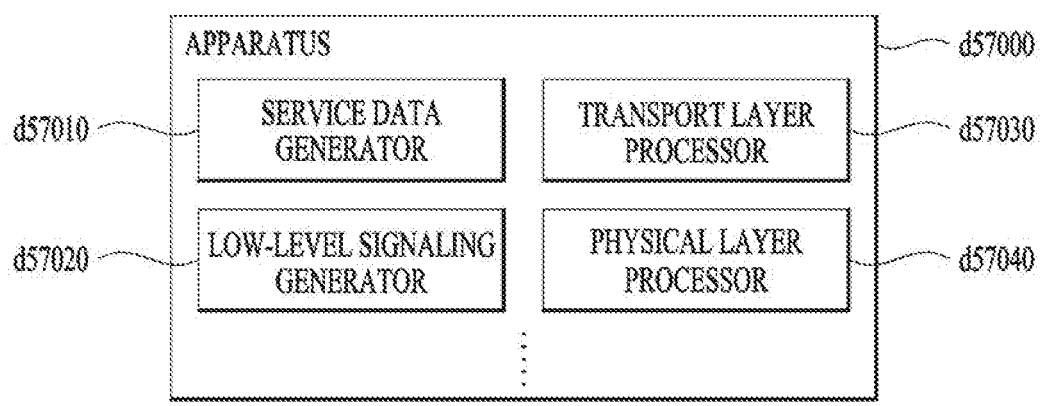
FIG. 57 is a diagram showing an apparatus for transmitting a broadcast signal according to an embodiment of the present invention.

FIG. 57 is a diagram showing an apparatus for transmitting a broadcast signal according to an embodiment of the present invention.

An apparatus for transmitting a broadcast signal according to an embodiment of the present invention may include the above-described service data generator, transport layer processor, low-level signaling generator and/or physical layer processor. The blocks and modules were described above.

The apparatus for transmitting the broadcast signal according to the embodiment of the present invention and the modules/blocks therein may perform the above-described embodiments of the method of transmitting the broadcast signal of the present invention.

An apparatus for receiving a broadcast signal according to an embodiment of the present invention will be described. This apparatus is not shown in the figure.

The apparatus for receiving the broadcast signal according to the embodiment of the present invention may include the above-described physical layer processor, low-level signaling processor and/or display unit. The blocks/modules were described above.

The apparatus for receiving the broadcast signal according to the embodiment of the present invention and the modules/blocks therein may perform the above-described embodiments of the method of receiving the broadcast signal of the present invention.

The blocks/modules of the apparatus may be processors for performing consecutive processes stored in a memory and may be hardware elements located inside/outside the apparatus, in some embodiments.

The above-described modules may be omitted or replaced by other modules for performing similar/equal operations in some embodiments.

Figure 58:
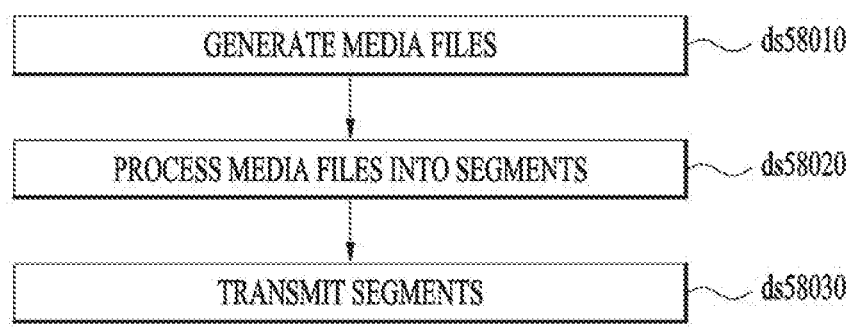
FIG. 58 is a diagram showing a method of transmitting media content according to an embodiment of the present invention.

FIG. 58 is a diagram showing a method of transmitting media content according to an embodiment of the present invention.

The method of transmitting media content according to the embodiment of the present invention may include generating media files, processing the media files into segments, and/or transmitting the segments.

First, a file generator of a transmission side may generate the media files including information on presentation of media content. These media files may be based on ISOBMFF. At least one media file may include a movie block and/or at least one fragment. Here, the movie block may correspond to the above-described moov box. The movie block may include metadata on presentation of the media file. In some embodiments, the movie block may include at least one track block. Here, the track block may correspond to the trak box. The track block may include metadata on the track for presentation.

The fragment may mean the fragment of the above-described media file. At least one fragment may include a movie fragment block and/or a media data block. Here, the movie fragment block may correspond to the above-described moof box. The movie fragment block may provide metadata on the presentation of the fragment. Here, the media data block may correspond to the above-described mdat box. The media data block may include video samples for presentation of the fragment. That is, the media data block may include real media data for media presentation.

A segment processor of the transmission side may process the generated media files into a plurality of segments. Here, the segments may be DASH segments. In some embodiments, the step of generating the media files and the step of processing the media files into the segments may be simultaneously performed and thus may be performed as one step. That is, the transmission side may immediately generate media segments. Here, the segments may include an initialization segment including an ftyp box and a moov box and a media segment including the above-described fragment.

A transmitter of the transmission side may transmit the generated plurality of segments. The segments may be transmitted to a receiver through a broadcast network or broadband according to an adaptive streaming method.

In some embodiments, the above-described track block may further include a track header block. The track header block may correspond to the above-described tkhd box. The track header block may describe the properties of the track. Here, the track may mean an audio track, a video track or a specific track included in corresponding media. The track header block may include first HDR information or first WCG information. These may provide the video samples of a corresponding track, that is, HDR and WCG information of the video data. These may be HDR information and WCG information in the above-described tkhd box. Here, the HDR information and WCG information may follow one of the formats described in the above-described embodiments.

In a method of transmitting media content according to another embodiment of the present invention, the first HDR information may include HDR parameter set information related to HDR video samples supporting HDR included in a corresponding track. The HDR parameter set information may correspond to the above-described hdr_param_set field. The HDR parameter set information may indicate a combination of two or more of EOTF (Electro-Optical Transfer Function) information, bit depth information, peak luminance information, codec information and metadata information. The first HDR information may include flag information indicating whether HDRConfiguration including detailed information on HDR related parameters. This may correspond to the above-described hdr_config_flag field. In addition, the first HDR information may include HDRConfiguration according to the value of the hdr_config_flag field. The first HDR information may further include an HDR type flag indicating whether an HDR related parameter for HDR video samples is changed in a corresponding track. The HDR type flag may correspond to the above-described hdr_type_transition_flag field. The first HDR information may further include an SDR-HDR transition flag indicating whether the video samples transition from SDR video samples supporting SDR to HDR video samples within the corresponding track. The SDR-HDR transition flag may correspond to the above-described hdr_sdr_transition_flag field. The first HDR information may further include an HDR-SDR transition flag indicating whether the video samples transition from HDR video samples to SDR video samples within the corresponding track. The HDR-SDR transition flag may be the above-described sdr_hdr_transition_flag field. The first HDR information may further include an SDR compatibility flag indicating whether the HDR video samples of the corresponding track are compatible with a decoder supporting SDR. The SDR compatibility flag may correspond to the above-described sdr_compatibility_flag field. The first HDR information may include the above-described information.

In a method of transmitting media content according to another embodiment of the present invention, first WCG information may include content color gamut information for providing color gamut information of media content and/or container color gamut information for providing color gamut information used in an encoding process of the media content. The container/content color gamut information was described above. In some embodiments, only any one of the two pieces of information is not transmitted, but the two pieces of information are transmitted, such that the receiver performs efficient color gamut processing.

In a method of transmitting media content according to another embodiment of the present invention, the content color gamut information may further include a WCG-SCG transition flag indicating whether the content color gamut of the video samples transitions from WCG to SCG within the corresponding track. Here, the WCG-SCG transition flag may correspond to the above-described content_wcg_scg_transition_flag field. The content color gamut information may further include an SCG-WCG transition flag indicating whether the content color gamut of the video samples transitions from sCG to WCG within the corresponding track. Here, the SCG-WCG transition flag may correspond to the above-described content_scg_wcg_transition_flag field. The container color gamut information may further include a WCG-SCG transition flag indicating whether the container color gamut of the video samples transitions from WCG to SCG (standard color gamut) within the corresponding track. Here, the WCG-SCG transition flag may correspond to the above-described container_wcg_scg_transition_flag field. The container color gamut information may further include an SCG-WCG transition flag indicating whether the container color gamut of the video samples transitions from SCG to WCG within the corresponding track. Here, the SCG-WCG transition flag may correspond to the above-described container_scg_wcg_transition_flag field.

In a method of transmitting media content according to another embodiment of the present invention, a movie fragment block may further include a movie fragment track header block for providing metadata on a track fragment included in a corresponding fragment. The movie fragment track header block may correspond to the above-described tfhd box. The movie fragment track header block may further include second HDR information of the video samples of the track fragment. The second HDR information may provide HDR information with respect to the video samples of the corresponding track fragment. This HDR information may be HDR information in the above-described tfhd box. Here, the HDR information may follow one of the formats described in the above-described embodiments.

In a method of transmitting media content according to another embodiment of the present invention, the second HDR information may include HDR parameter set information related to HDR video samples supporting HDR included in the corresponding track. The HDR parameter set information may correspond to the above-described hdr_param_set field. The information on the set of HDR parameters may include a combination of at least two of EOTF (Electro-Optical Transfer Function) information, bit depth information, peak luminance information, codec information and metadata information. The HDR type flag included in the second HDR information may indicate whether the HDR related parameter for the HDR video sample is changed within the corresponding track fragment. This HDR type flag may correspond to the hdr_type_transition_flag field included in the above-described tfhd box. The SDR-HDR transition flag of the second HDR information may indicate whether the video samples transition from SDR video samples to HDR video samples within the track fragment. This SDR-HDR transition flag may correspond to the hdr_sdr_transition_flag field included in the above-described tfhd box. The HDR-SDR transition flag of the second. HDR information may indicate whether the video samples transition from HDR video samples to SDR video samples within the track fragment. This HDR-SDR transition flag may correspond to the sdr_hdr_transition_flag field included in the above-described tfhd box. The SDR compatibility flag of the second HDR information may indicate whether the HDR video samples of the track fragment are compatible with a decoder supporting SDR. This SDR compatibility flag may correspond to the sdr_compatibility_flag field included in the above-described tfhd box.

In a method of transmitting media content according to another embodiment of the present invention, the movie fragment block may further include a movie fragment track run block for providing metadata on the video samples of the track fragment. The movie fragment track run block may correspond to the above-described trun box. The movie fragment track run block may further include third HDR information of each video sample. The third HDR information may provide HDR information with respect to each video sample of the corresponding track fragment. This HDR information may be HDR information in the above-described trun box. Here, the HDR information may follow one of the formats described in the above-described embodiments.

The third HDR information may include HDR parameter set information related to HDR video samples supporting HDR included in the corresponding track. The HDR parameter set information may correspond to the above-described hdr_param_set field. The information on the set of HDR parameters may be a combination of at least two of EOTF (Electro-Optical Transfer Function) information, bit depth information, peak luminance information, codec information and metadata information. The HDR type flag of the third HDR information may indicate whether the changed HDR related parameter is applied from the corresponding video sample. This HDR type flag may correspond to the hdr_type_transition_flag field of the sample_hdr_config box included in the above-described trun box. The SDR-HDR transition flag of the third HDR information may indicate whether the corresponding video sample transitions from an SDR video sample to an HDR video sample. This SDR-HDR transition flag may correspond to the sdr_hdr_transition_flag field of the sample_hdr_config box included in the above-described trun box. The HDR-SDR transition flag of the third HDR information may indicate whether the corresponding video sample transitions from an HDR video sample to an SDR video sample. This HDR-SDR transition flag may correspond to the hdr_sdr_transition_flag field of the sample_hdr_config box included in the above-described trun box. The SDR compatibility flag of the third HDR information may indicate whether the corresponding video sample is compatible with a decoder supporting SDR. This SDR compatibility flag may correspond to the sdr_compatibility_flag field of the sample_hdr_config box included in the above-described trun box.

In a method of transmitting media content according to another embodiment of the present invention, if the value of the second HDR information for the video samples of the track fragment and the value of the third HDR information for each video sample are different, the value of the third HDR information is applicable to the corresponding video sample. That is, the HDR information defined in the tfhd box may be overwritten by the HDR information defined with respect to an individual sample in the trun box. That is, the HDR information of the trun box is preferentially applied.

A method of receiving media content according to an embodiment of the present invention will be described. This method is not shown in the figure.

A method of receiving media content according to an embodiment of the present invention may include a receiver receiving a plurality of segments, a segment processor processing the received segments to acquire media files and acquiring HDR information and WCG information, and/or a display unit displaying a media presentation using the acquired information.

The methods of receiving media content according to the embodiments of the present invention may correspond to the method of transmitting media content according to the embodiments of the present invention. The methods of receiving media content may be performed by the hardware modules corresponding to the modules (e.g., the file generator, the segment processor, the transmitter, etc.) used in the method of transmitting media content. The methods of receiving media content may have embodiments corresponding to the embodiments of the method of transmitting media content.

The above-described steps may be omitted or replaced by the other steps of performing similar/equal operations in some embodiments.

Figure 59:
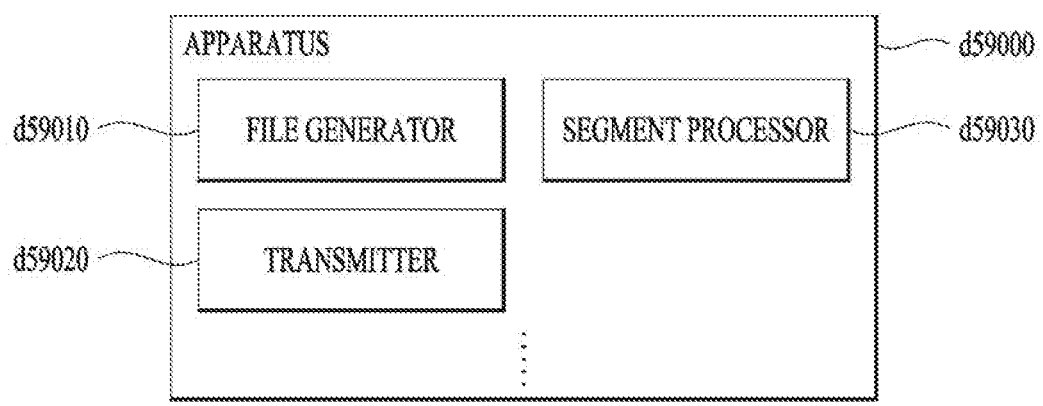
FIG. 59 is a diagram showing an apparatus for transmitting media content according to an embodiment of the present invention.

FIG. 59 is a diagram showing an apparatus for transmitting media content according to an embodiment of the present invention.

The apparatus for transmitting media content according to the embodiment of the present invention may include the file generator, the segment processor and/or the transmitter. The blocks and modules have been described above.

The apparatus for transmitting media content according to the embodiment of the present invention and the modules/blocks included therein may perform the embodiments of the method of transmitting media content of the present invention.

An apparatus for receiving media content according to an embodiment of the present invention will now be described. This apparatus is not shown in the figure.

The apparatus for receiving media content according to the embodiment of the present invention may include the receiver, the segment processor and/or the display unit. The blocks and modules have been described above.

The apparatus for receiving media content according to the embodiment of the present invention and the modules/blocks included therein may perform the embodiments of the method of receiving media content of the present invention.

The blocks/modules of the apparatus may be processors for performing consecutive processes stored in a memory and may be hardware elements located inside/outside the apparatus, in some embodiments.

The above-described steps may be omitted or replaced by the other steps of performing similar/equal operations in some embodiments.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing a computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

MODE FOR INVENTION

Various embodiments have been described in the best mode for carrying out the invention.

INDUSTRIAL APPLICABILITY

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

The invention claimed is:

1. A method of transmitting a broadcast signal, the method comprising:
generating service data of a broadcast service and service signaling information for signaling the broadcast service, the service data including service components included in the broadcast service;
generating a service list table, the service list table including bootstrap information for identifying a transport session in which the service signaling information is transmitted:
processing the service components, the service signaling information and the service list table into Internet protocol (IP) packets; and
processing the IP packets to generate a broadcast signal and transmitting the broadcast signal through a broadcast network,
wherein the service signaling information includes a user service bundle description (USBD),
wherein the USBD operates as a signaling hub describing technological information related to the broadcast service,
wherein the service signaling information of the broadcast service further includes information on a high dynamic range (HDR), and
wherein the information on the HDR includes information on a set of HDR parameters for a service component.

2. The method according to claim 1, wherein the information on the set of HDR parameters indicates a combination of at least two of electro-optical transfer function (EOTF) information, bit depth information, peak luminance information, codec information and metadata information.

3. An apparatus for transmitting a broadcast signal, the apparatus comprising:
a service data generator configured to generate service data of a broadcast service and service signaling information for signaling the broadcast service, the service data including service components included in the broadcast service;
a low-level signaling generator configured to generate a service list table, the service list table including bootstrap information for identifying a transport session in which the service signaling information is transmitted:

a transport layer processor configured to process the service components, the service signaling information and the service list table into Internet protocol (IP) packets; and
a physical layer processor configured to process the IP packets to generate a broadcast signal and transmitting the broadcast signal through a broadcast network,
wherein the service signaling information includes a user service bundle description (USBD),
wherein the USBD operates as a signaling hub describing technological information related to the broadcast service,
wherein the service signaling information of the broadcast service further includes information on a high dynamic range (HDR), and
wherein the information on the HDR includes information on a set of HDR parameters for a service component.

4. The apparatus according to claim 3, wherein the information on the set of HDR parameters indicates a combination of at least two of electro-optical transfer function (EOTF) information, bit depth information, peak luminance information, codec information and metadata information.

5. A method of transmitting media content, the method comprising:
generating media files including information on presentation of the media content, at least one of the media files including a movie block including metadata on presentation of the media file and a plurality of fragments and the movie block further including at least one track block including metadata on a track of the presentation, at least one of the fragments including a movie fragment block for providing metadata on presentation of the fragment and a media data block including video samples for presentation of the fragment;
processing the media files into a plurality of segments: and
transmitting the plurality of segments,
wherein the track block further includes a track header block describing properties of the track, and
wherein the track header block includes high dynamic range (HDR) information or wide color gamut (WCG) information of the video samples of the track.

6. The method according to claim 5, wherein the HDR information includes information on a set of HDR parameters of HDR video samples supporting HDR included in the track.

7. The method according to claim 6, wherein the information on the set of HDR parameters indicates a combination of at least two of electro-optical transfer function (EOTF) information, bit depth information, peak luminance information, codec information and metadata information.

8. An apparatus for transmitting media content, the apparatus comprising:
a file generator configured to generate media files including information on presentation of the media content, at least one of the media files including a movie block including metadata on presentation of the media file and a plurality of fragments and the movie block further including at least one track block including metadata on a track of the presentation, at least one of the fragments including a movie fragment block for providing metadata on presentation of the fragment and a media data block including video samples for presentation of the fragment;

a segment processor configured to process the media files into a plurality of segments; and a transmitter configured to transmit the plurality of segments, wherein the track block further includes a track header block describing properties of the track, and wherein the track header block includes high dynamic range (HDR) information or wide color gamut (WCG) information of the video samples of the track.

9. The apparatus according to claim 8, wherein the HDR information includes information on a set of HDR parameters of HDR video samples supporting HDR included in the track.

10. The apparatus according to claim 9, wherein the information on the set of HDR parameters indicates a combination of at least two of electro-optical transfer function (EOTF) information, bit depth information, peak luminance information, codec information and metadata information.

* * * * *